United States Patent
Lin et al.

(10) Patent No.: US 12,547,693 B2
(45) Date of Patent: Feb. 10, 2026

(54) USER IDENTITY VERIFICATION METHOD AND ELECTRONIC DEVICE

(71) Applicant: HUAWEI TECHNOLOGIES CO., LTD., Shenzhen (CN)

(72) Inventors: Sunghao Lin, Shenzhen (CN); Hsin-Ti Chueh, Shenzhen (CN); Yuchao Lin, Shenzhen (CN); Shubo Zhang, Shenzhen (CN); Liwen Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 17/774,594

(22) PCT Filed: Oct. 29, 2020

(86) PCT No.: PCT/CN2020/124770
§ 371 (c)(1),
(2) Date: May 5, 2022

(87) PCT Pub. No.: WO2021/093595
PCT Pub. Date: May 20, 2021

(65) Prior Publication Data
US 2022/0405375 A1    Dec. 22, 2022

(30) Foreign Application Priority Data
Nov. 11, 2019   (CN) .......................... 201911096627.0

(51) Int. Cl.
*G06F 21/35* (2013.01)
*G06F 21/32* (2013.01)

(52) U.S. Cl.
CPC .............. *G06F 21/35* (2013.01); *G06F 21/32* (2013.01)

(58) Field of Classification Search
CPC .......... G06F 21/35; G06F 21/32; G06F 21/30; H04L 9/3231; H04L 63/08; H04W 12/06; H04W 12/71
See application file for complete search history.

(56) References Cited

U.S. PATENT DOCUMENTS 9,183,683 B2 * 11/2015 Osman .................... G06F 21/35
10,027,662 B1 * 7/2018 Mutagi ............... H04L 63/0861
(Continued)

FOREIGN PATENT DOCUMENTS

CN    104852802 A    8/2015
CN    106027543 A    10/2016
(Continued)

OTHER PUBLICATIONS

Erdene-Ochir, O., "Information on Search Strategy", Oct. 24, 2022, EPO, EP20888365 (Year: 2022).*
(Continued)

*Primary Examiner* — Ramy M Osman
(74) *Attorney, Agent, or Firm* — Maier & Maier, PLLC

(57) ABSTRACT

A device configured to collect to-be-verified identity information of a user and a device configured to verify the to-be-verified identity information may perform a user identity verification method. The device configured to collect the to-be-verified identity information or the device configured to verify the to-be-verified identity information may determine a target identity verification manner applicable to a non-self device from a plurality of identity verification manners based on device information of the non-self device.

9 Claims, 28 Drawing Sheets

(56) References Cited

U.S. PATENT DOCUMENTS

| | | | | |
|---|---|---|---|---|
| 10,979,430 | B1* | 4/2021 | Hitchcock | H04L 63/102 |
| 2005/0278547 | A1* | 12/2005 | Hyndman | G07C 9/20 |
| | | | | 713/185 |
| 2007/0271596 | A1* | 11/2007 | Boubion | G06F 21/77 |
| | | | | 726/3 |
| 2011/0099374 | A1* | 4/2011 | Berrange | H04L 63/08 |
| | | | | 713/168 |
| 2015/0242605 | A1 | 8/2015 | Du et al. | |
| 2017/0250982 | A1 | 8/2017 | Yang | |
| 2017/0308983 | A1 | 10/2017 | Hodge | |
| 2018/0034859 | A1 | 2/2018 | Aronowitz et al. | |
| 2018/0041503 | A1 | 2/2018 | Lindemann | |
| 2018/0309767 | A1* | 10/2018 | Jiang | H04L 63/0861 |
| 2019/0222576 | A1* | 7/2019 | Borkar | H04L 63/0884 |
| 2020/0160131 | A1* | 5/2020 | Waga | H04L 63/0861 |
| 2020/0359218 | A1* | 11/2020 | Lee | H04L 63/0807 |
| 2021/0119991 | A1* | 4/2021 | Agrawal | H04L 63/0853 |
| 2022/0058251 | A1* | 2/2022 | Shin | G06F 21/57 |
| 2022/0092560 | A1* | 3/2022 | Malparty | G06Q 20/02 |
| 2022/0405375 | A1* | 12/2022 | Lin | H04L 9/3231 |

FOREIGN PATENT DOCUMENTS

| | | |
|---|---|---|
| CN | 108334107 A | 7/2018 |
| CN | 108337253 A | 7/2018 |
| CN | 111027037 A | 4/2020 |
| CN | 111552932 A | 8/2020 |

OTHER PUBLICATIONS

Erdene-Ochir, O., "Suuplementary European Search Report", Oct. 24, 2022, EPO, EP20888365 (Year: 2022).*

Erdene-Ochir, O., "Search Report Opinion", Oct. 24, 2022, EPO, EP20888365.2 (Year: 2022).*

China ISA/CN, "International Search Repost", Feb. 4, 2021, PCT/CN2020/124770 (Year: 2021).*

Xin Wang, "International Preliminary Report on Patentability", May 17, 2022, PCT/CN2020/124770 (Year: 2022).*

* cited by examiner

USER IDENTITY VERIFICATION METHOD AND ELECTRONIC DEVICE

CROSS-REFERENCE TO RELATED APPLICATIONS

This application is a national stage of International Application No. PCT/CN2020/124770, filed on Oct. 29, 2020, which claims priority to Chinese Patent Application No. 201911096627.0, filed on Nov. 11, 2019. Both of above applications are hereby incorporated by reference in their entireties.

TECHNICAL FIELD

The embodiments relate to the field of electronic devices and a user identity verification method and an electronic device.

BACKGROUND

To maintain security and prevent theft of an electronic device or an electronic account, there are a plurality of user identity verification methods emerging in the market, for example, fingerprint verification, facial recognition verification, gesture verification, character password verification, and voiceprint verification, to ensure that the electronic device or the electronic account is always used by an owner or used with permission of the owner. Generally, to improve user experience, the electronic device usually has a plurality of user identity recognition capabilities. For example, before a user uses an electronic device or logs in to an electronic account by using an electronic device, the electronic device may verify a user identity through any one of fingerprint verification, facial recognition verification, gesture verification, character password verification, and voiceprint verification. However, the identity verification manners vary in convenience, accuracy, security, and the like, and scenarios in which a user identity needs to be verified are various. Therefore, a method needs to be provided to determine a user identity verification manner more applicable to a current scenario, to improve user experience.

SUMMARY

The embodiments provide a user identity verification method and an electronic device, so that a user identity verification manner can better match a current scenario, thereby providing a personalized service for a user.

According to a first aspect, a user identity verification method is provided and includes: A first device obtains device information of a second device. The first device determines a target identity verification manner applicable to the second device from a plurality of identity verification manners based on the device information of the second device. The first device obtains to-be-verified identity information of a current user based on the target identity verification manner; and the first device sends the to-be-verified identity information to the second device and receives a user verification result that is sent by the second device and that corresponds to the to-be-verified identity information.

The method can be applied to, for example, a smart household scenario or a smart vehicle-mounted scenario.

The first device may be, for example, a television, a sound box, a monitor device, a fingerprint recognition apparatus, a driving system, a watch, or a smart body fat scale. The driving system may further include a display, a camera, a microphone, a seat adjustment apparatus, a seat sensor, a fingerprint recognition apparatus, a sound box, and the like.

The second device may be, for example, a portable electronic device such as a mobile phone or a tablet computer. The second device may be a desktop computer or the like.

The device information of the second device includes a hardware parameter, a device type, wireless transmission information, a device function, and the like of the second device. The hardware parameter of the second device may be used to indicate at least some hardware installed on the second device and a parameter of the hardware. The wireless transmission information of the second device may be used to indicate a wireless communication protocol that can be used by the second device. The device function of the second device may be used to indicate a function that can be implemented by the second device. The device function of the second device may include an identity verification function enabled by the second device.

The plurality of identity verification manners may include a facial recognition manner, a voiceprint recognition manner, a fingerprint recognition manner, a soft biometric trait recognition manner, and the like. A soft biometric trait may indicate a common biometric trait presented by a user. The soft biometric trait may include a gender, an age, a height, a weight, an accent, a walking posture, a hairstyle, a hair color, a tattoo, and the like. Generally, a user cannot be uniquely determined from a large quantity of users (for example, a population of an entire country) only by using a single soft biometric trait. However, a user can be uniquely determined from a group with a small quantity of people by using one or more soft biometric traits.

In this embodiment, the first device can obtain the required identity verification information from the plurality of identity verification manners. The second device may perform matching on the identity verification information. Because scenarios for matching identity verification information are various, there is a preferable identity verification manner in the plurality of identity verification manners. The first device may determine the target identity verification manner based on the device information of the second device, so that the identity verification manner can better match the scenario based on optimal use performance that can be provided by the second device.

Optionally, the method further includes: The second device updates the device information of the second device.

For example, when the hardware parameter of the second device changes, the second device may update the device information of the second device. For another example, when the device functions of the second device increase or decrease, the second device may update the device information of the second device.

Optionally, the method further includes: The first device indicates the target identity verification manner to the second device.

In other words, the first device may send indication information, so that the second device can determine the identity verification manner used by the first device.

With reference to the first aspect, in some implementations of the first aspect, the method further includes: When the to-be-verified identity information successfully matches a target user, the first device performs, according to an indication from the second device, a target operation that matches the target user.

The target operation may be, for example, displaying an image for recommending a video and/or audio. Alternatively, the target operation may be playing a voice for recommending a video and/or audio.

In this embodiment, when the to-be-verified identity information of the current user matches the identity information of the target user, the current user can be considered as the target user. The second device may indicate the target operation to the first device, and the first device performs the target operation, so as to provide a personalized service for the target user.

With reference to the first aspect, in some implementations of the first aspect, the device information of the second device includes at least one of the following: device type information of the second device; wireless transmission information of the second device; and an identity verification manner enabled by the second device.

In this embodiment, hardware parameters of mass-produced electronic devices are usually unified and can be easily found. The first device may determine, based on the type and a model of the second device, the hardware parameter included in the second device and the function that can be implemented by the second device. Because the second device sends a small volume of information to the first device, time consumed for interaction between the second device and the first device is reduced, thereby improving user experience.

In this embodiment, user experience varies with a type of wireless transmission information of the second device. For example, when the wireless transmission information is a mobile communications network, the user usually does not expect that excessive traffic is consumed in an identity verification process, and therefore the user expects that a data volume of the identity verification information matched by the second device is small; when the wireless transmission information is a wireless local area network, the user expects that higher accuracy of the identity verification information matched by the second device is better; or when the wireless transmission information is Bluetooth transmission, the user expects that less time consumed for the second device to obtain the identity verification information is better. In conclusion, the first device can determine, based on the wireless transmission information of the second device, the identity verification manner beneficial to user experience.

In this embodiment, the first device can quickly filter out an unavailable identity verification manner based on the identity verification manner enabled by the second device, thereby improving user experience.

With reference to the first aspect, in some implementations of the first aspect, that the first device determines the target identity verification manner applicable to the second device from the plurality of identity verification manners based on the device information of the second device includes: The first device determines the target identity verification manner from the plurality of identity verification manners based on the device information of the second device, and device information of the first device and/or at least one piece of verification manner information.

In this embodiment, in addition to the device information of the second device, the first device may further consider the device information of the first device and/or an attribute of a verification manner, to comprehensively determine the identity verification manner most appropriate for the first device and the second device, thereby improving user experience.

Optionally, that the first device determines the target identity verification manner from the plurality of identity verification manners based on the device information of the second device, the device information of the first device, and/or the at least one piece of verification manner information includes: The first device determines, based on the device information of the second device, a plurality of first weight values that are in a one-to-one correspondence with the plurality of identity verification manners. The first device determines, based on the device information of the first device, a plurality of second weight values that are in a one-to-one correspondence with the plurality of identity verification manners. The first device determines, based on the at least one verification manner, a plurality of third weight values that are in a one-to-one correspondence with the plurality of identity verification manners. The first device determines, based on the plurality of first weight values, the plurality of second weight values, and the plurality of third weight values, a plurality of first total weight values that are in a one-to-one correspondence with the plurality of identity verification manners. The first device determines, based on a target first weight value, a target second weight value, and a target third weight value, a first overall weight value corresponding to a third identity verification manner, where the target first weight value, the target second weight value, and the target third weight value each correspond to the third identity verification manner, and the third identity verification manner is any one of the plurality of identity verification manners. The first device sorts the plurality of first total weight values and determines an identity verification manner corresponding to a first total weight value with the largest value as the target identity verification manner.

The device information of the first device includes a hardware parameter, a device type, wireless transmission information, a device function, and the like of the first device. The hardware parameter of the first device may be used to indicate at least some hardware installed on the first device and a parameter of the hardware. The wireless transmission information of the first device may be used to indicate a wireless communication protocol that can be used by the first device. The device function of the first device may be used to indicate a function that can be implemented by the first device. The device function of the first device may include an identity verification function enabled by the first device.

With reference to the first aspect, in some implementations of the first aspect, the device information of the first device includes at least one of the following: device type information of the first device; wireless transmission information of the first device; an identity verification manner enabled by the first device; and information about at least one module in the first device, where the at least one module is configured to perform a first identity verification manner, and the first identity verification manner is any one of the plurality of identity verification manners.

It should be understood that a module may include a hardware module and a software module.

In this embodiment, hardware parameters of mass-produced electronic devices are usually unified and can be easily found. The first device may determine, based on the type and a model of the first device, the hardware parameter included in the first device and the function that can be implemented by the first device. Because the first device needs to detect a small quantity of hardware parameters, time consumed by the first device to determine the target identity verification manner is reduced, thereby improving user experience.

In this embodiment, user experience varies with a type of wireless transmission information of the first device. For example, when the wireless transmission information is a mobile communications network, the user usually does not expect that excessive traffic is consumed in an identity verification process, and therefore the user expects that a data volume of the identity verification information sent by the first device is small; when the wireless transmission information is a wireless local area network, the user expects that higher accuracy of the identity verification information matched by the second device is better; or when the wireless transmission information is Bluetooth transmission, the user expects that less time consumed for the first device to obtain the identity verification information is better. In conclusion, the first device can determine, based on the wireless transmission information of the first device, the identity verification manner beneficial to user experience.

In this embodiment, the first device can quickly filter out an unavailable identity verification manner based on the identity verification manner enabled by the first device, thereby improving user experience.

In this embodiment, the module included in the first device can quickly determine information such as accuracy and quality of the identity verification information, so that a most appropriate identity verification manner can be quickly determined, thereby improving user experience.

Optionally, the method further includes: The first device updates the device information of the first device.

For example, when the hardware parameter of the first device changes, the first device may update the device information of the first device. For another example, when the device functions of the first device increase or decrease, the first device may update the device information of the first device.

With reference to the first aspect, in some implementations of the first aspect, the at least one piece of verification manner information includes at least one of the following: a plurality of pieces of accuracy information that are in a one-to-one correspondence with the plurality of identity verification manners; a plurality of pieces of user experience information that are in a one-to-one correspondence with the plurality of identity verification manners; a plurality of pieces of technology maturity information that are in a one-to-one correspondence with the plurality of identity verification manners; and a plurality of pieces of verification environment information that are in a one-to-one correspondence with the plurality of identity verification manners.

In this embodiment, the first device can select, from one or more perspectives of the identity verification manner, the identity verification manner most appropriate for user experience.

With reference to the first aspect, in some implementations of the first aspect, the method further includes: The first device sends behavior information of the current user to the second device.

That is, the second device may obtain a behavior habit of the user by using the first device. The second device may learn the behavior habit of the user, thereby providing personalized services for different users.

According to a second aspect, a user identity verification method is provided and includes: A third device obtains device information of a fourth device. The third device determines a target identity verification manner applicable to the fourth device from a plurality of identity verification manners based on the device information of the fourth device. The third device indicates, based on the target identity verification manner, the fourth device to obtain user identity information of a current user. The third device receives the user identity information sent by the fourth device and performs matching on the user identity information.

The method can be applied to, for example, a smart household scenario or a smart vehicle-mounted scenario.

The third device may be, for example, a portable electronic device such as a mobile phone or a tablet computer. The third device may be a desktop computer or the like.

The fourth device may be, for example, a television, a sound box, a monitor device, a fingerprint recognition apparatus, a driving system, a watch, or a smart body fat scale. The driving system may further include a display, a camera, a microphone, a seat adjustment apparatus, a seat sensor, a fingerprint recognition apparatus, a sound box, and the like.

The device information of the fourth device may include a hardware parameter, a device type, wireless transmission information, a device function, and the like of the fourth device. The hardware parameter of the fourth device may be used to indicate at least some hardware installed on the fourth device and a parameter of the hardware. The wireless transmission information of the fourth device may be used to indicate a wireless communication protocol that can be used by the fourth device. The device function of the fourth device may be used to indicate a function that can be implemented by the fourth device. The device function of the fourth device may include an identity verification function enabled by the fourth device.

The plurality of identity verification manners may include a facial recognition manner, a voiceprint recognition manner, a fingerprint recognition manner, a soft biometric trait recognition manner, and the like. A soft biometric trait may indicate a common biometric trait presented by a user. The soft biometric trait may include a gender, an age, a height, a weight, an accent, a walking posture, a hairstyle, a hair color, a tattoo, and the like. Generally, a user cannot be uniquely determined from a large quantity of users (for example, a population of an entire country) only by using a single soft biometric trait. However, a user can be uniquely determined from a group with a small quantity of people by using one or more soft biometric traits.

In this embodiment, the fourth device can obtain the required identity verification information from the plurality of identity verification manners. The third device may perform matching on the identity verification information. Because scenarios for obtaining identity verification information are various, there is a preferable identity verification manner in the plurality of identity verification manners. The third device may determine the target identity verification manner based on the device information of the fourth device, so that the identity verification manner can better match the scenario based on optimal use performance that can be provided by the fourth device.

Optionally, the method further includes: The fourth device updates the device information of the fourth device.

For example, when the hardware parameter of the fourth device changes, the fourth device may update the device information of the fourth device. For another example, when the device functions of the fourth device increase or decrease, the fourth device may update the device information of the fourth device.

With reference to the second aspect, in some implementations of the second aspect, the method further includes: When the user identity information successfully matches a target user, the third device indicates the fourth device to perform a target operation that matches the target user.

The target operation may be, for example, displaying an image for recommending a video and/or audio. Alternatively, the target operation may be playing a voice for recommending a video and/or audio.

In this embodiment, when to-be-verified identity information of the current user matches the identity information of the target user, the current user can be considered as the target user. The third device may indicate the target operation to the fourth device, and the fourth device performs the target operation, so as to provide a personalized service for the target user.

With reference to the second aspect, in some implementations of the second aspect, the device information of the fourth device includes at least one of the following: device type information of the fourth device; wireless transmission information of the fourth device; an identity verification manner enabled by the fourth device; and information about at least one module in the fourth device, where the at least one module is configured to perform a second identity verification manner, and the second identity verification manner is any one of the plurality of identity verification manners.

It should be understood that a module may include a hardware module and a software module.

In this embodiment, hardware parameters of mass-produced electronic devices are usually unified and can be easily found. The third device may determine, based on the type and a model of the fourth device, the hardware parameter included in the fourth device and the function that can be implemented by the fourth device. Because the fourth device sends a small volume of information to the third device, time consumed for interaction between the third device and the fourth device is reduced, thereby improving user experience.

In this embodiment, user experience varies with a type of wireless transmission information of the fourth device. For example, when the wireless transmission information is a mobile communications network, the user usually does not expect that excessive traffic is consumed in an identity verification process, and therefore the user expects that a data volume of the identity verification information sent by the fourth device is small; when the wireless transmission information is a wireless local area network, the user expects that higher accuracy of the identity verification information matched by the third device is better; or when the wireless transmission information is Bluetooth transmission, the user expects that less time consumed for the third device to obtain the identity verification information is better. In conclusion, the third device can determine, based on the wireless transmission information of the fourth device, the identity verification manner beneficial to user experience.

In this embodiment, the third device can quickly filter out an unavailable identity verification manner based on the identity verification manner enabled by the fourth device, thereby improving user experience.

In this embodiment, the module included in the fourth device can quickly determine information such as accuracy and quality of the identity verification information, so that a most appropriate identity verification manner can be quickly determined, thereby improving user experience.

With reference to the second aspect, in some implementations of the second aspect, that the third device determines the target identity verification manner applicable to the fourth device from the plurality of identity verification manners based on the device information of the fourth device includes: The third device determines the target identity verification manner from the plurality of identity verification manners based on the device information of the fourth device, and at least one piece of verification manner information and/or device information of the third device.

In this embodiment, in addition to the device information of the fourth device, the third device may further consider the device information of the third device and/or an attribute of a verification manner, to comprehensively determine the identity verification manner most appropriate for the third device and the fourth device, thereby improving user experience.

Optionally, the third device determines, based on the device information of the third device, a plurality of fourth weight values that are in a one-to-one correspondence with the plurality of identity verification manners. The third device determines, based on the device information of the fourth device, a plurality of fifth weight values that are in a one-to-one correspondence with the plurality of identity verification manners. The third device determines, based on the at least one verification manner, a plurality of sixth weight values that are in a one-to-one correspondence with the plurality of identity verification manners. The third device determines, based on the plurality of fourth weight values, the plurality of fifth weight values, and the plurality of sixth weight values, a plurality of second total weight values that are in a one-to-one correspondence with the plurality of identity verification manners. The third device determines, based on a target fourth weight value, a target fifth weight value, and a target sixth weight value, a second overall weight value corresponding to a fourth identity verification manner, where the target fourth weight value, the target fifth weight value, and the target sixth weight value each correspond to the fourth identity verification manner, and the fourth identity verification manner is any one of the plurality of identity verification manners. The fourth device sorts the plurality of second total weight values and determines an identity verification manner corresponding to a second total weight value with the largest value as the target identity verification manner.

The device information of the third device includes a hardware parameter, a device type, wireless transmission information, a device function, and the like of the third device. The hardware parameter of the third device may be used to indicate at least some hardware installed on the third device and a parameter of the hardware. The wireless transmission information of the third device may be used to indicate a wireless communication protocol that can be used by the third device. The device function of the third device may be used to indicate a function that can be implemented by the third device. The device function of the third device may include an identity verification function enabled by the third device.

With reference to the second aspect, in some implementations of the second aspect, the device information of the third device includes at least one of the following: device type information of the third device; wireless transmission information of the third device; and an identity verification manner enabled by the third device.

In this embodiment, hardware parameters of mass-produced electronic devices are usually unified and can be easily found. The third device may determine, based on the type and a model of the third device, the hardware parameter included in the third device and the function that can be implemented by the third device. Because the third device needs to detect a small quantity of hardware parameters, time consumed by the third device to determine the target identity verification manner is reduced, thereby improving user experience.

In this embodiment, user experience varies with a type of wireless transmission information of the third device. For example, when the wireless transmission information is a mobile communications network, the user usually does not expect that excessive traffic is consumed in an identity verification process, and therefore the user expects that a data volume of the identity verification information received by the third device is small; when the wireless transmission information is a wireless local area network, the user expects that higher accuracy of the identity verification information matched by the third device is better; or when the wireless transmission information is Bluetooth transmission, the user expects that less time consumed for the third device to obtain the identity verification information is better. In conclusion, the third device can determine, based on the wireless transmission information of the third device, the identity verification manner beneficial to user experience.

In this embodiment, the third device can quickly filter out an unavailable identity verification manner based on the identity verification manner enabled by the third device, thereby improving user experience.

With reference to the second aspect, in some implementations of the second aspect, the at least one piece of verification manner information includes at least one of the following: a plurality of pieces of accuracy information that are in a one-to-one correspondence with the plurality of identity verification manners; a plurality of pieces of user experience information that are in a one-to-one correspondence with the plurality of identity verification manners; a plurality of pieces of technology maturity information that are in a one-to-one correspondence with the plurality of identity verification manners; and a plurality of pieces of verification environment information that are in a one-to-one correspondence with the plurality of identity verification manners.

In this embodiment, the third device can select, from one or more perspectives of the identity verification manner, the identity verification manner most appropriate for user experience.

With reference to the second aspect, in some implementations of the second aspect, before the third device receives the user identity information sent by the fourth device and performs matching on the user identity information, the method further includes: The third device receives behavior information of the target user sent by the fourth device; and generates target user common information corresponding to the target user based on the behavior information. That the third device indicates the fourth device to perform the target operation includes: The third device indicates, based on the target user common information, the fourth device to perform the target operation.

That is, the third device may obtain a behavior habit of the user by using the fourth device. The third device may learn the behavior habit of the user, thereby providing personalized services for different users.

According to a third aspect, an electronic device is provided and includes: an obtaining module, configured to obtain device information of a second device; a processing module, configured to determine a target identity verification manner applicable to the second device from a plurality of identity verification manners based on the device information of the second device, where the processing module is further configured to obtain to-be-verified identity information of a current user based on the target identity verification manner; and a transceiver module, configured to: send the to-be-verified identity information to the second device, and receive a user verification result that is sent by the second device and that corresponds to the to-be-verified identity information.

With reference to the third aspect, in some implementations of the third aspect, the processing module is further configured to: when the to-be-verified identity information successfully matches a target user, perform, according to an indication from the second device, a target operation that matches the target user.

With reference to the third aspect, in some implementations of the third aspect, the device information of the second device includes at least one of the following: device type information of the second device; wireless transmission information of the second device; and an identity verification manner enabled by the second device.

With reference to the third aspect, in some implementations of the third aspect, the processing module is configured to: determine the target identity verification manner from the plurality of identity verification manners based on the device information of the second device, and device information of the electronic device and/or at least one piece of verification manner information.

With reference to the third aspect, in some implementations of the third aspect, the device information of the electronic device includes at least one of the following: device type information of the electronic device; wireless transmission information of the electronic device; an identity verification manner enabled by the electronic device; and information about at least one module in the electronic device, where the at least one module is configured to perform a first identity verification manner, and the first identity verification manner is any one of the plurality of identity verification manners.

With reference to the third aspect, in some implementations of the third aspect, the at least one piece of verification manner information includes at least one of the following: a plurality of pieces of accuracy information that are in a one-to-one correspondence with the plurality of identity verification manners; a plurality of pieces of user experience information that are in a one-to-one correspondence with the plurality of identity verification manners; a plurality of pieces of technology maturity information that are in a one-to-one correspondence with the plurality of identity verification manners; and a plurality of pieces of verification environment information that are in a one-to-one correspondence with the plurality of identity verification manners.

With reference to the third aspect, in some implementations of the third aspect, the transceiver module is further configured to send behavior information of the current user to the second device.

According to a fourth aspect, an electronic device is provided and includes: an obtaining module, configured to obtain device information of a fourth device; a processing module, configured to determine a target identity verification manner applicable to the fourth device from a plurality of identity verification manners based on the device information of the fourth device, where the processing module is further configured to indicate, based on the target identity verification manner, the fourth device to obtain user identity information of a current user; and a transceiver module, configured to receive the user identity information sent by the fourth device, where the processing module is further configured to perform matching on the user identity information.

With reference to the fourth aspect, in some implementations of the fourth aspect, the processing module is further configured to: when the user identity information successfully matches a target user, indicate the fourth device to perform a target operation that matches the target user.

With reference to the fourth aspect, in some implementations of the fourth aspect, the device information of the fourth device includes at least one of the following: device type information of the fourth device; wireless transmission information of the fourth device; an identity verification manner enabled by the fourth device; and information about at least one module in the fourth device, where the at least one module is configured to perform a second identity verification manner, and the second identity verification manner is any one of the plurality of identity verification manners.

With reference to the fourth aspect, in some implementations of the fourth aspect, the processing module is configured to determine the target identity verification manner from the plurality of identity verification manners based on the device information of the fourth device, and at least one piece of verification manner information and/or device information of the electronic device.

With reference to the fourth aspect, in some implementations of the fourth aspect, the device information of the electronic device includes at least one of the following: device type information of the electronic device; wireless transmission information of the electronic device; and an identity verification manner enabled by the electronic device.

With reference to the fourth aspect, in some implementations of the fourth aspect, the at least one piece of verification manner information includes at least one of the following: a plurality of pieces of accuracy information that are in a one-to-one correspondence with the plurality of identity verification manners; a plurality of pieces of user experience information that are in a one-to-one correspondence with the plurality of identity verification manners; a plurality of pieces of technology maturity information that are in a one-to-one correspondence with the plurality of identity verification manners; and a plurality of pieces of verification environment information that are in a one-to-one correspondence with the plurality of identity verification manners.

With reference to the fourth aspect, in some implementations of the fourth aspect, the transceiver module is further configured to: before the transceiver module receives the user identity information sent by the fourth device, receive behavior information of the target user sent by the fourth device. The processing module is further configured to generate target user common information corresponding to the target user based on the behavior information. The processing module is configured to indicate, based on the target user common information, the fourth device to perform the target operation.

According to a fifth aspect, an electronic device is provided and includes: a memory, configured to store a program; and a processor, configured to execute the program stored in the memory. When the program stored in the memory is executed, the processor is configured to perform the following processes: obtaining device information of a second device; determining a target identity verification manner applicable to the second device from a plurality of identity verification manners based on the device information of the second device; obtaining to-be-verified identity information of a current user based on the target identity verification manner; and sending the to-be-verified identity information to the second device, and receiving a user verification result that is sent by the second device and that corresponds to the to-be-verified identity information.

According to a sixth aspect, an electronic device is provided and includes: a memory, configured to store a program; and a processor, configured to execute the program stored in the memory. When the program stored in the memory is executed, the processor is configured to perform the following processes: obtaining device information of a fourth device; determining a target identity verification manner applicable to the fourth device from a plurality of identity verification manners based on the device information of the fourth device; indicating, based on the target identity verification manner, the fourth device to obtain user identity information of a current user; and receiving the user identity information sent by the fourth device and performing matching on the user identity information.

According to a seventh aspect, a computer-readable medium is provided. The computer-readable medium stores program code to be executed by a device, and the program code is used to perform the method in any one of the implementations of the first aspect and the second aspect.

According to an eighth aspect, a computer program product including instructions is provided. When the computer program product runs on a computer, the computer is enabled to perform the method in any one of the implementations of the first aspect and the second aspect.

According to a ninth aspect, a chip is provided. The chip includes a processor and a data interface. The processor performs the method in any one of the implementations of the first aspect and the second aspect by reading, through the data interface, instructions stored in a memory.

Optionally, in an implementation, the chip may further include the memory, and the memory stores the instructions. The processor is configured to execute the instructions stored in the memory, and when the instructions are executed, the processor is configured to perform the method in any one of the implementations of the first aspect and the second aspect.

DETAILED DESCRIPTION OF THE EMBODIMENTS

The following describes the solutions with reference to the accompanying drawings.

Terms used in the following embodiments are merely intended to describe embodiments but are not intended to limit. The terms "one", "a" and "this" of singular forms are also intended to include expressions such as "one or more", unless otherwise specified in the context clearly. It should be further understood that in the following embodiments, "at least one" and "one or more" refer to one, two, or more. The term "and/or" is used to describe an association relationship between associated objects and indicates that there may be three relationships. For example, A and/or B may represent the following cases: only A exists, both A and B exist, and only B exists, where A and B may be singular or plural. The character "/" generally represents an "or" relationship between the associated objects.

Reference to "one embodiment" or "some embodiments" or the like means that one or more embodiments include a particular feature, structure, or characteristic described in combination with the embodiment. Thus, phrases "in one embodiment", "in some embodiments", "in some other embodiments", "in some additional embodiments", and the like do not necessarily mean referring to a same embodiment, but mean "one or more embodiments, but not all embodiments", unless otherwise emphasized. The terms "include", "comprise", "have", and their variants all mean "include but are not limited to", unless otherwise emphasized in other ways.

The following describes an electronic device provided in the embodiments, a user interface for such an electronic device, and embodiments for using such an electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device provided with iOS®, Android®, Microsoft®, or another operating system. The portable electronic device may alternatively be another portable electronic device, such as a laptop. It should be further understood that, in some other embodiments, the electronic device may not be a portable electronic device, but may be such as a desktop computer, a television, a sound box, a monitor device, a camera, a display, a microphone, a seat adjustment apparatus, a fingerprint recognition apparatus, or a vehicle-mounted driving system.

Figure 1:
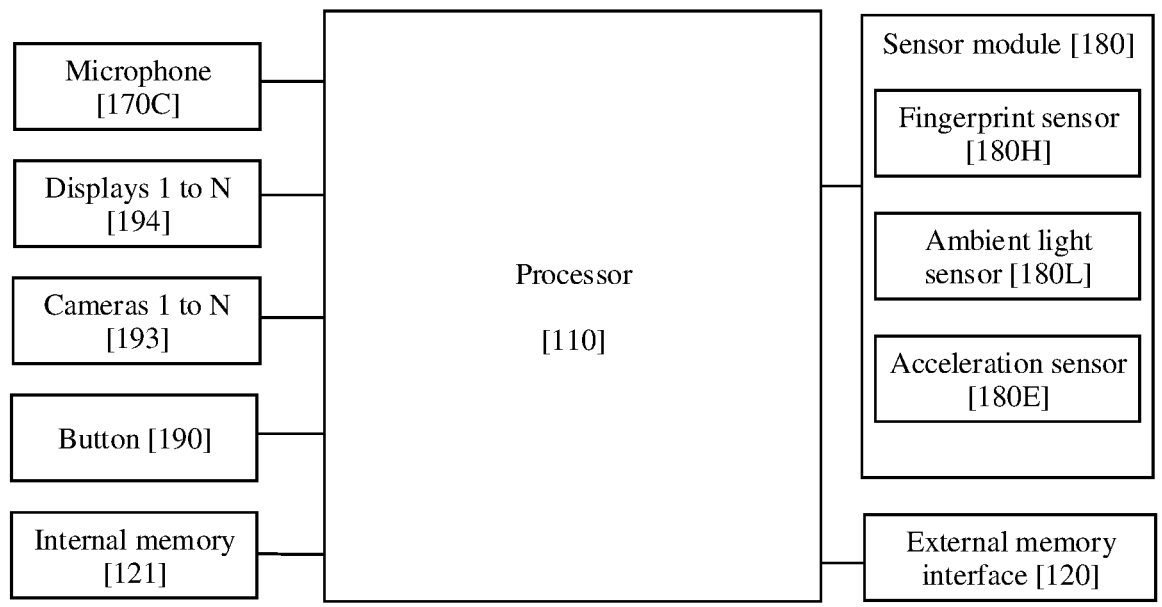
FIG. 1 is a schematic diagram of a hardware structure of an electronic device according to an embodiment.

For example, FIG. 1 is a schematic diagram of a structure of an electronic device 100. The electronic device 100 may include a processor 110, an external memory interface 120, an internal memory 121, a microphone 170C, a sensor module 180, a button 190, a camera 193, a display 194, a subscriber identification module (SIM) card interface 195, and the like.

It may be understood that the structure shown in this embodiment does not constitute a limitation on the electronic device 100. In some other embodiments, the electronic device 100 may include more or fewer components than the components shown in the figure, some components may be combined, or some components may be split, or different component arrangements may be used. The components shown in the figure may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components or may be integrated into one or more processors. In some embodiments, the electronic device 101 may alternatively include one or more processors 110. The controller may generate an operation control signal based on instruction operation code and a time sequence signal, to complete control of instruction fetching and instruction execution. In some other embodiments, a memory may further be disposed in the processor 110, to store instructions and data. For example, the memory in the processor 110 may be a cache. The memory may store instructions or data just used or cyclically used by the processor 110. If the processor 110 needs to use the instructions or the data again, the processor 110 may directly invoke the instructions or the data from the memory. In this way, repeated access is avoided, waiting time of the processor 110 is reduced, and efficiency of processing data or executing instructions by the electronic device 101 is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB port, and/or the like. The USB port 130 is a port that conforms to a USB standard specification and may be a mini USB port, a micro USB port, a USB type-C port, or the like. The USB port 130 may be configured to connect to a charger to charge the electronic device 101 or may be configured to transmit data between the electronic device 101 and a peripheral device. The USB port 130 may alternatively be configured to connect to a headset and play audio by using the headset.

It may be understood that an interface connection relationship between the modules illustrated in this embodiment is merely an example for description and does not constitute a limitation on the structure of the electronic device 100. In some other embodiments, the electronic device 100 may alternatively use an interface connection manner different from that in the foregoing embodiment, or a combination of a plurality of interface connection manners.

The electronic device 100 implements a display function by using the GPU, the display 194, the application processor, and the like. The GPU is a microprocessor for image processing and is connected to the display 194 and the application processor. The GPU is configured to perform mathematical and geometric calculation and render an image. The processor 110 may include one or more GPUs that execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or more displays 194.

The display 194 of the electronic device 100 may be a flexible screen. Currently, the flexible screen attracts much attention because of unique features and huge potential of the flexible screen. Compared with a conventional display, the flexible display has features of strong flexibility and bendability and can provide a user with a new bendability-based interaction mode, to satisfy more requirements of the user on an electronic device. For an electronic device configured with a foldable display, the foldable display of the electronic device may be switched between a small screen in a folded form and a large screen in an unfolded form at any time. Therefore, the user uses a split-screen function more frequently on the electronic device configured with the foldable display.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or more cameras 193.

The digital signal processor is configured to process a digital signal and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more types of video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor. With reference to a structure of a biological neural network, for example, with reference to a transfer mode between neurons of a human brain, the NPU quickly processes input information, and can further continuously perform self-learning. Applications such as intelligent cognition of the electronic device 100 may be implemented through the NPU, for example, image recognition, facial recognition, speech recognition, and text understanding.

The external memory interface 120 may be used to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device 101 performs a screen-off display method provided in some embodiments, various applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the electronic device 101, and the like. In addition, the internal memory 121 may include a high-speed random access memory, or may include a non-volatile memory, for example, one or more magnetic disk storage devices, a flash memory device, or a universal flash storage (UFS). In some embodiments, the processor 110 may run the instructions stored in the internal memory 121 and/or the instructions stored in the memory that is disposed in the processor 110, so that the electronic device 101 performs the screen-off display method provided in the embodiments, other applications, and data processing. The electronic device 100 may implement an audio function, for example, music playing and recording, by using an audio module 170, a speaker 170A, a receiver 170B, the microphone 170C, a headset jack 170D, the application processor, and the like.

The sensor module 180 may include an acceleration sensor 180E, a fingerprint sensor 180H, an ambient light sensor 180L, and the like.

The acceleration sensor 180E may detect accelerations in various directions (usually on three axes) of the electronic device 100. When the electronic device 100 is still, a magnitude and a direction of gravity may be detected. The acceleration sensor 180E may be configured to identify a posture of the electronic device and is used in an application such as switching between a landscape mode and a portrait mode or a pedometer.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with an optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The button 190 includes a power button, a volume button, and the like. The button 190 may be a mechanical button or may be a touch-sensitive button. The electronic device 100 may receive a button input and generate a button signal input related to user setting and function control of the electronic device 100.

Figure 2:
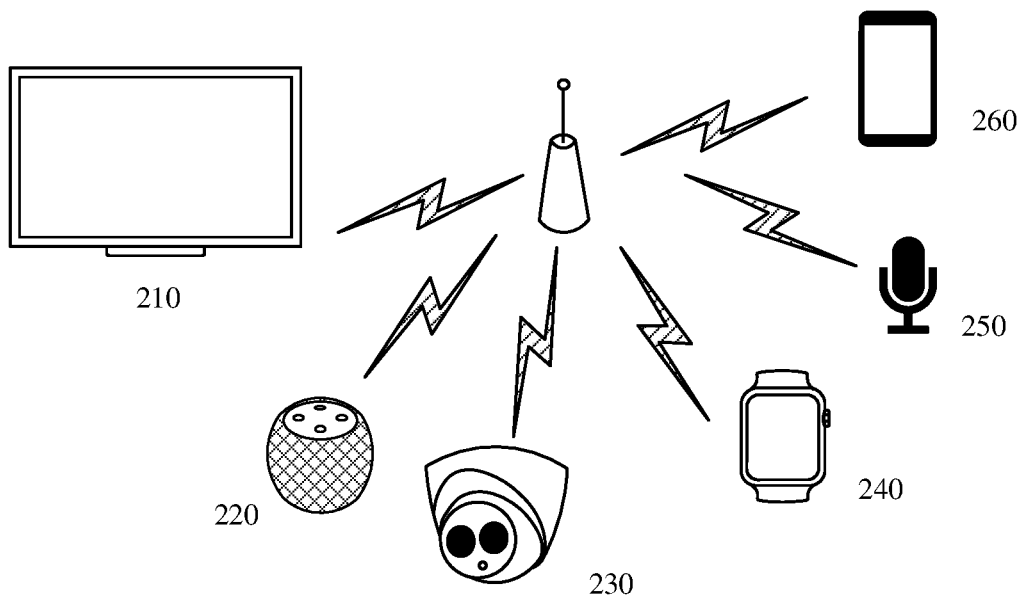
FIG. 2 is a schematic diagram of a smart household scenario according to an embodiment.

FIG. 2 shows an application scenario according to an embodiment. The application scenario in FIG. 2 may also be referred to as a smart household scenario. The application scenario in FIG. 2 may include at least one electronic device (for example, an electronic device 210, an electronic device 220, an electronic device 230, an electronic device 240, and an electronic device 250), an electronic device 260, and an electronic device 270. The electronic device 210 in FIG. 2 may be a television. The electronic device 220 may be a sound box. The electronic device 230 may be a monitor device. The electronic device 240 may be a watch. The electronic device 250 may be a smart microphone. The electronic device 260 may be a mobile phone, or a tablet computer. The electronic device 270 may be a wireless communications device, for example, a router or a gateway device. The electronic device 210, the electronic device 220, the electronic device 230, the electronic device 240, the electronic device 250, and the electronic device 260 in FIG. 2 may perform uplink transmission and downlink transmission with the electronic device 270 according to a wireless communication protocol. For example, the electronic device 270 may send information to the electronic device 210, the electronic device 220, the electronic device 230, the electronic device 240, the electronic device 250, and the electronic device 260, and may receive information sent by the electronic device 210, the electronic device 220, the electronic device 230, the electronic device 240, the electronic device 250, and the electronic device 260.

It should be noted that the embodiments may be applied to an application scenario including one or more wireless communications devices and a plurality of electronic devices. This is not limited.

In an example, the application scenario includes an electronic device 210, an electronic device 260, and an electronic device 270. The electronic device 210 is a television, the electronic device 260 is a mobile phone, and the electronic device 270 is a router. The router is configured to implement wireless communication between the television and the mobile phone. A user may select, on the mobile phone, a video that the user wants to play, and indicate, on the mobile phone, the television to play the video. In addition, if a camera is installed on the television, the television may send an image or a video captured by the camera to the mobile phone, so that the mobile phone can perform facial recognition on the image or the video.

In an example, the application scenario includes an electronic device 220, an electronic device 260, and an electronic device 270. The electronic device 220 is a sound box, the electronic device 260 is a mobile phone, and the electronic device 270 is a router. The router is configured to implement wireless communication between the sound box and the mobile phone. A user may select, on the mobile phone, audio that the user wants to play, and indicate, on the mobile phone, the sound box to play the audio. In addition, if a microphone is installed on the sound box, the sound box may send audio captured by the microphone to the mobile phone, so that the mobile phone can perform voiceprint recognition on the audio.

In an example, the application scenario includes an electronic device 230, an electronic device 260, and an electronic device 270. The electronic device 230 is a monitor device, the electronic device 260 is a mobile phone, and the electronic device 270 is a router. The router is configured to implement wireless communication between the monitor device and the mobile phone. The monitor device may send a photographed surveillance video to the mobile phone, and a user may indicate, on the mobile phone, the monitor device to adjust a monitor position based on an image in the mobile phone. In addition, the monitor device may send a captured image or video to the mobile phone, so that the mobile phone can perform facial recognition on the image or video.

In an example, the application scenario includes an electronic device 240, an electronic device 260, and an electronic device 270. The electronic device 240 is a watch, the electronic device 260 is a mobile phone, and the electronic device 270 is a router. The router is configured to implement wireless communication between the watch and the mobile phone. The watch may record pulse data of a user and send the pulse data to the mobile phone. The user may view the pulse data of the user on the mobile phone. In addition, because a male pulse frequency is different from a female pulse frequency, the pulse data may be used to recognize a soft biometric trait of the user. Therefore, the watch may send a pulse frequency to the mobile phone as a piece of soft biometric trait data.

In an example, the application scenario includes an electronic device 250, an electronic device 260, and an electronic device 270. The electronic device 250 is a microphone, the electronic device 260 is a mobile phone, and the electronic device 270 is a router. The router is configured to implement wireless communication between the microphone and the mobile phone. A user can view audio recorded by the microphone on the mobile phone. In addition, the microphone may send captured audio to the mobile phone, so that the mobile phone can perform voiceprint recognition on the audio.

Figure 3:
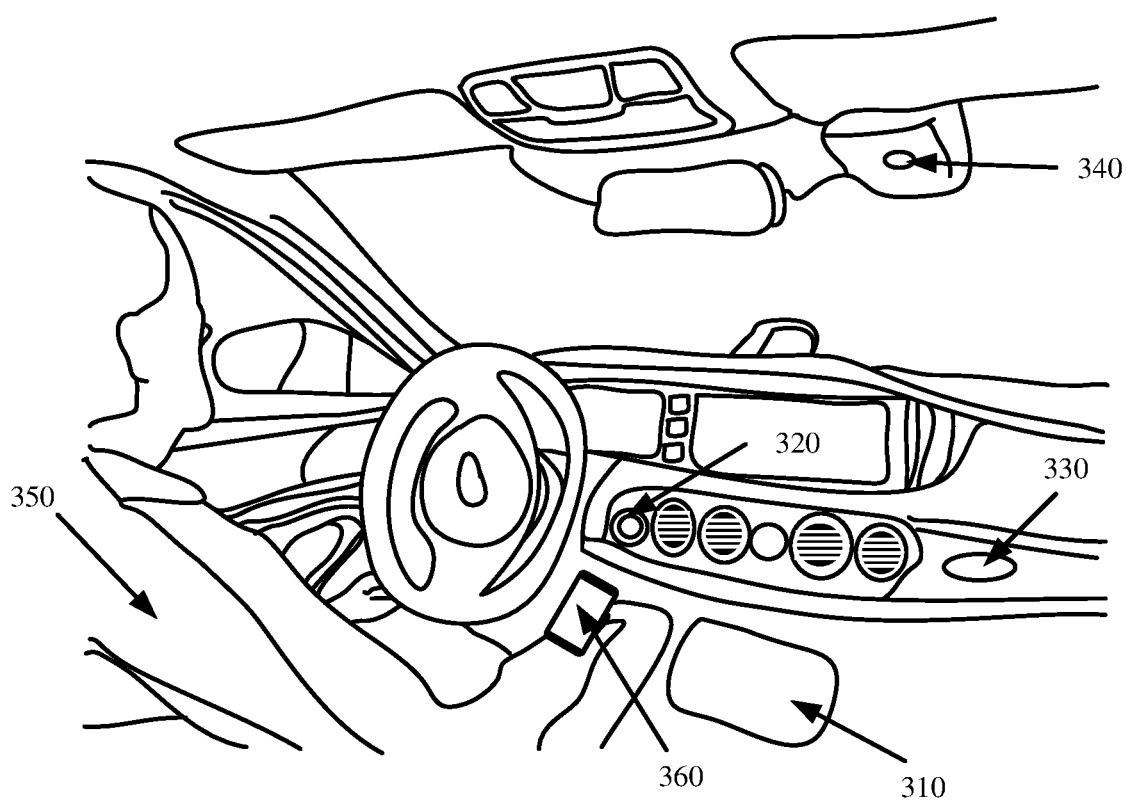
FIG. 3 is a schematic diagram of a smart vehicle-mounted scenario according to an embodiment.
Figure 4:
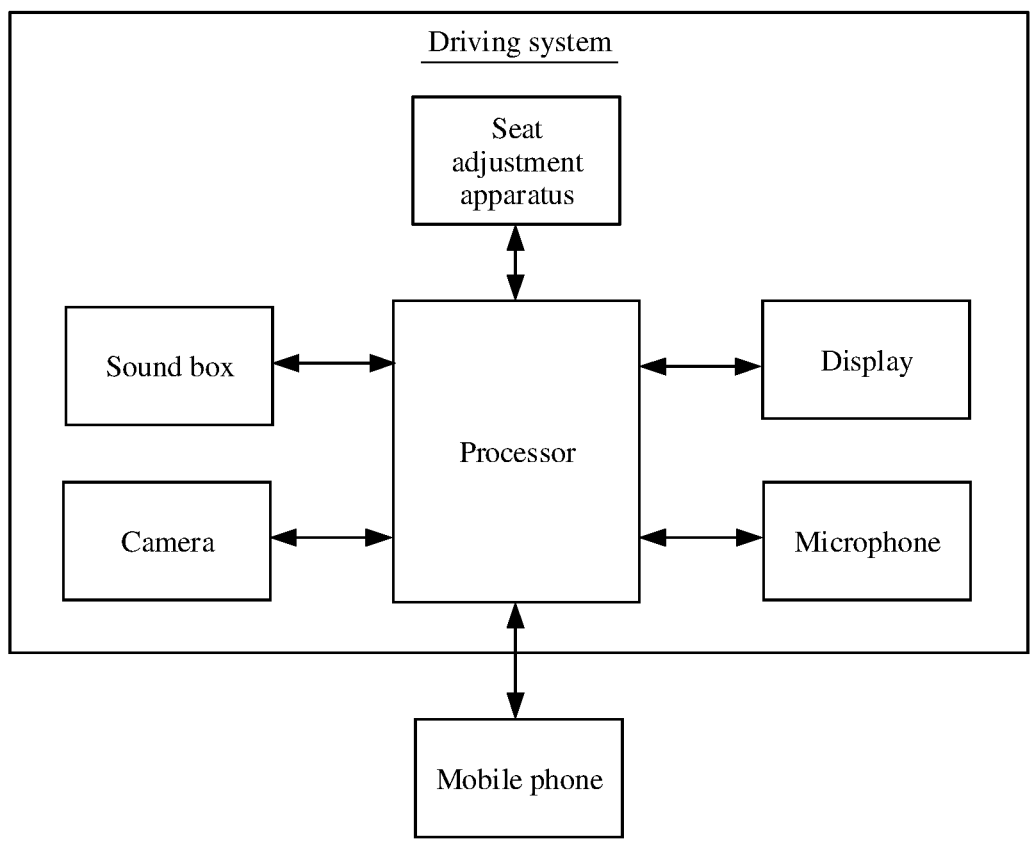
FIG. 4 is a schematic diagram of a smart vehicle-mounted scenario according to an embodiment.

FIG. 3 and FIG. 4 each show an application scenario according to an embodiment. The application scenario in FIG. 3 and FIG. 4 may also be referred to as a smart driving scenario. The application scenario in FIG. 3 and FIG. 4 may include an electronic device 300 and an electronic device 360. The electronic device 300 may include an apparatus 310, an apparatus 320, an apparatus 330, an apparatus 340, and an apparatus 350. The electronic device 300 may be a driving system. The apparatus 310 may be a display. The apparatus 320 may be a microphone. The apparatus 330 may be a sound box. The apparatus 340 may be a camera. The apparatus 350 may be a seat adjustment apparatus. The electronic device 360 may be a mobile phone, or a tablet computer. The electronic device 300 may receive data sent by the apparatus 310, the apparatus 320, the apparatus 330, the apparatus 340, and the apparatus 350. In addition, the electronic device 300 and the electronic device 360 may communicate with each other according to a wireless communication protocol. For example, the electronic device 300 may send a signal to the electronic device 360 or may receive a signal sent by the electronic device 360.

It should be noted that this embodiment may be applied to an application scenario including a driving system and a plurality of electronic devices. This is not limited.

In an example, the application scenario includes an apparatus 310, an electronic device 360, and an electronic device 300. The apparatus 310 is a display, the electronic device 360 is a mobile phone, and the electronic device 300 is a driving system. The driving system is configured to perform wireless communication with the mobile phone and is further configured to drive the display to light up a screen to display an image. A user may select, on the mobile phone, a video that the user wants to play, and send an indication to the driving system on the mobile phone, so that the driving system can drive the display to play the video.

In an example, the application scenario includes an apparatus 320, an apparatus 330, an electronic device 360, and an electronic device 300. The apparatus 320 is a microphone, the apparatus 330 is a sound box, the electronic device 360 is a mobile phone, and the electronic device 300 is a driving system. The driving system is configured to perform wireless communication with the mobile phone and is further configured to drive the microphone to collect a sound and drive the sound box to play audio. A user can make a call on the mobile phone. The mobile phone may indicate the driving system to start a call function. The driving system may drive the microphone to collect audio, and send the audio collected by the microphone to the mobile phone. The driving system may further receive call content sent by the mobile phone and drive the sound box to play the call content. In this way, the user can complete the call by using the vehicle-mounted microphone and the vehicle-mounted sound box. In addition, the driving system may send the audio captured by the microphone to the mobile phone, so that the mobile phone can perform voiceprint recognition on the audio.

In an example, the application scenario includes an apparatus 340, an electronic device 360, and an electronic device 300. The apparatus 340 is a camera, the electronic device 360 is a mobile phone, and the electronic device 300 is a driving system. The driving system is configured to perform wireless communication with the mobile phone and is further configured to drive the camera to photograph a scenario inside a vehicle and/or a scenario outside a vehicle. A user may indicate, on the mobile phone, the driving system to adjust a photographing parameter such as a photographing angle of the camera or quality of a photographed image. The driving system may drive, according to the indication from the mobile phone, the camera to adjust the photographing parameter. In addition, the driving system may send an image or video captured by the camera to the mobile phone, so that the mobile phone can perform facial recognition on the image or video.

In an example, the application scenario includes an apparatus 350, an electronic device 360, and an electronic device 300. The apparatus 350 is a seat adjustment apparatus, the electronic device 360 is a mobile phone, and the electronic device 300 is a driving system. The driving system is configured to perform wireless communication with the mobile phone and is further configured to adjust a setting parameter of the seat adjustment apparatus. The setting parameter of the seat adjustment apparatus may be, for example, a seat back angle, a seat back temperature, or a seat cushion temperature. A user may indicate, on the mobile phone, the driving system to adjust the setting parameter of the seat adjustment apparatus, for example, enable a seat cushion heating mode. The driving system may drive, according to the indication from the mobile phone, the seat adjustment apparatus to perform adjustment, for example, drive a heating module in the seat adjustment apparatus to heat a seat cushion.

In the smart household scenario and the smart vehicle-mounted scenario, the user can deliver an instruction by using an electronic device, so that another electronic device in the scenario can perform an operation corresponding to the instruction. In addition, the user can collect identity verification information by using one electronic device and recognize the identity verification information by using another electronic device in the scenario. In other words, identity verification information collection and identity verification information recognition may be separately completed by using two different electronic devices in the same scenario. Because types and functions of the two electronic devices may be different, problems such as that the collected identity verification information is difficult to recognize, or quality of the collected identity verification information is poor may occur. Therefore, a method needs to be provided, so that the user can obtain better experience in an identity verification process.

Figure 5:
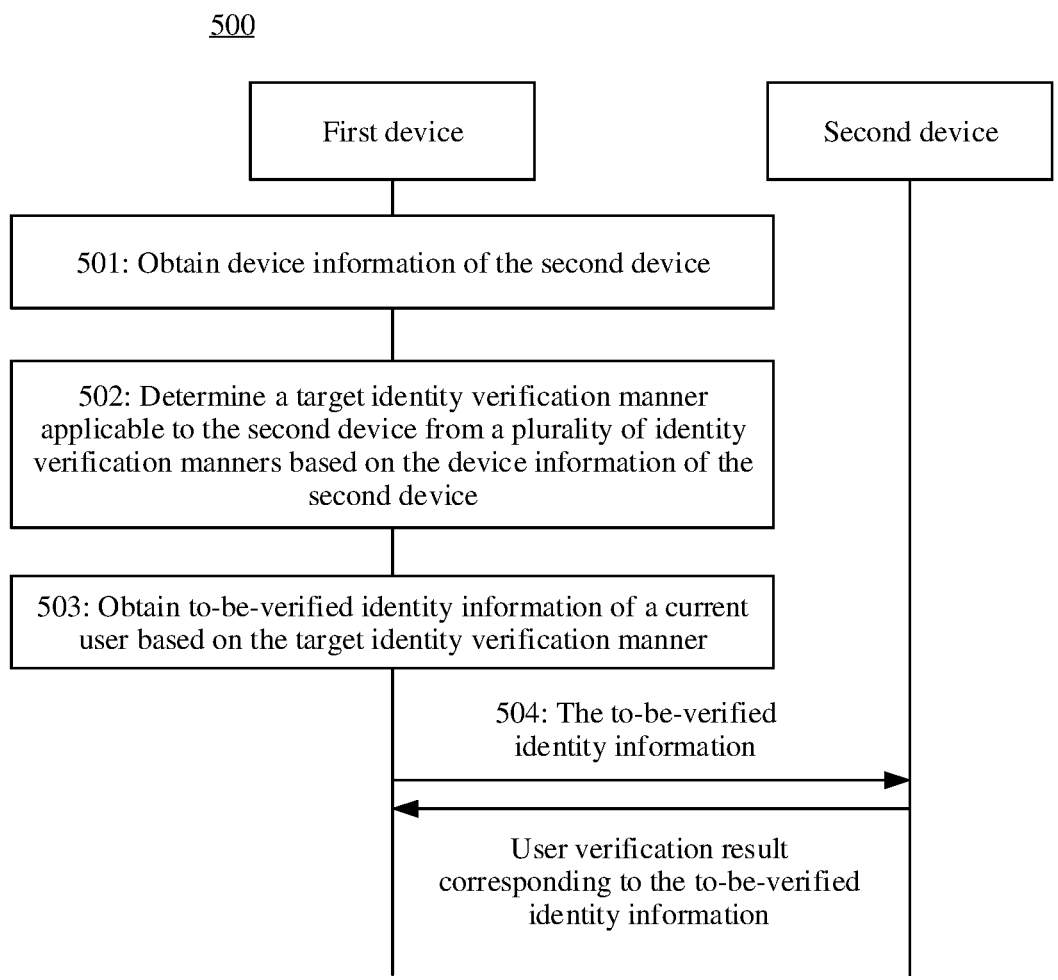
FIG. 5 is a schematic flowchart of a user identity verification method according to an embodiment.

FIG. 5 is a schematic flowchart of a user identity verification method according to an embodiment.

501: A first device obtains device information of a second device.

The first device may be, for example, a television, a sound box, a monitor device, a fingerprint recognition apparatus, a driving system, a watch, or a smart body fat scale. The driving system may further include a display, a camera, a microphone, a seat adjustment apparatus, a seat sensor, a fingerprint recognition apparatus, a sound box, and the like.

The second device may be, for example, a portable electronic device such as a mobile phone or a tablet computer. The second device may be a desktop computer or the like.

Device information is used to describe a hardware parameter, a device type, wireless transmission information, a device function, and the like of a device.

In other words, the device information of the second device includes a hardware parameter, a device type, wireless transmission information, a device function, and the like of the second device.

Optionally, the device information of the second device includes at least one of the following: a hardware parameter of the second device, device type information of the second device, wireless transmission information of the second device, and an identity verification manner enabled by the second device.

The hardware parameter of the second device may be used to indicate at least some hardware installed on the second device and a parameter of the hardware. For example, the first device may determine, based on the device information of the second device, that the second device includes hardware such as a front-facing camera, a rear-facing camera, a fingerprint sensor, a microphone, a processor, and a memory, photographing pixels of the front-facing camera in the second device are 24 megapixels, photographing pixels of the rear-facing camera in the second device are 40 megapixels, the fingerprint sensor in the second device is an optical fingerprint sensor, the microphone in the second device is a noise-canceling microphone, the processor in the second device includes an NPU, and a capacity of the memory in the second device is 128 gigabytes (GB).

The device type of the second device may be, for example, a mobile phone, a tablet computer, or a desktop computer.

The wireless transmission information of the second device may include a wireless communications network available to the second device, for example, may be a wireless local area network (WLAN), Bluetooth, or a mobile communications network. The wireless transmission information of the second device may further include a version number of a wireless communication protocol, for example, wireless fidelity (Wi-Fi) 2.4 GHz, Wi-Fi 5 GHz, 4G mobile communication, 5G mobile communication, Bluetooth 4.0, or Bluetooth 5.0.

The device function of the second device may be used to indicate a function that can be implemented by the second device. The device function of the second device may include an identity verification function enabled by the second device.

For example, the function that can be implemented by the second device may include capturing a sound around the device and performing noise canceling on the sound. For another example, the function that can be implemented by the second device may include recognizing an image and determining a label of the image (for example, marking an object in the image, or a gender and a wearing of a person in the image). The identity verification manner enabled by the second device may be, for example, a voiceprint recognition manner, a facial recognition manner, a fingerprint recognition manner, or a soft biometric trait recognition manner.

It should be noted that, to enable the second device to implement a function, the second device needs to include a module corresponding to the function. For example, if the second device can perform voiceprint recognition, the second device usually includes a microphone. For another example, if the second device can perform facial recognition, the second device usually includes a front-facing camera. For another example, if the second device can perform fingerprint recognition, the second device usually includes a fingerprint sensor. However, in some scenarios, even if the second device includes an apparatus, the second device may not be able to implement a function corresponding to the apparatus. For example, the second device includes a microphone, but the second device does not enter or cannot obtain a voiceprint template used to match a user voiceprint, and therefore the second device cannot implement a voiceprint recognition manner. For another example, the second device includes a camera, but the second device does not enter or cannot obtain a facial template used to match a user face, and therefore the second device cannot implement a facial recognition manner. For another example, the second device includes a fingerprint sensor, but the second device does not enter or cannot obtain a fingerprint template used to match a user fingerprint, and therefore the second device cannot implement a fingerprint recognition manner.

A manner in which the first device obtains the device information of the second device is not limited in this embodiment. For example, a memory in the first device may store the device information of the second device. That the first device obtains the device information of the second device may indicate that the first device reads the device information of the second device stored in the memory. For another example, that the first device obtains the device information of the second device may be that the first device receives the device information of the second device sent by the second device. For another example, that the first device obtains the device information of the second device may be that the first device receives the device information of the second device from a cloud server based on a device model of the second device.

Optionally, the method further includes: The second device updates the device information of the second device.

In an example, when the hardware parameter of the second device changes, the second device may update the device information of the second device. For example, when a quantity of hardware in the second device changes or hardware performance changes, the second device may update the device information of the second device.

For example, the second device originally includes a microphone, but the microphone in the second device is currently damaged, and as a result, the second device cannot record audio through the microphone. In this case, the second device may update the device information of the second device. The device information of the second device before the update may indicate that the second device includes the microphone, and device information of the second device after the update indicates that the second device does not include a microphone.

For another example, the second device originally includes a microphone without a noise-canceling function, but the second device is currently provided with an apparatus for improving noise-canceling performance of the microphone, so that the second device can record audio with less noise through the microphone. In this case, the second device may update the device information of the second device. the device information of the second device before the update may indicate that the second device includes the microphone without the noise-canceling function, and device information of the second device after the update indicates that the second device includes a microphone with a noise-canceling function.

In an example, when the device function of the second device changes, the second device may update the device information of the second device. For example, when the device functions of the second device increase or decrease, the second device may update the device information of the second device.

For example, the second device includes a front-facing camera, but a processor in the second device cannot perform facial recognition on an image obtained by the front-facing camera. After a device system is updated once, the processor in the second device may perform facial recognition on the image obtained by the front-facing camera. In this case, the second device may update the device information of the second device. The device information of the second device before the update may indicate that the identity verification manner enabled by the second device does not include the facial recognition manner, and device information of the second device after the update indicates that an identity verification manner enabled by the second device includes a facial recognition manner.

For another example, the second device includes a front-facing camera, and a processor in the second device can perform facial recognition based on an image obtained by the front-facing camera, but the second device does not enter or cannot obtain a facial recognition template used to match a user, and therefore cannot compare the image obtained by the front-facing camera with the facial recognition template. After the second device enters or obtains the facial recognition template, the second device may enable a facial recognition manner. In this case, the second device may update the device information of the second device. The device information of the second device before the update may indicate that the identity verification manner enabled by the second device does not include a facial recognition manner, and device information of the second device after the update indicates that an identity verification manner enabled by the second device includes a facial recognition manner.

502: The first device determines a target identity verification manner applicable to the second device from a plurality of identity verification manners based on the device information of the second device.

The plurality of identity verification manners may include a facial recognition manner, a voiceprint recognition manner, a fingerprint recognition manner, a soft biometric trait recognition manner, and the like.

A soft biometric trait may indicate a common biometric trait presented by a user. In other words, a user cannot be uniquely determined from a large quantity of users (for example, a population of an entire country) only by using a single soft biometric trait. A user can be uniquely determined from a large quantity of users by using only a fingerprint, only a face, or only a voiceprint. Therefore, none of the facial recognition manner, the voiceprint recognition manner, and the fingerprint recognition manner belongs the soft biometric trait recognition manner. The soft biometric trait may include a gender, an age, a height, a weight, an accent, a walking posture, a hairstyle, a hair color, a tattoo, and the like.

An electronic device may determine a soft biometric trait of a user by using an image and/or a sound.

For example, the electronic device may recognize a gender, an age, a height, a weight, a walking posture, a hairstyle, a hair color, a tattoo, and the like of the user in the image by using an image recognition technology.

For another example, the electronic device may recognize a gender, an age, an accent, and the like of a speaker by using a voice recognition technology.

For another example, the electronic device may recognize a weight of the user by using a seat sensor, a pressure sensor of a smart body fat scale, or the like.

For another example, the electronic device may recognize a gender and an age of the user by using a metal electrode of a smart body fat scale.

It should be noted that a user can be uniquely determined from a group with a small quantity of people through one or more soft biometric traits.

For example, a family includes a father, a mother, and a son. The son may be uniquely determined from the father, the mother, and the son by an age.

For another example, a department of a company includes an employee 1, an employee 2, an employee 3, and an employee 4 of a similar age. The employee 1, the employee 2, the employee 3 are males, and the employee 4 is a female. The employee 1 has a northeast accent, black hair, and a height of 175 cm. The employee 2 has no accent, black hair, and a height of 180 cm. The employee 3 has no accent, yellow hair, and a height of 176 cm. One or more of the soft biometric traits of a gender, a height, a hair color, and an accent can be used for identity verification, so that a member of the department of the company can be uniquely recognized.

For another example, there is a father, a mother, and a son in a household vehicle. An identity of a passenger on a seat may be recognized by using a weight sensor on the seat.

The first device can implement the plurality of identity verification manners. For the second device, there is a preferable identity verification manner in the plurality of identity verification manners. Therefore, the first device can select the identity verification manner from the plurality of identity verification manners based on the device parameter of the second device.

For example, the first device is a driving system, and the second device is a mobile phone. The driving system includes a seat adjustment apparatus, a camera, and a microphone. The seat adjustment apparatus may capture a seat parameter used by a user in a driving process. The camera may photograph an image (for example, including one or more of a face, a body, a tattoo, and a hairstyle) that includes a biometric trait of the user. The microphone may capture a voice of the user (for example, including one or more of a voiceprint or an accent feature). Therefore, the driving system can obtain data required for voiceprint recognition and soft biometric trait recognition. Data required for soft biometric trait recognition includes audio collected by the microphone and the seat parameter collected by the seat adjustment apparatus. Device information of the mobile phone indicates that the mobile phone includes an NPU, and the NPU can improve processing efficiency of soft biometric trait recognition. Therefore, for the mobile phone, the soft biometric trait recognition manner is better than a voiceprint recognition manner. The driving system may determine the soft biometric trait recognition manner from the voiceprint recognition manner and the soft biometric trait recognition manner as a target identity verification manner based on the device information of the mobile phone.

For another example, the first device is a television, and the second device is a mobile phone. The television includes a camera and a microphone. The camera in the television may photograph an image (for example, including one or more of a face, a body, a tattoo, and a hairstyle) that includes a biometric trait of the user. The microphone in the television may capture a voice of the user (for example, including one or more of a voiceprint or an accent feature). Therefore, the television can obtain data required for facial recognition, voiceprint recognition, and soft biometric trait recognition. Device information of the mobile phone indicates that wireless transmission information of the mobile phone is 4G mobile communication. A volume of data to be collected for soft biometric trait recognition is greater than a volume of data to be collected for facial recognition, and the volume of data to be collected for facial recognition is greater than a volume of data to be collected for voiceprint recognition. To reduce a data volume of user verification data received by the mobile phone, the television may determine the facial recognition manner from the facial recognition manner, the voiceprint recognition manner, and the soft biometric trait recognition manner as a target identity verification manner based on the device information of the mobile phone.

For another example, the first device is a sound box, and the second device is a mobile phone. The sound box includes a microphone. The microphone in the sound box may capture a voice of a user (for example, including one or more of a voiceprint or an accent feature). Therefore, the sound box can obtain data required for voiceprint recognition and soft biometric trait recognition. Device information of the mobile phone indicates that a device type is the mobile phone, and an enabled identity verification manner includes a voiceprint recognition manner and a soft biometric trait recognition manner. Generally, to meet a call quality requirement of the mobile phone, accuracy of a microphone disposed on the mobile phone is high, and therefore accuracy of voiceprint recognition is high. However, there are a small quantity of soft biometric traits that can be recognized through only a sound, and therefore accuracy of soft biometric trait recognition is low. Therefore, the sound box can determine the voiceprint recognition manner from the voiceprint recognition manner and the soft biometric trait recognition manner as a target identity verification manner based on the device information of the mobile phone.

For another example, the first device is a driving system, and the second device is a mobile phone. The driving system includes a seat adjustment apparatus, a camera, and a microphone. The seat adjustment apparatus may capture a seat parameter used by a user in a driving process. The camera may photograph an image (for example, including one or more of a face, a body, a tattoo, and a hairstyle) that includes a biometric trait of the user. The microphone may capture a voice of the user (for example, including one or more of a voiceprint or an accent feature). Therefore, the driving system can obtain data required for facial recognition, voiceprint recognition, and soft biometric trait recognition. Device information of the mobile phone indicates that an identity verification manner enabled by the mobile phone includes a facial recognition manner. Therefore, the driving system can determine the facial recognition manner from the facial recognition manner, the voiceprint recognition manner, and the soft biometric trait recognition manner as the target identity verification manner based on the device information of the mobile phone.

Optionally, that the first device determines the target identity verification manner applicable to the second device from the plurality of identity verification manners based on the device information of the second device includes: The first device determines the target identity verification manner from the plurality of identity verification manners based on the device information of the second device, and device information of the first device and/or at least one piece of verification manner information.

In other words, in addition to the device information of the second device, the first device may also consider the device information of the first device, and/or an attribute of a verification manner, to comprehensively determine the identity verification manner most appropriate for the first device and the second device.

Similar to the device information of the second device, the device information of the first device may include a hardware parameter, a device type, wireless transmission information, a device function, and the like of the first device.

Optionally, the device information of the first device includes at least one of the following: device type information of the first device; wireless transmission information of the first device; an identity verification manner enabled by the first device; and information about at least one module in the first device, where the at least one module is configured to perform a first identity verification manner, and the first identity verification manner is any one of the plurality of identity verification manners.

It should be understood that a module may include a hardware module and a software module.

The hardware parameter of the first device may be used to indicate at least some hardware installed on the first device and a parameter of the hardware.

For example, the first device is a television, and includes a processor, a memory, a display, a camera, and a microphone. The device information of the first device may further indicate parameters of the processor, the memory, the display, the camera, and the microphone. For example, the processor is a dual-core processor, a capacity of the memory is 256 GB, the display is 65 inches, photographing pixels of the camera are 8 megapixels, and the microphone is a dynamic microphone.

For another example, the first device is a sound box, and includes a processor, a memory, and a microphone. The device information of the first device may further indicate parameters of the processor, the memory, and the microphone. For example, the processor is a dual-core processor, a capacity of the memory is 256 GB, and the microphone is a dynamic microphone.

For another example, the first device is a monitor device, and includes a processor, a memory, and a camera. The device information of the first device may further indicate parameters of the processor, the memory, and the camera. For example, the processor is a dual-core processor, a capacity of the memory is 128 GB, and photographing pixels of the camera are 16 megapixels.

For another example, the first device is a watch, and includes a processor, a memory, a pulse detection apparatus, and an acceleration sensor. The device information of the first device may further indicate parameters of the processor, the memory, the pulse detection apparatus, and the acceleration sensor. For example, the processor is a single-core processor, a capacity of the memory is 1 GB, the pulse detection apparatus is a photoelectric pulse detection apparatus, and the acceleration sensor is a 6-axis acceleration sensor.

For another example, the first device is a fingerprint recognition apparatus, and includes a processor, a memory, and a fingerprint sensor. The device information of the first device may further indicate parameters of the processor, the memory, and the fingerprint sensor. For example, the processor is a single-core processor, a capacity of the memory is 1 GB, and the fingerprint sensor is an optical fingerprint sensor.

For another example, the first device is a smart body fat scale, and includes a processor, a Bluetooth antenna, a pressure sensor, and a metal electrode. The device information of the first device may further indicate the processor, the memory, the pressure sensor, and the metal electrode. For example, the processor includes a storage capacity of 2 MB, and a version number of the Bluetooth antenna is Bluetooth 4.0.

For another example, the first device is a driving system, and includes a processor, a memory, a display, a camera, a microphone, a seat adjustment apparatus, a seat sensor, and a sound box. The device information of the first device may further indicate parameters of the processor, the memory, the display, the camera, the microphone, the seat adjustment apparatus, the seat sensor, and the sound box. For example, the processor is a dual-core processor, a capacity of the memory is 256 GB, the display is a touchscreen, photographing pixels of the camera are 16 megapixels, the microphone is a dynamic microphone, the seat adjustment apparatus is adjusted by using a mechanical seat, the seat sensor is a thin film contact sensor, and the sound box is a Bluetooth speaker.

The device type of the first device may be, for example, a television, a sound box, a monitor device, a fingerprint recognition apparatus, a driving system, or a watch. An identity verification manner that can be implemented by the first device may be roughly deduced based on the device type of the first device.

The wireless transmission information of the first device may include a wireless communications network available to the first device, for example, may be a wireless local area network (WLAN) or Bluetooth. The wireless transmission information of the first device may further include a version number of a wireless communication protocol, for example, wireless fidelity (Wi-Fi) 2.4 GHz, Wi-Fi 5 GHz, Bluetooth 4.0, or Bluetooth 5.0.

A device function of the first device may be used to indicate a function that can be implemented by the first device. The device function of the first device may include an identity verification function enabled by the first device.

For example, the function that can be implemented by the first device may include capturing a sound around the device and performing noise canceling on the sound. For another example, the function that can be implemented by the first device may include capturing an image around the device, and performing processing such as noise-canceling, compression, and cropping on the image. The identity verification manner enabled by the first device may be, for example, a voiceprint recognition manner, a facial recognition manner, a fingerprint recognition manner, or a soft biometric trait recognition manner.

If the first device can implement a function, the first device usually needs to include a module corresponding to the function.

For example, to perform a facial recognition manner, the first device usually includes a front-facing camera. That is, the front-facing camera may be configured to perform the facial recognition manner.

For another example, to perform a voiceprint recognition manner, the first device usually includes a microphone. That is, the microphone may be configured to perform the voiceprint recognition manner.

For another example, to perform a fingerprint recognition manner, the first device usually includes a fingerprint sensor. That is, the fingerprint sensor may be configured to perform the fingerprint recognition manner.

For another example, to perform a soft biometric trait recognition manner, the first device usually includes one or more of a camera, a microphone, a seat sensor, or a smart body fat scale. That is, one or more of the camera, the microphone, the seat sensor, and the smart body fat scale may be used to perform the soft biometric trait recognition manner.

A manner in which the first device obtains the device information of the second device is not limited in this embodiment. For example, a memory in the first device may store the device information of the second device. That the first device obtains the device information of the second device may indicate that the first device reads the device information of the second device stored in the memory. For another example, that the first device obtains the device information of the second device may be that the first device receives the device information of the second device sent by the second device. For another example, that the first device obtains the device information of the first device may be that the first device receives the device information of the second device from a cloud server based on a device model of the second device.

Optionally, the method further includes: The first device updates the device information of the first device.

In an example, when the hardware parameter of the first device changes, the first device may update the device information of the first device. For example, when a quantity of hardware in the first device changes or hardware performance changes, the first device may update the device information of the first device.

For example, the first device originally includes a microphone, but the microphone in the first device is currently damaged, and as a result, the first device cannot record audio through the microphone. In this case, the first device may update the device information of the first device. The device information of the first device before the update indicates that the first device includes the microphone, and device information of the first device after the update indicates that the first device does not include a microphone.

For another example, the first device originally includes a microphone without a noise-canceling function, but the first device is currently provided with an apparatus for improving noise-canceling performance of the microphone, so that the first device can record audio with less noise through the microphone. In this case, the first device may update the device information of the first device. The device information of the first device before the update indicates that the first device includes the microphone without the noise-canceling function, and device information of the first device after the update indicates that the first device includes a microphone with a noise-canceling function.

In an example, when the device function of the first device changes, the first device may update the device information of the first device. For example, when device functions of the first device increase or decrease, the first device may update the device information of the first device.

For example, quality of audio captured by the first device is improved after a device system is updated once. In this case, the first device may update the device information of the first device. The quality of audio indicated by device information of the first device after the update may be higher than the quality of the audio indicated by the device information of the first device before the update.

For another example, the first device includes a front-facing camera, but the first device cannot generate, based on an image obtained by the front-facing camera, identity verification information used for facial recognition. After the first device enters or obtains a facial recognition template, the first device may generate, based on the image obtained by the front-facing camera, the identity verification information used for facial recognition. In this case, the first device may update the device information of the first device. The device information of the first device before the update may indicate that an identity verification manner enabled by the first device does not include a facial recognition manner, and device information of the first device after the update indicates that an identity verification manner enabled by the first device includes a facial recognition manner.

Verification manner information may indicate an attribute of the verification manner.

Optionally, the at least one piece of verification manner information includes at least one of the following: a plurality of pieces of accuracy information that are in a one-to-one correspondence with the plurality of identity verification manners; a plurality of pieces of user experience information that are in a one-to-one correspondence with the plurality of identity verification manners; a plurality of pieces of technology maturity information that are in a one-to-one correspondence with the plurality of identity verification manners; and a plurality of pieces of verification environment information that are in a one-to-one correspondence with the plurality of identity verification manners.

For example, a face changes with time due to reasons such as fatness, thinness, and aging, and therefore stability of a facial recognition manner is average. A user can complete facial recognition based on a complete face of the user photographed by using a camera, and therefore convenience of facial recognition is relatively good. In the facial recognition process, an image of the face needs to be recognized, and a data volume of the image is large, and therefore facial recognition takes relatively long time, and efficiency is average. It can be considered that user experience of facial recognition is good based on convenience and efficiency of facial recognition. Because facial recognition is applied to a wide range of scenarios, costs of facial recognition are low and technology maturity is high. Accuracy of facial recognition is improved as accuracy of the camera is improved.

For another example, a voiceprint usually changes due to a cold or a voice change, and therefore stability of a voiceprint recognition manner is poor. It is inconvenient for a user to speak in many scenarios, and therefore convenience of voiceprint recognition is average. In the voiceprint recognition process, a voice of the user needs to be recognized, and a data volume of audio is large, and therefore the voiceprint recognition takes a long time, and efficiency is average. It can be considered that user experience of voiceprint recognition is average based on convenience and efficiency of voiceprint recognition. Because voiceprint recognition is applied to a limited range of scenarios, costs of voiceprint recognition are high and technology maturity is average. Accuracy of voiceprint recognition is improved as accuracy of a microphone is improved and/or a noise-canceling effect of a microphone is improved.

For another example, a fingerprint usually does not change, and therefore stability of a fingerprint recognition manner is good. A user only needs to place a finger on a fingerprint sensor to complete fingerprint recognition, and therefore convenience of fingerprint recognition is good. In the fingerprint recognition process, a small volume of data needs to be processed, and therefore fingerprint recognition takes short time. It can be considered that user experience of fingerprint recognition is excellent based on convenience and efficiency of fingerprint recognition. Because fingerprint recognition is applied to a wide range of scenarios, costs of fingerprint recognition are low and technology maturity is high. Accuracy of fingerprint recognition is improved as accuracy of the fingerprint sensor is improved.

For another example, a soft biometric trait is usually stable in a short period of time, but the soft biometric trait usually changes over time, for example, an age of a user changes with time, an accent of the user changes with different conversation scenarios, a height and a weight of the user change due to reasons such as fatness, thinness, and wearing, and a hairstyle and a hair color of the user change with preferences of the user; and therefore stability of soft biometric trait is poor. A same soft biometric trait may be collected in different manners, and therefore the soft biometric trait has high flexibility and convenience. A data volume required for soft biometric trait recognition may be large or small, and time consumed for soft biometric trait recognition is unstable, and therefore user experience of soft biometric trait recognition is average. Soft biometric trait recognition is applied to a group with a small quantity of people, and therefore technology maturity of soft biometric trait recognition needs to be improved. Accuracy of soft biometric trait recognition is average.

Manner 1: The first device determines the target identity verification manner from the plurality of identity verification manners based on the device information of the second device, and the device information of the first device.

For example, the first device is a television, and the second device is a mobile phone. The television includes a camera and a microphone. Photographing pixels of the camera are 8 megapixels, and the microphone is a noise-canceling microphone. A volume of audio data captured by the microphone is large, and audio quality is high. A volume of image data captured by the camera is small, and image quality is average. In a possible case, device information of the mobile phone indicates that wireless transmission information of the mobile phone is 4G mobile communication. To reduce a data volume of user verification data received by the mobile phone, the television may determine a facial recognition manner from the facial recognition manner and a voiceprint recognition manner as a target identity verification manner based on the device information of the mobile phone and device information of the television. In a possible case, device information of the mobile phone indicates that wireless transmission information of the mobile phone is Wi-Fi 2.4 GHz. To improve accuracy of identity verification, the television may determine a voiceprint recognition manner from a facial recognition manner and the voiceprint recognition manner as a target identity verification manner based on the device information of the mobile phone and device information of the television.

For another example, the first device is a driving system, and the second device is a mobile phone. The driving system includes a seat adjustment apparatus, a camera, and a microphone. The seat adjustment apparatus may capture a seat parameter and a weight that are used by a user in a driving process. The camera may photograph an image (for example, including one or more of a face, a body, a tattoo, and a hairstyle) that includes a biometric trait of the user. The microphone may capture a voice of the user (for example, including one or more of a voiceprint or an accent feature). In a possible case, for a driver, the seat adjustment apparatus may be in a real-time detection state, and persons of different heights and weights usually have different driver seat use habits. For example, a distance between a seat and a pedal and an angle of a seat backrest may be adjusted. Device information of the mobile phone indicates that an identity verification manner enabled by the mobile phone includes a facial recognition manner and a soft biometric trait recognition manner. The driving system may determine the soft biometric trait recognition manner from the facial recognition manner, a voiceprint recognition manner, and the soft biometric trait recognition manner as a target identity verification manner based on the device information of the mobile phone. In a possible case, photographing pixels of the camera are high, and quality of audio recorded by the microphone is high. The device information of the mobile phone indicates that the mobile phone includes an NPU used for image recognition. Therefore, the mobile phone can implement facial recognition with higher accuracy and efficiency. The driving system can determine the facial recognition manner from the facial recognition manner, a voiceprint recognition manner, and a soft biometric trait recognition manner as a target identity verification manner based on the device information of the mobile phone.

Manner 2: The first device determines the target identity verification manner from the plurality of identity verification manners based on the device information of the second device, and the at least one piece of verification manner information.

For example, the first device is a television, and the first device is a mobile phone. The television includes a camera and a microphone. The camera may photograph an image (for example, including one or more of a face, a body, a tattoo, and a hairstyle) that includes a biometric trait of a user. The microphone may capture a voice of the user (for example, including one or more of a voiceprint or an accent feature). Therefore, the television can obtain data required for facial recognition, voiceprint recognition, and soft biometric trait recognition. Device information of the mobile phone indicates that an identity verification manner enabled by the mobile phone includes a facial recognition manner and a voiceprint recognition manner. Because user experience of facial recognition is better, the television may determine the facial recognition manner from the facial recognition manner, the voiceprint recognition manner, and the soft biometric trait recognition manner as a target identity verification manner based on the device information of the mobile phone.

For another example, the first device is a driving system, and the second device is a mobile phone. The driving system includes a seat adjustment apparatus, a camera, and a microphone. The seat adjustment apparatus may capture a seat parameter and a weight that are used by a user in a driving process. The camera may photograph an image (for example, including one or more of a face, a body, a tattoo, and a hairstyle) that includes a biometric trait of the user. The microphone may capture a voice of the user (for example, including one or more of a voiceprint or an accent feature). Device information of the mobile phone indicates that an identity verification manner enabled by the mobile phone includes a voiceprint recognition manner and a soft biometric trait recognition manner. Because there is a small quantity of people in a vehicle, a data volume required for recognition in the soft biometric trait recognition manner is small Therefore, the driving system can determine the soft biometric trait recognition manner from a facial recognition manner, the voiceprint recognition manner, and the soft biometric trait recognition manner as a target identity verification manner based on the device information of the mobile phone.

Manner 3: The first device determines the target identity verification manner from the plurality of identity verification manners based on the device information of the second device, the device information of the first device, and the at least one verification manner.

The first device may determine, based on the device information of the second device, a plurality of first weight values that are in a one-to-one correspondence with the plurality of identity verification manners. The first device may determine, based on the device information of the first device, a plurality of second weight values that are in a one-to-one correspondence with the plurality of identity verification manners. The first device may determine, based on the at least one verification manner, a plurality of third weight values that are in a one-to-one correspondence with the plurality of identity verification manners. The first device may determine, based on the plurality of first weight values, the plurality of second weight values, and the plurality of third weight values, a plurality of first total weight values that are in a one-to-one correspondence with the plurality of identity verification manners. The first device may determine, based on a target first weight value, a target second weight value, and a target third weight value, a first total weight value corresponding to a third identity verification manner. The target first weight value, the target second weight value, and the target third weight value each correspond to the third identity verification manner, and the third identity verification manner is any one of the plurality of identity verification manners. The first device sorts the plurality of first total weight values and determines an identity verification manner corresponding to a first total weight value with the largest value as the target identity verification manner.

Table 1 shows weight parameters of device information of the second device, a weight parameter of device information of the first device, and a weight parameter of verification manner information that correspond to a facial recognition manner.

TABLE 1

| Identity verification manner enabled by the second device | 1 |
| Wireless transmission manner of the second device | 0.7 |
| Camera of the first device | 0.8 |
| Verification information of the facial recognition manner | 0.9 |

Then, a first overall weight value corresponding to the facial recognition manner=1×0.7×0.8×0.9=0.504.

Table 2 shows weight parameters of device information of the second device, a weight parameter of device information of the first device, and a weight parameter of verification manner information that correspond to a voiceprint recognition manner.

TABLE 2

| Identity verification manner enabled by the second device | 0 |
| Wireless transmission manner of the second device | 0.7 |
| Microphone of the first device | 0.9 |
| Verification information of the voiceprint recognition manner | 0.6 |

Then, a first overall weight value corresponding to the voiceprint recognition manner=0×0.7×0.9×0.6=0.

Table 3 shows weight parameters of device information of the second device, a weight parameter of device information of the first device, and a weight parameter of verification manner information that correspond to a soft biometric trait recognition manner.

TABLE 3

| Identity verification manner enabled by the second device | 1 |
| Wireless transmission manner of the second device | 0.7 |
| Camera of the first device | 0.8 |
| Microphone of the first device | 0.9 |
| Verification information of the soft biometric trait recognition manner | 0.8 |

Then, a first overall weight value corresponding to the soft biometric trait recognition manner=1×0.7×(0.8+0.9)/2×0.8=0.476.

The first device may determine the facial recognition manner as the target recognition manner based on the first overall weight value corresponding to the facial recognition manner, the first overall weight value corresponding to the voiceprint recognition manner, and the first overall weight value corresponding to the soft biometric trait recognition manner.

A value of a first weight value corresponding to the device information of the second device is not limited. A value of a second weight value corresponding to the device information of the first device is not limited. A value of a third weight value corresponding to the information of the verification manner is not limited. A manner of determining a first overall weight value corresponding to an identity verification manner is not limited.

503: The first device obtains to-be-verified identity information of a current user based on the target identity verification manner.

For example, when the target identity verification manner is a facial recognition manner, the first device may drive a camera to capture a face image of the current user. The to-be-verified identity information may include the face image.

For another example, when the target identity verification manner is the voiceprint verification manner, the first device may drive a microphone to capture voice audio of the current user. The to-be-verified identity information may include the voice audio.

For another example, when the target identity verification manner is a fingerprint recognition manner, the first device may drive a fingerprint sensor to capture a fingerprint image of the current user. The to-be-verified identity information may include the fingerprint image.

For another example, when the target identity verification manner is a soft biometric trait recognition manner, the first device may drive a camera to capture an image to capture a body shape, an appearance, and the like of the user; and/or the first device may further drive a microphone to record audio to capture a voice of the current user; and/or the first device may further drive a seat sensor to collect weight data to detect a weight of the user. The to-be-verified identity information may include one or more of the image, the audio, or the body weight data.

504: The first device sends the to-be-verified identity information to the second device and receives a user verification result that is sent by the second device and that corresponds to the to-be-verified identity information.

Correspondingly, the second device receives the to-be-verified identity information and determines the user verification result corresponding to the to-be-verified identity information.

In other words, the second device may match the to-be-verified identity information with a recognition template of a target user. If the matching succeeds, the second device may send, to the first device, the user verification result used to indicate that the matching succeeds. If the matching fails, the second device may send, to the first device, the user verification result used to indicate that the matching fails.

Optionally, the method further includes: The first device indicates the target identity verification manner to the second device.

In other words, the first device may send indication information, so that the second device can determine the identity verification manner used by the first device.

For example, if the to-be-verified identity information is an image, the first device may indicate the second device to perform recognition in a soft biometric trait recognition manner. The second device may preferably recognize the to-be-verified identity information in the soft biometric trait recognition manner according to the indication from the first device, instead of preferably recognizing the to-be-verified identity information in a facial recognition manner.

For another example, if the to-be-verified identity information is audio, the first device may indicate the second device to perform recognition in a voiceprint recognition manner. The second device may preferably recognize the to-be-verified identity information in the voiceprint recognition manner according to the indication from the first device, instead of preferably recognizing the to-be-verified identity information in a soft biometric trait recognition manner.

For manners of implementing facial recognition, voiceprint recognition, fingerprint recognition, and soft biometric trait recognition, refer to the conventional technology. Details are not described herein.

Optionally, the method further includes: When the to-be-verified identity information successfully matches the target user, the first device performs, according to an indication from the second device, a target operation that matches the target user.

In other words, when the to-be-verified identity information of the current user matches the identity information of the target user, the current user can be considered as the target user. The second device may indicate the target operation to the first device, and the first device performs the target operation, so as to provide a personalized service for the target user.

For example, the second device is a television, and the first device is a mobile phone. When the to-be-verified identity information of the current user matches the target user, the mobile phone sends, to the television, a list of videos that the target user prefers. The television may present the video list to the current user, so that the user can quickly determine a to-be-watched video.

For another example, the second device is a sound box, and the first device is a mobile phone. When the to-be-verified identity information of the current user matches the target user, the mobile phone sends, to the sound box, a list of audio that the target user prefers. The sound box may present the audio list to the current user, so that the user can quickly determine to-be-listened-to audio.

For another example, the second device is a monitor device, and the first device is a mobile phone. When the to-be-verified identity information of the current user matches the target user, the mobile phone sends, to the monitor device, an amplification rate and a photographing angle that are commonly used by the target user. The monitor device may perform photographing by using the commonly used amplification rate and photographing angle, so that the user does not need to adjust a photographing parameter of the monitor device or only needs to fine-tune a photographing parameter of the monitor device.

For another example, the second device is a driving system, the first device is a mobile phone, and the driving system includes a display and a driving adjustment apparatus. When the to-be-verified identity information of the current user matches the target user, the mobile phone sends, to the driving system, a seat adjustment parameter commonly used by the target user and a video last played by the target user. The driving system may adjust a seat by using the driving adjustment apparatus, and display, on the display, whether to continue to observe the video played last time, so that the user does not need to adjust the seat or only needs to fine-tune the seat, and the user can continue to watch the video that is not completely watched last time.

Optionally, the method further includes: The first device sends behavior information of the current user to the second device.

That is, the second device may obtain a behavior habit of the user by using the first device. The second device may learn the behavior habit of the user, thereby providing personalized services for different users.

For example, the first device is a television, and the second device is a mobile phone. The television can send a video watching list to the mobile phone. The mobile phone may learn the video watching list, to learn a video type liked by the current user, for example, a news video or a movie and television series video.

For another example, the first device is a sound box, and the second device is a mobile phone. The sound box can send an audio playing list to the mobile phone. The mobile phone may learn the audio playing list, so as to know an audio type, a singer, and the like liked by the current user, for example, classical music, rock music, and a work of a singer 1.

For another example, the first device is a watch, and the second device is a mobile phone. The watch may send pulse heart rate data to the mobile phone. The mobile phone may learn the pulse heart rate data, to learn a heart rate in an awake state, a heart rate in an exercise state, a heart rate in a sleep state, and the like of the current user, so as to perform a corresponding operation when a heart rate of the user suddenly changes. For example, when a current heart rate of the user is similar to the heart rate in the exercise state, the mobile phone may indicate the watch to enable a function of recording an exercise route.

Figure 6:
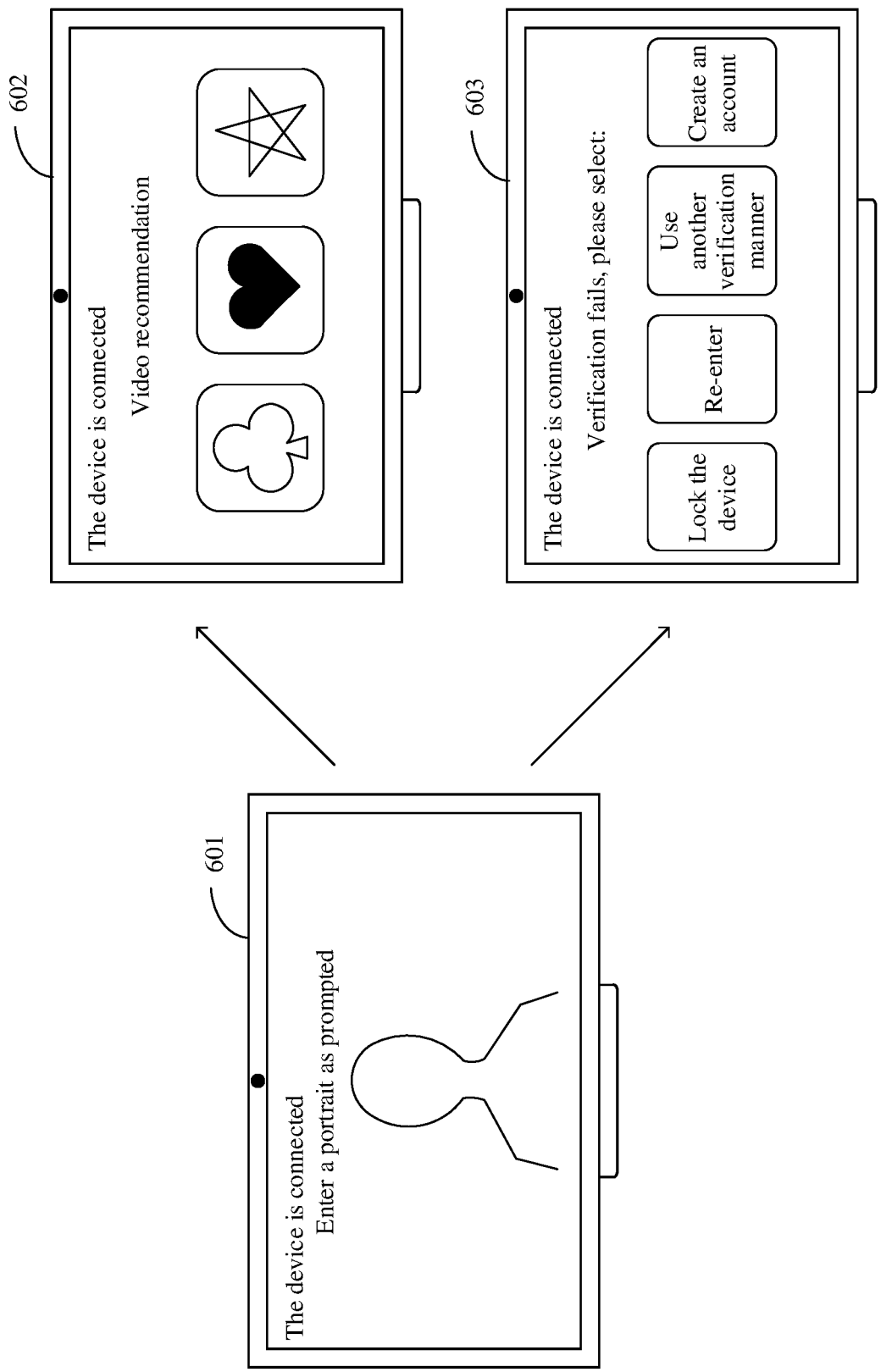
FIG. 6 is a schematic diagram of user interfaces in a user identity verification method according to an embodiment.

FIG. 6 is a schematic diagram of user interfaces in a user identity verification method according to an embodiment. The user interfaces shown in FIG. 6 may be applied to the foregoing first device, for example, an apparatus such as a display or a television. When the first device may perform data transmission with a second device according to a wireless communication protocol, the first device may display words such as "the device is connected". The first device may determine a target identity verification manner based on device information of the second device. As shown in 601 in FIG. 6, the target identity verification manner may be a facial recognition manner. The first device may display a contour of a portrait and words such as "enter a portrait as prompted" to prompt the user to perform facial recognition, so that a face of the user matches the contour displayed by the first device. The first device may send the obtained image to the second device. In a possible case (as shown in 602 in FIG. 6), the second device recognizes the user in the image as a target user. The first device may receive an indication information sent by the second device, and display a corresponding image to recommend, to the user, a video that the target user prefers. In a possible case (as shown in 603 in FIG. 6), the second device fails to recognize the user in the image. The first device may notify the user that the first device is to be locked or may prompt the user to establish a new account, or may prompt the user to re-enter a portrait, or prompt the user to switch to another identity verification manner.

Figure 7:
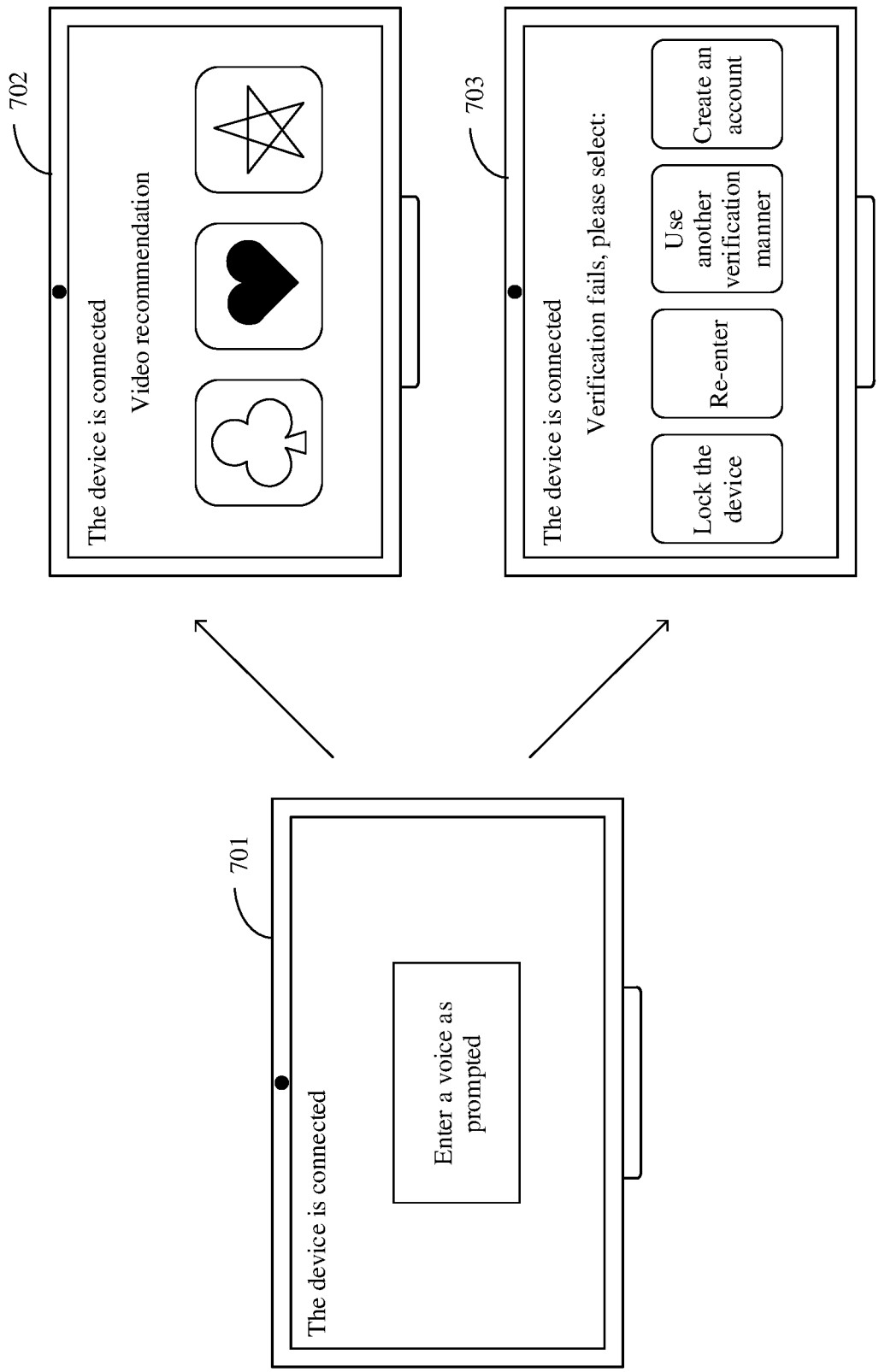
FIG. 7 is a schematic diagram of user interfaces in a user identity verification method according to an embodiment.

FIG. 7 is a schematic diagram of user interfaces in a user identity verification method according to an embodiment. The user interfaces shown in FIG. 7 may be applied to the foregoing first device, for example, an apparatus such as a display or a television. When the first device may perform data transmission with a second device according to a wireless communication protocol, the first device may display words such as "the device is connected". The first device may determine a target identity verification manner based on device information of the second device. As shown in 701 in FIG. 7, the target identity verification manner may be a voiceprint recognition manner. The first device may display words such as "enter a voice as prompted", to prompt a user to perform voiceprint recognition, so that the first device can capture a voice of the user. The first device may send the obtained voice to the second device. In a possible case (as shown in 702 in FIG. 7), the second device obtains through recognition, based on the voice, that the voice comes from a target user. The first device may receive an indication information sent by the second device, and display a corresponding image to recommend, to the user, a video that the target user prefers. In a possible case (as shown in 703 in FIG. 7), the second device fails to recognize a source of the voice. The first device may notify the user that the first device is to be locked or may prompt the user to establish a new account, or may prompt the user to re-enter a portrait, or prompt the user to switch to another identity verification manner.

Figure 8:
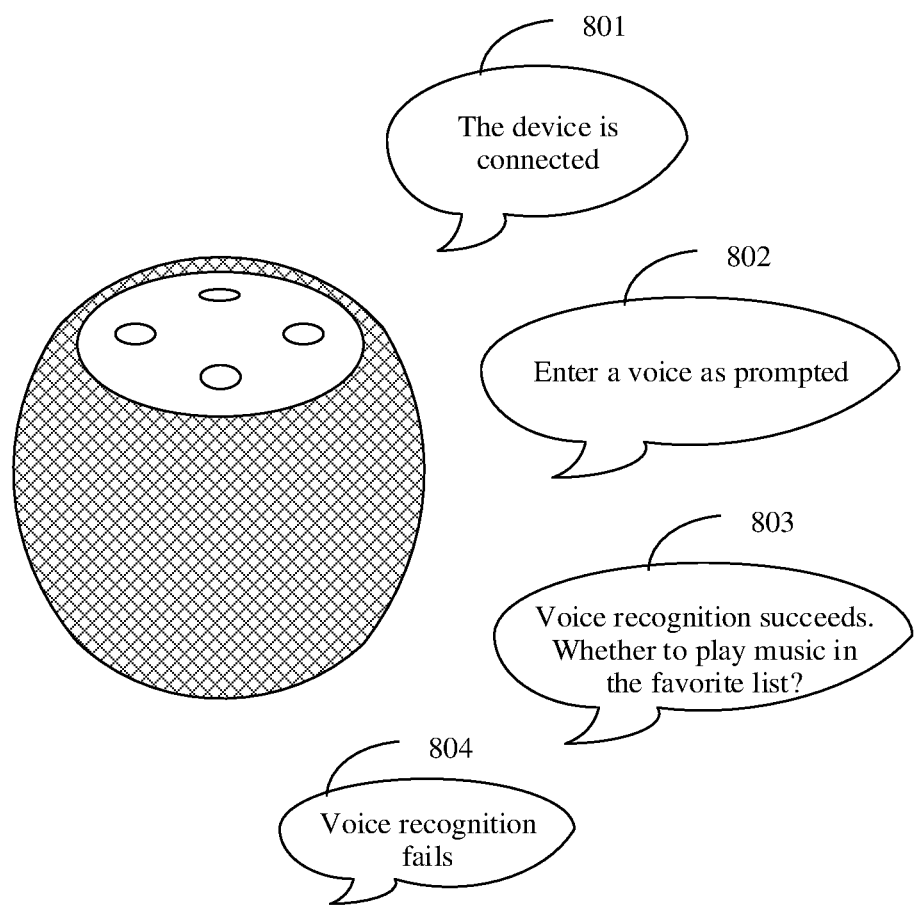
FIG. 8 is a schematic diagram of a user interaction according to an embodiment.

FIG. 8 is a schematic diagram of a user interaction according to an embodiment. The user interface shown in FIG. 8 may be applied to a first device, for example, an apparatus such as a sound box. When the first device may perform data transmission with a second device according to a wireless communication protocol, the first device may play audio including "the device is connected" (as shown in 801 in FIG. 8). The first device may determine a target identity verification manner based on device information of the second device. The target identity verification manner may be a voiceprint verification manner. The first device may play audio including "enter a voice as prompted" to prompt a user to perform voiceprint recognition, so that the first device can capture a voice of the user, as shown in 802 in FIG. 8. The first device may send the obtained voice to the second device. In a possible case (as shown in 803 in FIG. 8), the second device obtains through recognition, based on the voice, that the voice comes from a target user. The first device may receive indication information sent by the second device, play audio including "voice recognition succeeds, and whether to play music in a favorite list", to notify the user that identity verification succeeds, and recommend favorite audio of the target user to the user. In a possible case (as shown in 804 in FIG. 8), the second device fails to recognize a source of the voice. The first device may play audio including "voice recognition fails", to notify a user that identity verification fails.

Figure 9:
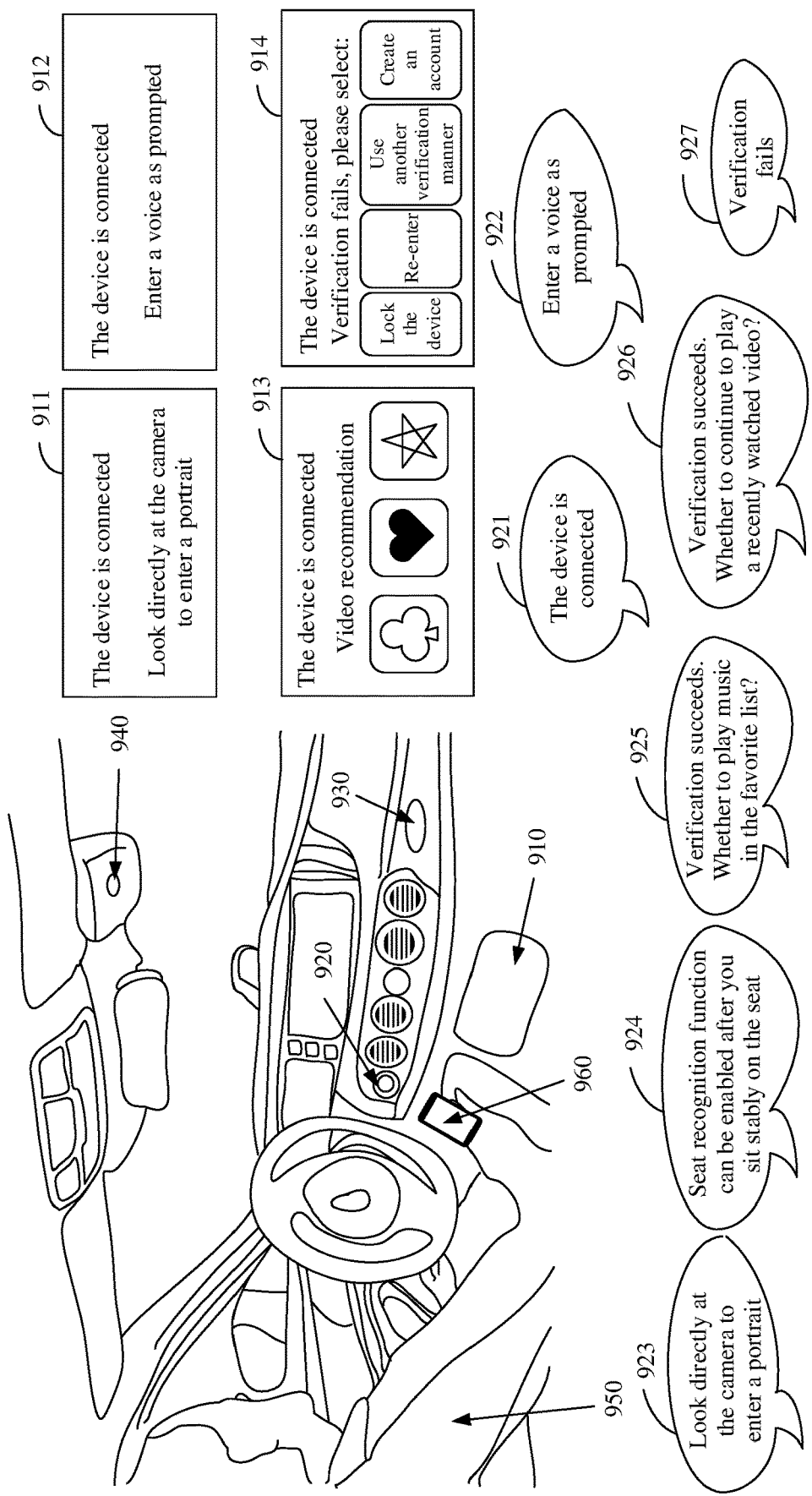
FIG. 9 is a schematic diagram of a user interaction according to an embodiment.

FIG. 9 is a schematic diagram of an application scenario and a user interaction according to an embodiment. The application scenario shown in FIG. 9 may include a driving system (not shown in FIG. 9) and a mobile phone 960. The driving system may further include a display 910, a microphone 920, a sound box 930, a camera 940, and a seat adjustment apparatus 950. The driving system may correspond to the first device in the embodiment shown in FIG. 5. The mobile phone 960 may correspond to the second device in the embodiment shown in FIG. 5. When the driving system can perform data transmission with the mobile phone 960 according to a wireless communication protocol, the display 910 may display words such as "the device is connected" (as shown in 911 and 912 in FIG. 9), and/or the sound box 930 plays audio including "the device is connected" (as shown in 921 in FIG. 9). The driving system may determine a target identity verification manner based on device information of the mobile phone 960.

In an example, the target identity verification manner may be a facial recognition manner. The display 910 may display words such as "look directly at the camera to enter a portrait" (as shown in 911 in FIG. 9), and/or the sound box 930 plays audio including "look directly at the camera to enter a portrait" (as shown in 923 in FIG. 9), so as to prompt the user to enter a portrait. The driving system may obtain an image captured by the camera 940 and send the image to the mobile phone 960.

In an example, the target identity verification manner may be a voiceprint recognition manner. The display 910 may display words such as "enter a voice as prompted" (as shown in 912 in FIG. 9), and/or the sound box 930 plays audio including "enter a voice as prompted" (as shown in 922 in FIG. 9), so as to prompt the user to enter a voice. The driving system may obtain audio captured by the microphone 920 and send the audio to the mobile phone 960.

In an example, the target identity verification manner may be a soft biometric trait recognition manner. The display 910 may display words such as "sit stably on the seat" (not shown in FIG. 9), and/or the sound box 930 plays audio (shown in 924 in FIG. 9) including "seat recognition function can be enabled after you sit stably on the seat", so as to prompt the user to sit stably on the seat. The driving system may obtain a seat adjustment parameter collected by the seat adjustment apparatus 950 and send the seat adjustment parameter to the mobile phone 960.

In a possible case, the mobile phone 960 recognizes a current user as a target user. The driving system may receive indication information sent by the mobile phone 960, and display a corresponding image (shown in 913 in FIG. 9) on the display and/or play, by using the sound box 930, audio (shown in 926 in FIG. 9) including "verification succeeds and whether to continue to play a recently watched video", so as to recommend a video preferred by the target user to the user. The driving system may further receive indication information sent by the mobile phone 960, and display a corresponding image (not shown in FIG. 9) on the display and/or play, by using the sound box 930, audio (shown in 925 in FIG. 9) including "verification succeeds and whether to play music in the preference list", so as to recommend favorite audio of the target user to the user. In a possible case, the mobile phone 960 cannot recognize an identity of a current user. The display may display a corresponding image (as shown in 914 in FIG. 9), to prompt the user that the driving system is to be locked or may prompt the user to establish a new account, or may prompt the user to re-enter a portrait, or may prompt the user to switch to another identity recognition manner. Alternatively, the sound box may play audio (as shown in 927 in FIG. 9) including "verification fails", to prompt the user that the identity of the current user cannot be failed.

Figure 10:
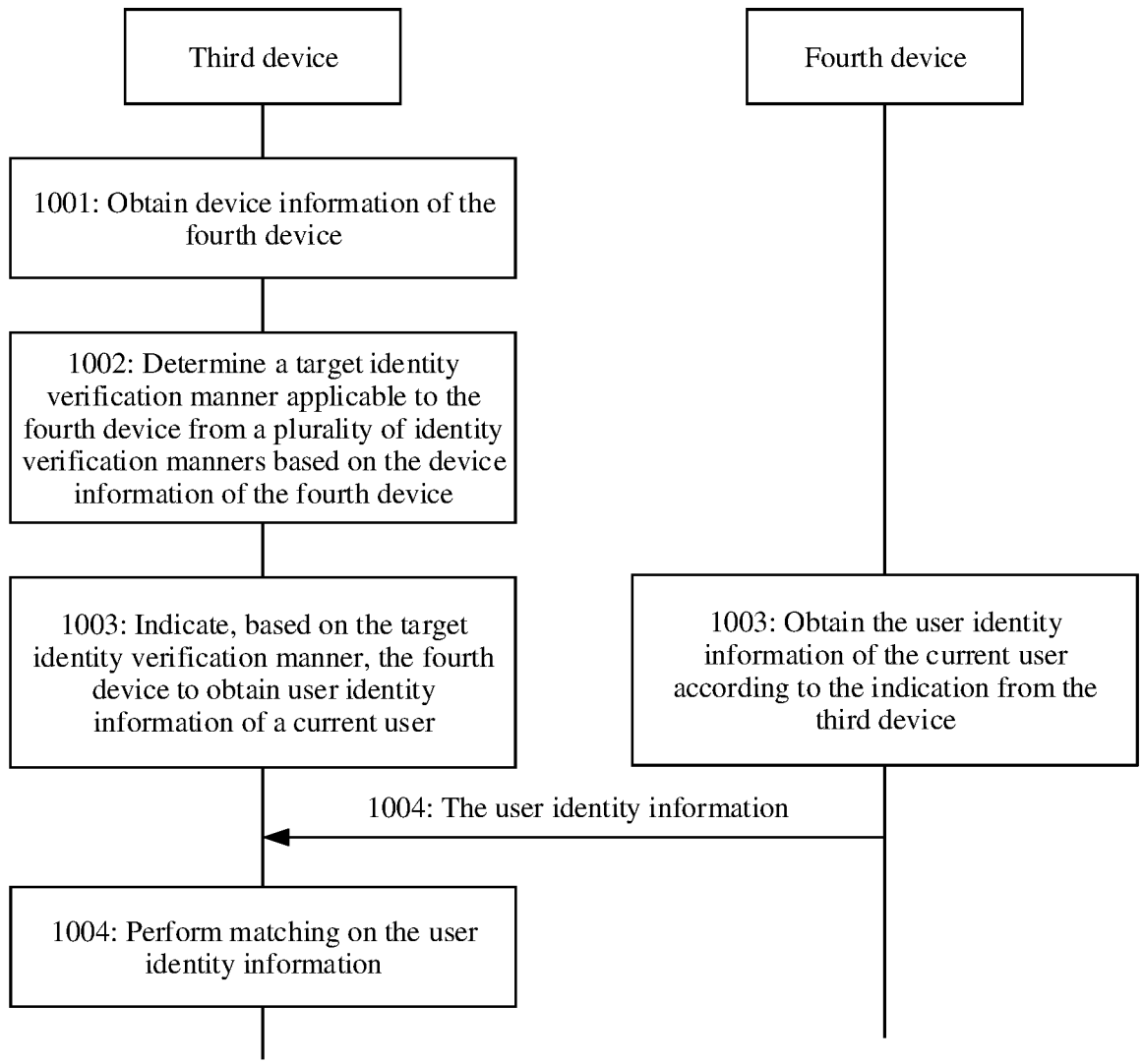
FIG. 10 is a schematic flowchart of a user identity verification method according to an embodiment.

FIG. 10 is a schematic flowchart of a user identity verification method according to an embodiment.

1001: A third device obtains device information of a fourth device.

The third device may be, for example, a portable electronic device such as a mobile phone or a tablet computer. The third device may be a desktop computer or the like.

The fourth device may be, for example, a television, a sound box, a monitor device, a fingerprint recognition apparatus, a driving system, a watch, or a smart body fat scale. A driving system may further include a display, a camera, a microphone, a seat adjustment apparatus, a seat sensor, a fingerprint recognition apparatus, a sound box, and the like.

The device information of the fourth device may include a hardware parameter, a device type, wireless transmission information, a device function, and the like of the fourth device.

Optionally, the device information of the fourth device includes at least one of the following: device type information of the fourth device; wireless transmission information of the fourth device; an identity verification manner enabled by the fourth device; and information about at least one module in the fourth device, where the at least one module is configured to perform a second identity verification manner, and the second identity verification manner is any one of a plurality of identity verification manners.

The hardware parameter of the fourth device may be used to indicate at least some hardware installed on the first device and a parameter of the hardware.

For example, the fourth device is a television, and includes a processor, a memory, a display, a camera, and a microphone. The device information of the fourth device may further indicate parameters of the processor, the memory, the display, the camera, and the microphone. For example, the processor is a dual-core processor, a capacity of the memory is 256 GB, the display is 65 inches, photographing pixels of the camera are 8 megapixels, and the microphone is a dynamic microphone.

For another example, the fourth device is a sound box, and includes a processor, a memory, and a microphone. The device information of the fourth device may further indicate parameters of the processor, the memory, and the microphone. For example, the processor is a dual-core processor, a capacity of the memory is 256 GB, and the microphone is a dynamic microphone.

For another example, the fourth device is a monitor device, and includes a processor, a memory, and a camera. The device information of the fourth device may further indicate parameters of the processor, the memory, and the camera. For example, the processor is a dual-core processor, a capacity of the memory is 128 GB, and photographing pixels of the camera are 16 megapixels.

For another example, the fourth device is a watch, and includes a processor, a memory, a pulse detection apparatus, and an acceleration sensor. The device information of the fourth device may further indicate parameters of the processor, the memory, the pulse detection apparatus, and the acceleration sensor. For example, the processor is a single-core processor, a capacity of the memory is 1 GB, the pulse detection apparatus is a photoelectric pulse detection apparatus, and the acceleration sensor is a 6-axis acceleration sensor.

For another example, the fourth device is a fingerprint recognition apparatus, and includes a processor, a memory, and a fingerprint sensor. The device information of the fourth device may further indicate parameters of the processor, the memory, and the fingerprint sensor. For example, the processor is a single-core processor, a capacity of the memory is 1 GB, and the fingerprint sensor is an optical fingerprint sensor.

For another example, the fourth device is a smart body fat scale, and includes a processor, a Bluetooth antenna, a pressure sensor, and a metal electrode. The device information of the fourth device may further indicate the processor, the memory, the pressure sensor, and the metal electrode. For example, the processor includes a storage capacity of 2 MB, and a version number of the Bluetooth antenna is Bluetooth 4.0.

For another example, the fourth device is a driving system, and includes a processor, a memory, a display, a camera, a microphone, a seat adjustment apparatus, a seat sensor, and a sound box. The device information of the fourth device may further indicate parameters of the processor, the memory, the display, the camera, the microphone, the seat adjustment apparatus, the seat sensor, and the sound box. For example, the processor is a dual-core processor, a capacity of the memory is 256 GB, the display is a touch-screen, photographing pixels of the camera are 16 megapixels, the microphone is a dynamic microphone, the seat adjustment apparatus is adjusted by using a mechanical seat, the seat sensor is a thin film contact sensor, and the sound box is a Bluetooth speaker.

The device type of the fourth device may be, for example, a television, a sound box, a monitor device, a fingerprint recognition apparatus, a driving system, or a watch. An identity verification manner that can be implemented by the fourth device may be roughly deduced based on the device type of the fourth device.

The wireless transmission information of the fourth device may include a wireless communications network available to the fourth device, for example, may be a wireless local area network (WLAN) or Bluetooth. The wireless transmission information of the fourth device may further include a version number of a wireless communication protocol, for example, wireless fidelity (Wi-Fi) 2.4 GHz, Wi-Fi 5 GHz, Bluetooth 4.0, or Bluetooth 5.0.

The device function of the fourth device may be used to indicate a function that can be implemented by the fourth device. The device function of the fourth device may include an identity verification function enabled by the fourth device.

For example, the function that can be implemented by the fourth device may include capturing a sound around the device and performing noise canceling on the sound. For another example, the function that can be implemented by the fourth device may include capturing an image around the device, and performing processing such as noise-canceling, compression, and cropping on the image. The identity verification manner enabled by the fourth device may be, for example, a voiceprint recognition manner, a facial recognition manner, a fingerprint recognition manner, or a soft biometric trait recognition manner.

If the fourth device can implement a function, the fourth device usually needs to include a module corresponding to the function.

For example, to perform a facial recognition manner, the fourth device usually includes a front-facing camera. That is, the front-facing camera may be configured to perform the facial recognition manner.

For another example, to perform a voiceprint recognition manner, the fourth device usually includes a microphone. That is, the microphone may be configured to perform the voiceprint recognition manner.

For another example, to perform a fingerprint recognition manner, the fourth device usually includes a fingerprint sensor. That is, the fingerprint sensor may be configured to perform the fingerprint recognition manner.

For another example, to perform a soft biometric trait recognition manner, the fourth device usually includes one or more of a camera, a microphone, a seat sensor, or a smart body fat scale. That is, one or more of the camera, the microphone, the seat sensor, and the smart body fat scale may be used to perform the soft biometric trait recognition manner.

A manner in which the third device obtains the device information of the fourth device is not limited in this embodiment. For example, a memory in the third device may store the device information of the fourth device. That the third device obtains the device information of the fourth device may indicate that the third device reads the device information of the fourth device stored in the memory. For another example, that the third device obtains the device information of the fourth device may be that the third device receives the device information of the fourth device sent by the fourth device. For another example, that the third device obtains the device information of the fourth device may be that the third device receives the device information of the fourth device from a cloud server based on a device model of the fourth device.

Optionally, the method further includes: The fourth device updates the device information of the fourth device.

In an example, when the hardware parameter of the fourth device changes, the fourth device may update the device information of the fourth device. For example, when a quantity of hardware in the fourth device changes or hardware performance changes, the fourth device may update the device information of the fourth device.

For example, the fourth device originally includes a microphone, but the microphone in the fourth device is currently damaged, and as a result, the fourth device cannot record audio through the microphone. In this case, the fourth device may update the device information of the fourth device. The device information of the fourth device before the update may indicate that the fourth device includes the microphone, and device information of the fourth device after the update indicates that the fourth device does not include a microphone.

For another example, the fourth device originally includes a microphone without a noise-canceling function, but the fourth device is currently provided with an apparatus for improving noise-canceling performance of the microphone, so that the fourth device can record audio with less noise through the microphone. In this case, the fourth device may update the device information of the fourth device. The device information of the fourth device before the update may indicate that the fourth device includes the microphone without the noise-canceling function, and device information of the fourth device after the update indicates that the fourth device includes a microphone with a noise-canceling function.

In an example, when the device function of the fourth device changes, the fourth device may update the device information of the fourth device. For example, when device functions of the fourth device increase or decrease, the fourth device may update the device information of the fourth device.

For example, quality of audio captured by the fourth device is improved after a device system is updated once. In this case, the fourth device may update the device information of the fourth device. The quality of audio indicated by device information of the fourth device after the update may be higher than the quality of the audio indicated by the device information of the fourth device before the update.

For another example, the fourth device includes a front-facing camera, but the fourth device cannot generate, based on an image obtained by the front-facing camera, identity verification information used for facial recognition. After the fourth device enters or obtains a facial recognition template, the fourth device may generate, based on the image obtained by the front-facing camera, the identity verification information used for facial recognition. In this case, the fourth device may update the device information of the fourth device. The device information of the fourth device before the update may indicate that an identity verification manner enabled by the fourth device does not include a facial recognition manner, and device information of the fourth device after the update indicates that an identity verification manner enabled by the fourth device includes a facial recognition manner.

For an implementation of step 1001, refer to step 501 in the embodiment shown in FIG. 5. Details are not described herein again.

1002: The third device determines a target identity verification manner applicable to the fourth device from a plurality of identity verification manners based on the device information of the fourth device.

The plurality of identity verification manners may include a facial recognition manner, a voiceprint recognition manner, a fingerprint recognition manner, a soft biometric trait recognition manner, and the like.

The foregoing has described the soft biometric trait recognition manner in detail. For ease of description, details are not described herein again.

The third device can implement the plurality of identity verification manners. For the fourth device, there is a preferable identity verification manner in the plurality of identity verification manners. Therefore, the third device can select the identity verification manner from the plurality of identity verification manners based on the device parameter of the fourth device.

For example, the third device is a mobile phone, and the fourth device is a television. The plurality of identity verification manners that can be recognized by the mobile phone include a facial recognition manner and a voiceprint recognition manner. The television includes a camera and a microphone. Device information of the television indicates that photographing pixels of the camera are 8 megapixels, the microphone is a noise-canceling microphone, quality of audio captured by the microphone is high, and quality of an image captured by the camera is average. A wireless transmission manner of the television is Bluetooth, and a version number is Bluetooth 2.0. In a possible case, to improve accuracy of identity verification, the mobile phone may determine the voiceprint recognition manner from the facial recognition manner and the voiceprint recognition manner as a target identity recognition manner based on the device information of the television. In another possible case, to improve data transmission efficiency, the mobile phone may determine the facial recognition manner from the facial recognition manner and the voiceprint recognition manner as a target identity recognition manner based on the device information of the television.

For another example, the third device is a mobile phone, and the fourth device is a sound box. The sound box includes a microphone. The plurality of identity verification manners that can be recognized by the mobile phone include a facial recognition manner and a voiceprint recognition manner. Device information of the sound box indicates that the microphone in the sound box can capture identity verification information used for voiceprint recognition. The mobile phone may determine the voiceprint recognition manner from the facial recognition manner and the voiceprint recognition manner as the target identity authentication manner based on the device information of the sound box.

For another example, the third device is a mobile phone, and the fourth device is a driving system. The plurality of identity verification manners that can be recognized by the mobile phone include a facial recognition manner, a voiceprint recognition manner, and a soft biometric trait recognition manner. Device information of the driving system is used to indicate that the driving system includes a seat adjustment apparatus, a camera, and a microphone. The seat adjustment apparatus may capture a seat parameter and a weight that are used by a user in a driving process. The camera may capture an image including a biometric trait of the user (for example, including one or more of a face, a body, a tattoo, or a hairstyle). The microphone may capture a voice of the user (for example, including one or more of a voiceprint or an accent feature). Because the driving system can obtain the soft biometric trait in a plurality of manners, the mobile phone may determine the soft biometric trait recognition manner from the facial recognition manner, the voiceprint recognition manner, and the soft biometric feature recognition manner as a target identity recognition manner based on the device information of the driving system.

Optionally, that the third device determines the target identity verification manner applicable to the fourth device from the plurality of identity verification manners based on the device information of the fourth device includes: The third device determines the target identity verification manner from the plurality of identity verification manners based on the device information of the fourth device, and at least one piece of verification manner information and/or device information of the third device.

In other words, in addition to the device information of the fourth device, the third device may also consider the device information of the third device, and/or consider an attribute of the verification manner, to comprehensively determine the identity verification manner most appropriate for the third device and the fourth device.

Similar to the device information of the fourth device, the device information of the third device may include a hardware parameter, a device type, wireless transmission information, a device function, and the like of the third device.

Optionally, the device information of the third device includes at least one of the following: a hardware parameter of the third device, device type information of the third device; wireless transmission information of the third device; and an identity verification manner enabled by the third device.

The hardware parameter of the third device may be used to indicate at least some hardware installed on the third device and a parameter of the hardware. For example, the hardware parameter of the third device includes that photographing pixels of a front-facing camera are 24 megapixels, photographing pixels of a rear-facing camera are 40 megapixels, a fingerprint sensor is an optical fingerprint sensor, the microphone is a noise-canceling microphone, a processor includes an NPU, and a capacity of a memory is 128 gigabytes (GB).

The device type of the third device may be, for example, a mobile phone, a tablet computer, or a desktop computer.

The wireless transmission information of the third device may include a wireless communications network available to the third device, for example, may be a wireless local area network (WLAN), Bluetooth, or a mobile communications network. The wireless transmission information of the third device may further include a version number of a wireless communication protocol, for example, wireless fidelity (Wi-Fi) 2.4 GHz, Wi-Fi 5 GHz, 4G mobile communication, 5G mobile communication, Bluetooth 4.0, or Bluetooth 5.0.

The device function of the third device may be used to indicate a function that can be implemented by the third device. The device function of the third device may include an identity verification function enabled by the third device.

For example, the function that can be implemented by the third device may include capturing a sound around the device and performing noise canceling on the sound. For another example, the function that can be implemented by the third device may include recognizing an image and determining a label of the image (for example, marking an object in the image, or a gender and a wearing of a person). The identity verification manner enabled by the third device may be, for example, a voiceprint recognition manner, a facial recognition manner, a fingerprint recognition manner, or a soft biometric trait recognition manner.

It should be noted that, to enable the third device to implement a function, the third device needs to include a module corresponding to the function. For example, if the third device can perform voiceprint recognition, the third device usually includes a microphone. For another example, if the third device can perform facial recognition, the third device usually includes a front-facing camera. For another example, if the third device can perform fingerprint recognition, the third device usually includes a fingerprint sensor. However, in some scenarios, even if the third device includes a apparatus, the third device may not be able to implement a function corresponding to the apparatus. For example, the third device includes a microphone, but the third device does not enter or cannot obtain a voiceprint template used to match a user voiceprint, and therefore the third device cannot implement a voiceprint recognition manner. For another example, the third device includes a camera, but the third device does not enter or cannot obtain a facial template used to match a user face, and therefore the third device cannot implement a facial recognition manner. For another example, the third device includes a fingerprint sensor, but the third device does not enter or cannot obtain a fingerprint template used to match a user fingerprint, and therefore the third device cannot implement a fingerprint recognition manner.

Optionally, the method further includes: The third device updates the device information of the third device.

In an example, when the hardware parameter of the third device changes, the third device may update the device information of the third device. For example, when a quantity of hardware in the third device changes or hardware performance changes, the third device may update the device information of the third device.

For example, the third device originally includes a microphone, but the microphone in the third device is currently damaged, and as a result, the third device cannot record audio through the microphone. In this case, the third device may update the device information of the third device. The device information of the third device before the update may indicate that the third device includes the microphone, and device information of the third device after the update indicates that the third device does not include a microphone.

For another example, the third device originally includes a microphone without a noise-canceling function, but the third device is currently provided with an apparatus for improving noise-canceling performance of the microphone, so that the third device can record audio with less noise through the microphone. In this case, the third device may update the device information of the third device. The device information of the third device before the update may indicate that the third device includes the microphone without the noise-canceling function, and device information of the third device after the update indicates that the third device includes a microphone with a noise-canceling function.

In an example, when the device function of the third device changes, the third device may update the device information of the third device. For example, when device functions of the third device increase or decrease, the third device may update the device information of the third device.

For example, the third device includes a front-facing camera, but a processor in the third device cannot perform facial recognition on an image obtained by the front-facing camera. After a device system is updated once, the processor in the third device may perform facial recognition on the image obtained by the front-facing camera. In this case, the third device may update the device information of the third device. The device information of the third device before the update may indicate that an identity verification manner enabled by the third device does not include a facial recognition manner, and device information of the third device after the update indicates that an identity verification manner enabled by the third device includes a facial recognition manner.

For another example, the third device includes a front-facing camera, and a processor in the third device can perform facial recognition based on an image obtained by the front-facing camera, but the third device does not enter or cannot obtain a facial recognition template used to match a user, and therefore cannot compare the image obtained by the front-facing camera with the facial recognition template. After the third device enters or obtains the facial recognition template, the third device may enable a facial recognition manner. In this case, the third device may update the device information of the third device. The device information of the third device before the update may indicate that an identity verification manner enabled by the third device does not include a facial recognition manner, and device information of the third device after the update indicates that an identity verification manner enabled by the third device includes a facial recognition manner.

Verification manner information may indicate an attribute of the verification manner.

Optionally, the at least one piece of verification manner information includes at least one of the following: a plurality of pieces of accuracy information that are in a one-to-one correspondence with the plurality of identity verification manners; a plurality of pieces of user experience information that are in a one-to-one correspondence with the plurality of identity verification manners; a plurality of pieces of technology maturity information that are in a one-to-one correspondence with the plurality of identity verification manners; and a plurality of pieces of verification environment information that are in a one-to-one correspondence with the plurality of identity verification manners.

The information of the verification manner has been described in detail above. For ease of description, details are not described herein again.

Manner 1: The third device determines the target identity verification manner from the plurality of identity verification manners based on the device information of the fourth device, and the device information of the third device.

For example, the third device is a mobile phone, and the fourth device is a television. The television includes a camera and a microphone. Photographing pixels of the camera are 8 megapixels, and the microphone is a noise-canceling microphone. A volume of audio data captured by the microphone is large, and audio quality is high. A volume of image data captured by the camera is small, and image quality is average. In a possible case, device information of the mobile phone indicates that wireless transmission information of the mobile phone is 4G mobile communication. To reduce a data volume of user verification data received by the mobile phone, the mobile phone may determine a facial recognition manner from the facial recognition manner and a voiceprint recognition manner as a target identity verification manner based on device information of the television and the device information of the mobile phone. In a possible case, device information of the mobile phone indicates that wireless transmission information of the mobile phone is Wi-Fi 2.4 GHz. To improve accuracy of identity verification, the mobile phone may determine a voiceprint recognition manner from a facial recognition manner and the voiceprint recognition manner as a target identity verification manner based on device information of the television and the device information of the mobile phone.

For another example, the third device is a mobile phone, and the fourth device is a driving system. The driving system includes a seat adjustment apparatus, a camera, and a microphone. The seat adjustment apparatus may capture a seat parameter and a weight that are used by a user in a driving process. The camera may photograph an image (for example, including one or more of a face, a body, a tattoo, and a hairstyle) that includes a biometric trait of the user. The microphone may capture a voice of the user (for example, including one or more of a voiceprint or an accent feature). In a possible case, for a driver, the seat adjustment apparatus may be in a real-time detection state, and persons of different heights and weights usually have different driver seat use habits. For example, a distance between a seat and a pedal and an angle of a seat backrest may be adjusted. Device information of the mobile phone indicates that an identity verification manner enabled by the mobile phone includes a facial recognition manner and a soft biometric trait recognition manner. The mobile phone may determine the soft biometric trait recognition manner from the facial recognition manner and the soft biometric trait recognition manner as the target identity verification manner based on device information of the driving system and the device information of the mobile phone. In a possible case, photographing pixels of the camera are high, and quality of audio recorded by the microphone is high. The device information of the mobile phone indicates that the mobile phone includes an NPU used for image recognition. Therefore, the mobile phone can implement facial recognition with higher accuracy and efficiency. The mobile phone may determine the facial recognition manner from the facial recognition manner, the voiceprint recognition manner, and the soft biometric trait recognition manner as the target identity verification manner based on the device information of the driving system and the device information of the mobile phone.

Manner 2: The third device determines the target identity verification manner from the plurality of identity verification manners based on the device information of the fourth device, and the at least one piece of verification manner information.

For example, the third device is a mobile phone, and the fourth device is a television. The television includes a camera and a microphone. The camera may photograph an image (for example, including one or more of a face, a body, a tattoo, and a hairstyle) that includes a biometric trait of a user. The microphone may capture a voice of the user (for example, including one or more of a voiceprint or an accent feature). Therefore, the television can obtain data required for facial recognition, voiceprint recognition, and soft biometric trait recognition. Because user experience of facial recognition is better, the mobile phone may determine the facial recognition manner from the facial recognition manner, the voiceprint recognition manner, and the soft biometric trait recognition manner as a target identity verification manner based on device information of the television.

For another example, the third device is a mobile phone, and the fourth device is a driving system. The driving system includes a seat adjustment apparatus and a microphone. The seat adjustment apparatus may capture a seat parameter and a weight that are used by a user in a driving process. The microphone may capture a voice of the user (for example, including one or more of a voiceprint or an accent feature). Because there is a small quantity of people in a vehicle, a data volume required for recognition in the soft biometric trait recognition manner is small Therefore, the mobile phone may determine the soft biometric trait recognition manner from the voiceprint recognition manner and the soft biometric trait recognition manner as a target identity verification manner based on device information of the television.

Manner 3: The third device determines the target identity verification manner from the plurality of identity verification manners based on the device information of the third device, the device information of the fourth device, and the at least one verification manner.

The third device may determine, based on the device information of the third device, a plurality of fourth weight values that are in a one-to-one correspondence with the plurality of identity verification manners. The third device may determine, based on the device information of the fourth device, a plurality of fifth weight values that are in a one-to-one correspondence with the plurality of identity verification manners. The third device may determine, based on the at least one verification manner, a plurality of sixth weight values that are in a one-to-one correspondence with the plurality of identity verification manners. The third device may determine, based on the plurality of fourth weight values, the plurality of fifth weight values, and the plurality of sixth weight values, a plurality of second total weight values that are in a one-to-one correspondence with the plurality of identity verification manners. The third device may determine, based on a target fourth weight value, a target fifth weight value, and a target sixth weight value, a second total weight value corresponding to a fourth identity verification manner. The target fourth weight value, the target fifth weight value, and the target sixth weight value each correspond to the fourth identity verification manner, and the fourth identity verification manner is any one of the plurality of identity verification manners. The fourth device sorts the plurality of second total weight values, and determines an identity verification manner corresponding to a second total weight value with the largest value as the target identity verification manner.

Table 4 shows weight parameters of device information of the third device, a weight parameter of device information of the fourth device, and a weight parameter of verification manner information that correspond to a facial recognition manner.

TABLE 4

| Identity verification manner enabled by the third device | 1 |
| Wireless transmission manner of the third device | 0.7 |
| Camera of the fourth device | 0.8 |
| Verification information of the facial recognition manner | 0.9 |

Then, a second overall weight value corresponding to the facial recognition manner=1×0.7×0.8×0.9=0.504.

Table 5 shows weight parameters of device information of the third device, a weight parameter of device information of the fourth device, and a weight parameter of verification manner information that correspond to a voiceprint recognition manner.

TABLE 5

| Identity verification manner enabled by the third device | 0 |
| Wireless transmission manner of the third device | 0.7 |
| Microphone of the fourth device | 0.9 |
| Verification information of the voiceprint recognition manner | 0.6 |

Then, a second overall weight value corresponding to the voiceprint recognition manner=0×0.7×0.9×0.6=0.

Table 6 shows weight parameters of device information of the third device, a weight parameter of device information of the fourth device, and a weight parameter of verification manner information that correspond to a soft biometric trait recognition manner.

TABLE 6

| | |
|---|---|
| Identity verification manner enabled by the third device | 1 |
| Wireless transmission manner of the third device | 0.7 |
| Camera of the fourth device | 0.8 |
| Microphone of the fourth device | 0.9 |
| Verification information of the soft biometric trait recognition manner | 0.8 |

Then, a second overall weight value corresponding to the soft biometric trait recognition manner=1×0.7×(0.8+0.9)/2× 0.8=0.476.

The fourth device may determine the facial recognition manner as the target recognition manner based on the second overall weight value corresponding to the facial recognition manner, the second overall weight value corresponding to the voiceprint recognition manner, and the second overall weight value corresponding to the soft biometric trait recognition manner.

A value of a fourth weight value corresponding to the device information of the third device is not limited. A value of a fifth weight value corresponding to the device information of the fourth device is not limited. A value of a sixth weight value corresponding to the information of the verification manner is not limited. A manner of determining a second overall weight value corresponding to an identity verification manner is not limited.

1003: The third device indicates, based on the target identity verification manner, the fourth device to obtain user identity information of a current user.

Correspondingly, the fourth device obtains the user identity information of the current user according to the indication from the third device.

For example, when the target identity verification manner is a facial recognition manner, the third device may indicate the fourth device to drive a camera to capture a face image of the current user. To-be-verified identity information may include the face image.

For another example, when the target identity verification manner is a voiceprint verification manner, the third device may indicate the fourth device to drive a microphone to capture voice audio of the current user. To-be-verified identity information may include the voice audio.

For another example, when the target identity verification manner is a fingerprint recognition manner, the third device may indicate the fourth device to drive a fingerprint sensor to capture a fingerprint image of the current user. To-be-verified identity information may include the fingerprint image.

For another example, when the target identity verification manner is a soft biometric trait recognition manner, the third device may indicate the fourth device to drive a camera to capture an image to capture a body shape, an appearance, and the like of the user; and/or the third device may indicate the fourth device to drive a microphone to record audio to capture a voice of the current user; and/or the third device may indicate the fourth device to drive a seat sensor to collect weight data to detect a weight of the user. To-be-verified identity information may include one or more of the image, the audio, or the body weight data.

1004: The fourth device sends the user identity information to the third device.

Correspondingly, the third device receives the user identity information sent by the fourth device and performs matching on the user identity information.

In other words, the third device may match the to-be-verified identity information with a recognition template of a target user. For manners of implementing facial recognition, voiceprint recognition, fingerprint recognition, and soft biometric trait recognition, refer to the conventional technology. Details are not described herein.

Optionally, the method further includes: When the user identity information successfully matches a target user, the third device indicates the fourth device to perform a target operation that matches the target user.

In other words, when the to-be-verified identity information of the current user matches the identity information of the target user, the current user can be considered as the target user. The third device may indicate the target operation to the fourth device, and the fourth device performs the target operation, so as to provide a personalized service for the target user.

For example, the third device is a mobile phone, and the fourth device is a television. When the to-be-verified identity information of the current user matches the target user, the mobile phone sends, to the television, a list of videos that the target user prefers. The television may present the video list to the current user, so that the user can quickly determine a to-be-watched video.

For another example, the third device is a mobile phone sound box, and the fourth device is a sound box. When the to-be-verified identity information of the current user matches the target user, the mobile phone sends, to the sound box, a list of audio that the target user prefers. The sound box may present the audio list to the current user, so that the user can quickly determine to-be-listened-to audio.

For another example, the third device is a mobile phone, and the fourth device is a monitor device. When the to-be-verified identity information of the current user matches the target user, the mobile phone sends, to the monitor device, an amplification rate and a photographing angle that are commonly used by the target user. The monitor device may perform photographing by using the commonly used amplification rate and photographing angle, so that the user does not need to adjust a photographing parameter of the monitor device or only needs to fine-tune a photographing parameter of the monitor device.

For another example, the third device is a mobile phone, the fourth device is a driving system, and the driving system includes a display and a driving adjustment apparatus. When the to-be-verified identity information of the current user matches the target user, the mobile phone sends, to the driving system, a seat adjustment parameter commonly used by the target user and a video last played by the target user. The driving system may adjust a seat by using the driving adjustment apparatus, and display, on the display, whether to continue to observe the video played last time, so that the user does not need to adjust the seat or only needs to fine-tune the seat, and the user can continue to watch the video that is not completely watched last time.

Optionally, the method further includes: The fourth device sends behavior information of the current user to the third device.

Optionally, before the third device indicates the fourth device to perform the target operation that matches the target user, the method further includes: The third device receives behavior information of the target user sent by the fourth device; and generates target user common information corresponding to the target user based on the behavior information. That the third device indicates the fourth device to perform the target operation includes: The third device indicates, based on the target user common information, the fourth device to perform the target operation.

That is, the third device may obtain a behavior habit of the user by using the fourth device. The third device may learn the behavior habit of the user, thereby providing personalized services for different users.

For example, the third device is a mobile phone, and the fourth device is a television. The television can send a video watching list to the mobile phone. The mobile phone may learn the video watching list and generate target user common information based on behavior information of a user. For example, a video type liked by the user may be a news video, or a movie video. Therefore, the mobile phone can indicate, based on the target user common information, the television to recommend a video that the user may like to the user.

For another example, the third device is a mobile phone, and the fourth device is a sound box. The sound box can send an audio playing list to the mobile phone. The mobile phone may learn the audio playing list, and the mobile phone may learn the audio playing list and generate target user common information based on behavior information of a user. For example, a music type liked by the user may be classical music, rock music, or a work of a singer 1. Therefore, the mobile phone can indicate, based on the target user common information, the sound box to recommend audio that the user may like to the user.

For another example, the third device is a mobile phone, and the fourth device is a watch. The watch may send pulse heart rate data to the mobile phone. The mobile phone may learn the pulse heart rate data and generate target user common information based on behavior information of a user, for example, a heart rate of a current user in an awake state, a heart rate in an exercise state, or a heart rate in a sleep state. The mobile phone may indicate, based on the target user common information, the watch to perform a target operation. For example, when a current heart rate of the user is similar to the heart rate in the exercise state, the mobile phone may indicate the watch to enable an exercise route recording function.

Figure 11A:
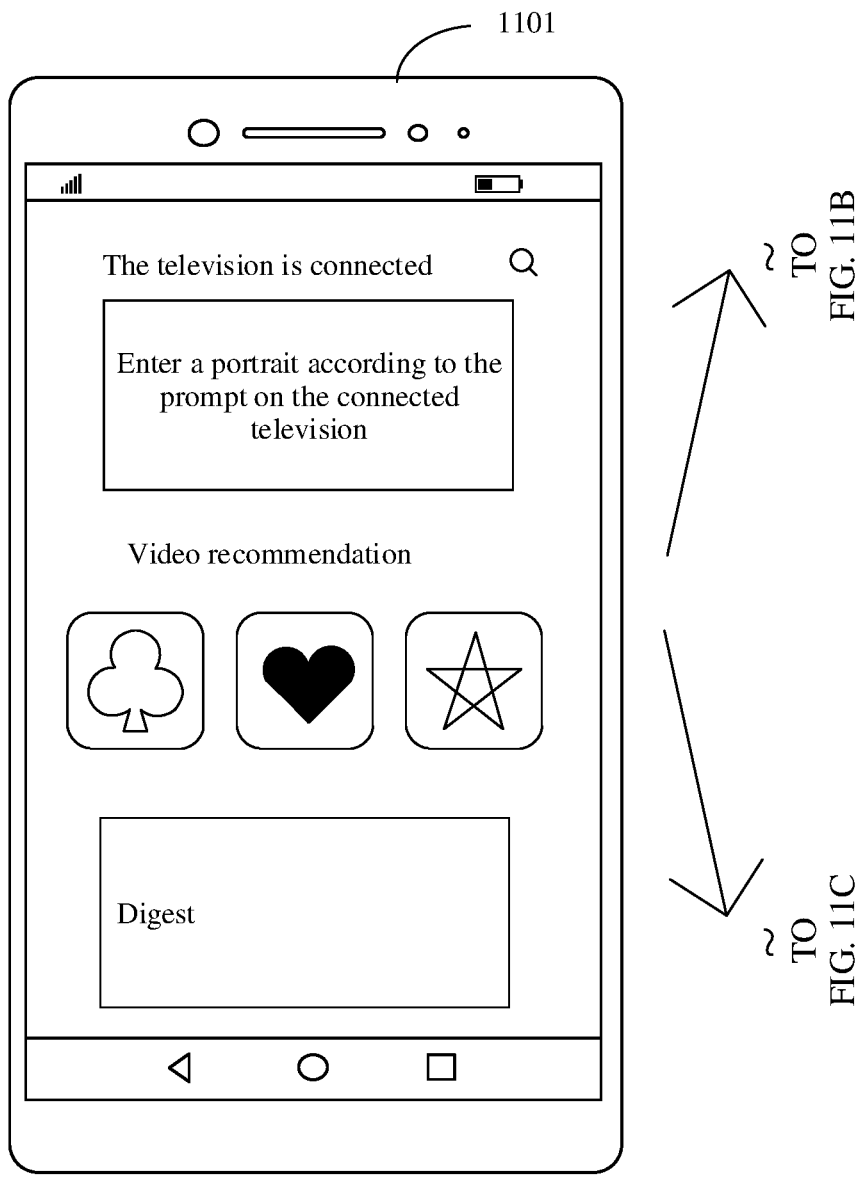
FIG. 11A to FIG. 11C are a schematic diagram of user interfaces in a user identity verification method according to an embodiment.
Figure 11B:
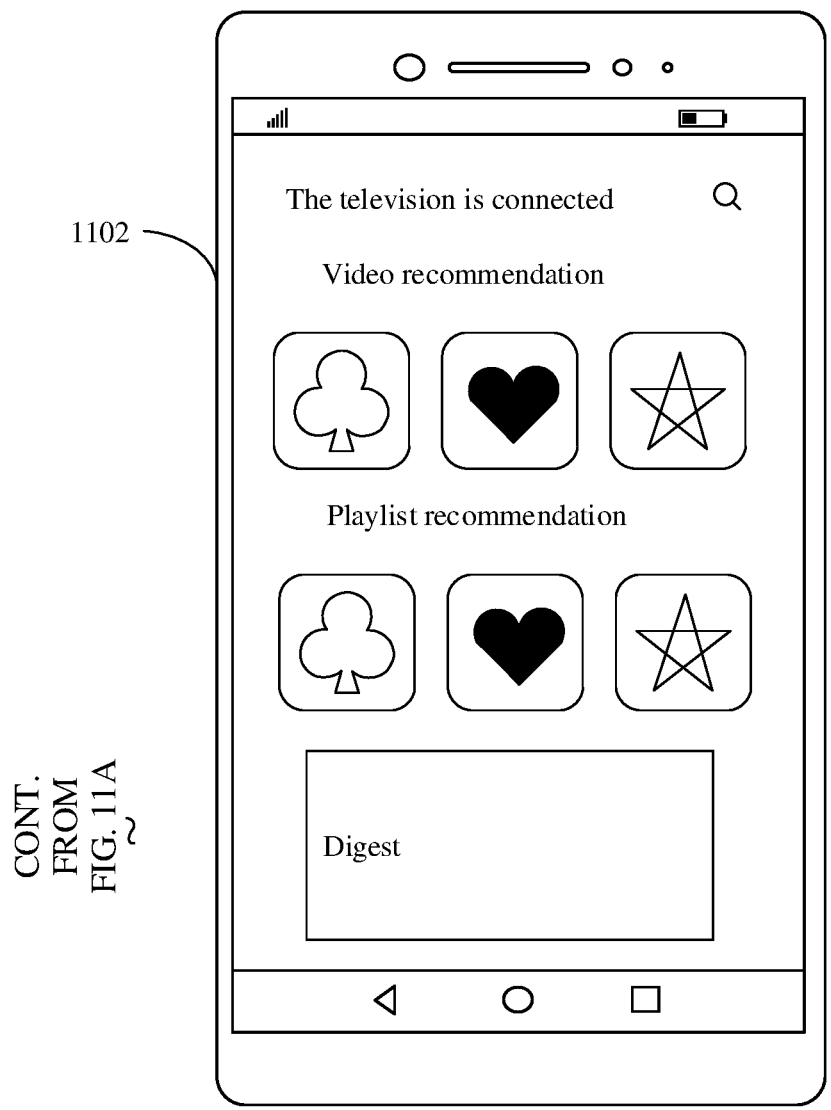
Figure 11C:
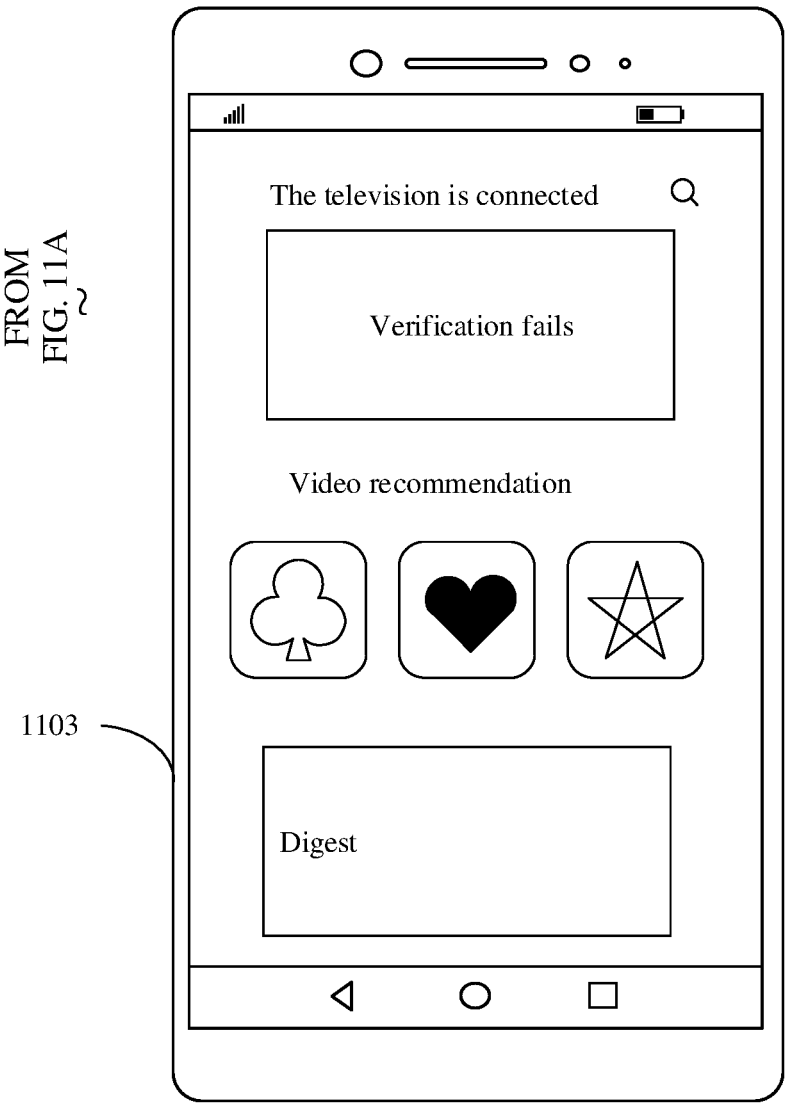
Figure 12:
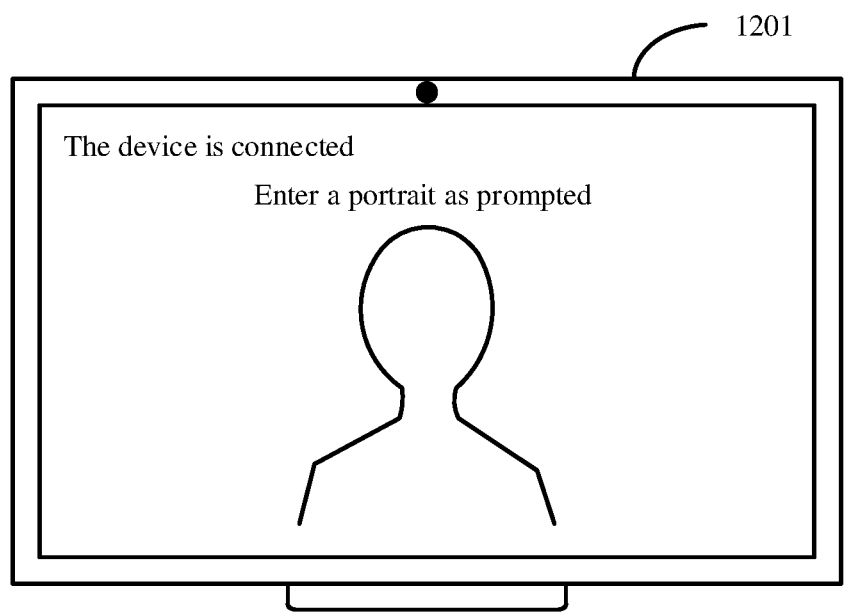
FIG. 12 is a schematic diagram of a user interface in a user identity verification method according to an embodiment.

FIG. 11A to FIG. 11C are a schematic diagram of user interfaces in a user identity verification method according to an embodiment, and FIG. 12 is a schematic diagram of a user interface in a user identity verification method according to an embodiment. The user interface shown in FIG. 11A to FIG. 11C may be applied to a third device. The user interface shown in FIG. 12 may be applied to a fourth device. The fourth device may be, for example, an apparatus such as a display or a television. When the third device may perform data transmission with the fourth device according to a wireless communication protocol, the third device may display words such as "the television is connected" (as shown in 1101 in FIG. 11A). The fourth device may also display words such as "the device is connected" (as shown in FIG. 12). Before the third device matches a target user, the third device may display a recommended video unrelated to the target user. The third device may determine a target identity verification manner based on device information of the fourth device. As shown in FIG. 12, the target identity verification manner may be a facial recognition manner. The fourth device may display a contour of a portrait and words such as "enter a portrait as prompted" to prompt a user to perform facial recognition, so that a face of the user matches the contour displayed by the fourth device. The fourth device may send an obtained image to the third device. In a possible case, the third device recognizes the user in the image as the target user. The third device may display a video or audio preferred by the target user for user selection (as shown in 1102 in FIG. 11B) and indicate the fourth device to play media content selected by the user. In a possible case, the third device cannot recognize the user in the image. The third device may display "verification fails" (as shown in 1103 in FIG. 11C).

Figure 13A:
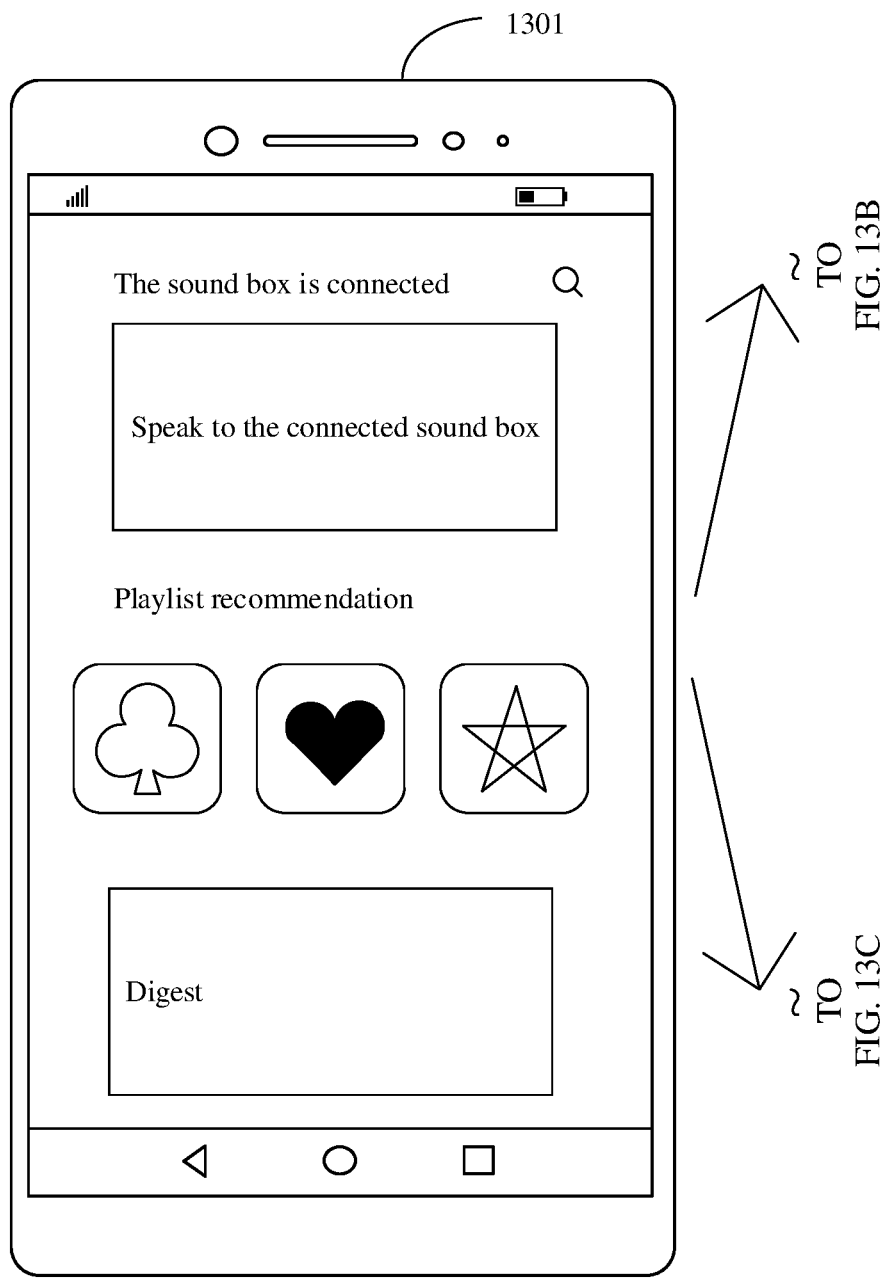
FIG. 13A to FIG. 13C are a schematic diagram of user interfaces in a user identity verification method according to an embodiment.
Figure 13B:
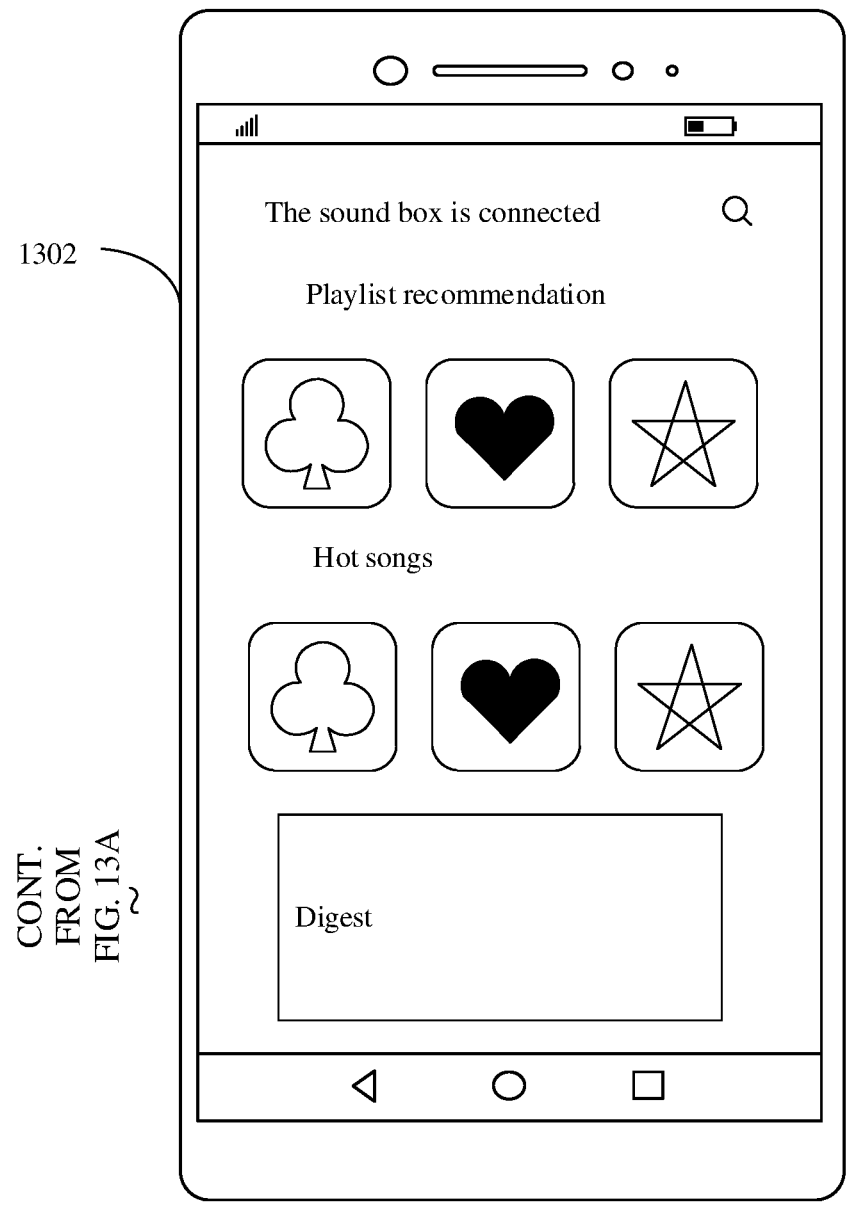
Figure 13C:
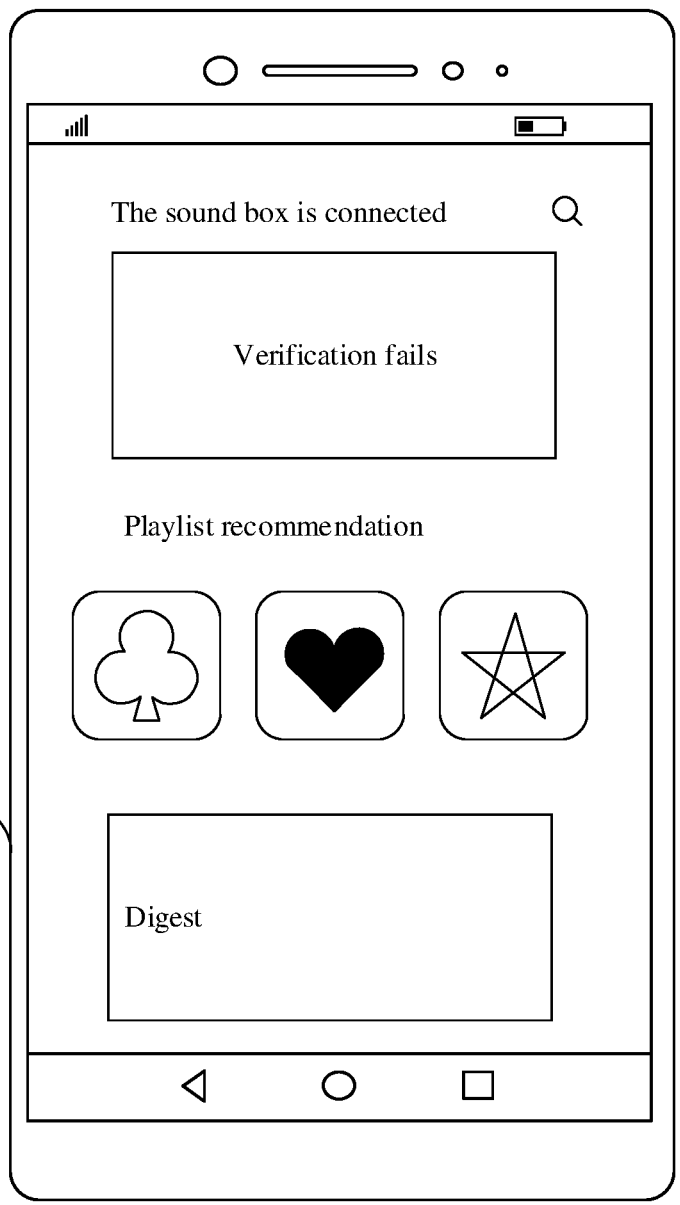
Figure 14:
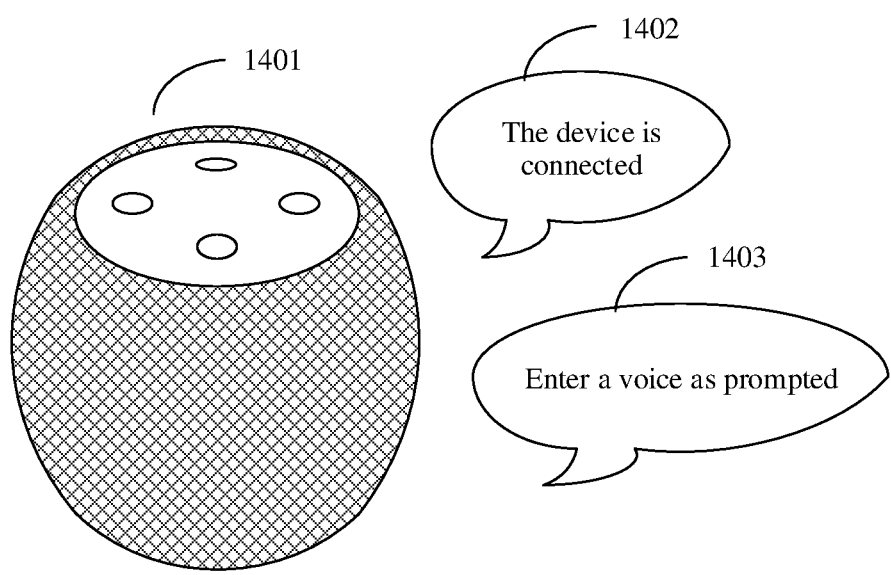
FIG. 14 is a schematic diagram of a user interaction according to an embodiment.

FIG. 13A to FIG. 13C are a schematic diagram of user interfaces in a user identity verification method according to an embodiment. FIG. 14 is a schematic diagram of a user interaction according to an embodiment. The user interfaces shown in FIG. 13A to FIG. 13C may be applied to a third device. A device 1401 shown in FIG. 14 may be a fourth device. The fourth device may be, for example, an apparatus such as a sound box. When the third device may perform data transmission with the fourth device according to a wireless communication protocol, the third device may display words such as "the sound box is connected" (as shown in 1301 in FIG. 13A). The fourth device may play audio including "the device is connected" (as shown in 1402 in FIG. 14). Before the third device matches a target user, the third device may display recommended audio unrelated to the target user. The third device may determine a target identity verification manner based on device information of the fourth device. As shown in FIG. 14, the target identity verification manner may be a voiceprint recognition manner. The fourth device may play audio including "enter a voice as prompted" (as shown in 1403 in FIG. 14), to prompt a user to perform voiceprint recognition, so that the fourth device can capture a voice of the user. The fourth device may send the obtained voice to the third device. In a possible case, the third device recognizes, based on the voice, that the voice comes from the target user. The third device may display audio preferred by the target user for user selection (as shown in 1302 in FIG. 13B) and indicate the fourth device to play audio selected by the user. In a possible case, the third device cannot recognize a source of the voice. The third device may display "verification fails" (as shown in 1303 in FIG. 13C).

Figure 15:
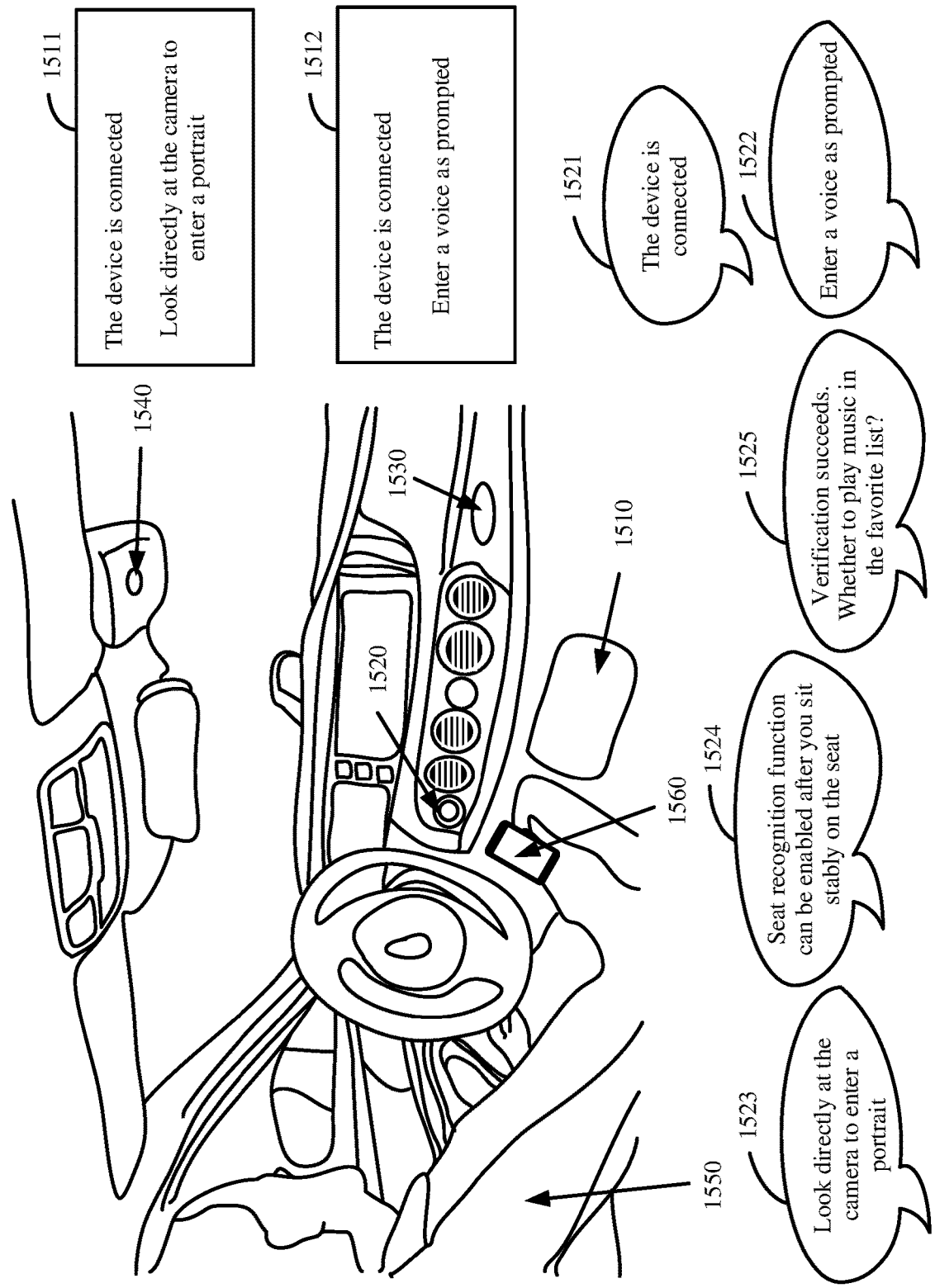
FIG. 15 is a schematic diagram of a user interaction according to an embodiment.

FIG. 15 is a schematic diagram of an application scenario and a user interaction according to an embodiment. FIG. 16 to FIG. 20 each are a diagram of a user interface in an identity verification method according to an embodiment. The application scenario shown in FIG. 15 may include a driving system (not shown in FIG. 15) and a mobile phone 1560. The user interface shown in each of FIG. 16 to FIG. 20 may be applied to the mobile phone 1560. The mobile phone 1560 may correspond to the third device in the embodiment shown in FIG. 10.

The driving system may further include a display 1510, a microphone 1520, a sound box 1530, a camera 1540, and a seat adjustment apparatus 1550. The driving system may correspond to the fourth device in the embodiment shown in FIG. 10. When the driving system can perform data transmission with the mobile phone 1560 according to a wireless communication protocol, the mobile phone may display words such as "the driving system is connected" (as shown in FIG. 16 to FIG. 20). The display 1510 may display words such as "the device is connected" (as shown in 1511 and 1512 in FIG. 15), and/or the sound box 1530 plays audio including "the device is connected" (as shown in 1521 in FIG. 15). The mobile phone 1560 may determine a target identity verification manner based on device information of the driving system.

Figure 16:
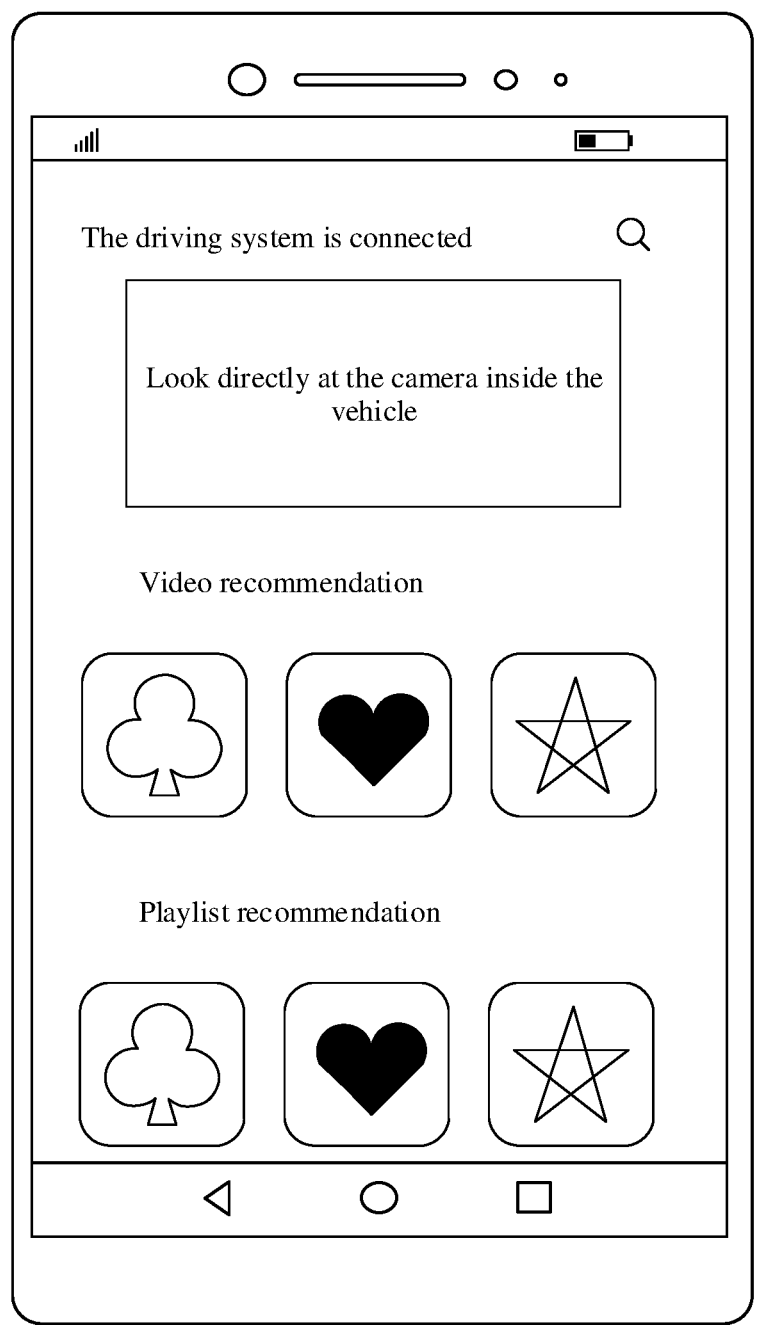
FIG. 16 is a schematic diagram of a user interface in a user identity verification method according to an embodiment.

In an example, the target identity verification manner may be a facial recognition manner. The mobile phone 1560 may display words such as "look directly at the camera to enter a portrait" (as shown in FIG. 16), to prompt a user to enter a portrait. The display 1510 may display words such as "look directly at the camera to enter a portrait" (as shown in 1511 in FIG. 15), and/or the sound box 1530 may play audio including "look directly at the camera to enter a portrait" (as shown in 1523 in FIG. 15), so as to prompt the user to enter the portrait. The driving system may obtain an image captured by the camera 1540 and send the image to the mobile phone 1560.

Figure 17:
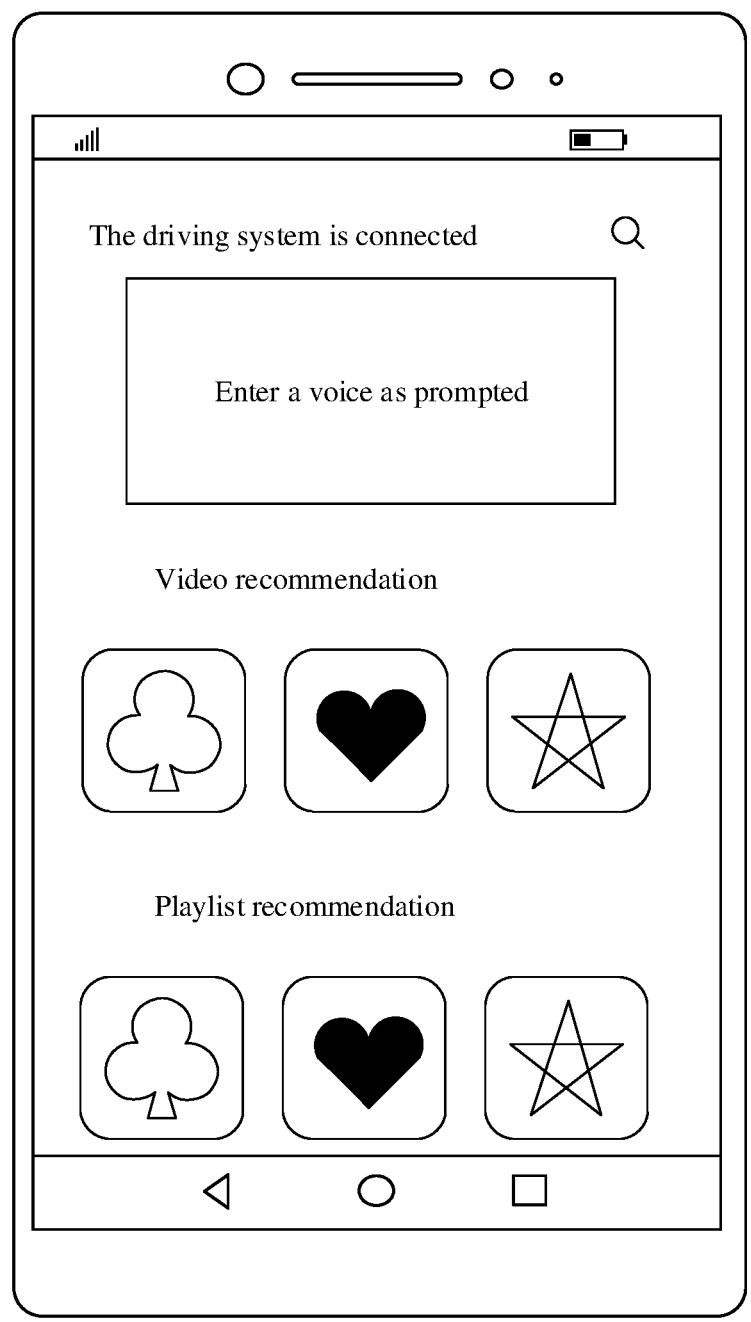
FIG. 17 is a schematic diagram of a user interface in a user identity verification method according to an embodiment.

In an example, the target identity verification manner may be a voiceprint recognition manner. The mobile phone 1560 may display words such as "enter a voice as prompted" (as shown in FIG. 17), so as to prompt a user to enter a voice. The display 1510 may display words such as "enter a voice as prompted" (as shown in 1512 in FIG. 15), and/or the sound box 1530 may play audio including "enter a voice as prompted" (as shown in 1522 in FIG. 15), so as to prompt the user to enter the voice. The driving system may obtain audio captured by the microphone 1520 and send the audio to the mobile phone 1560.

Figure 18:
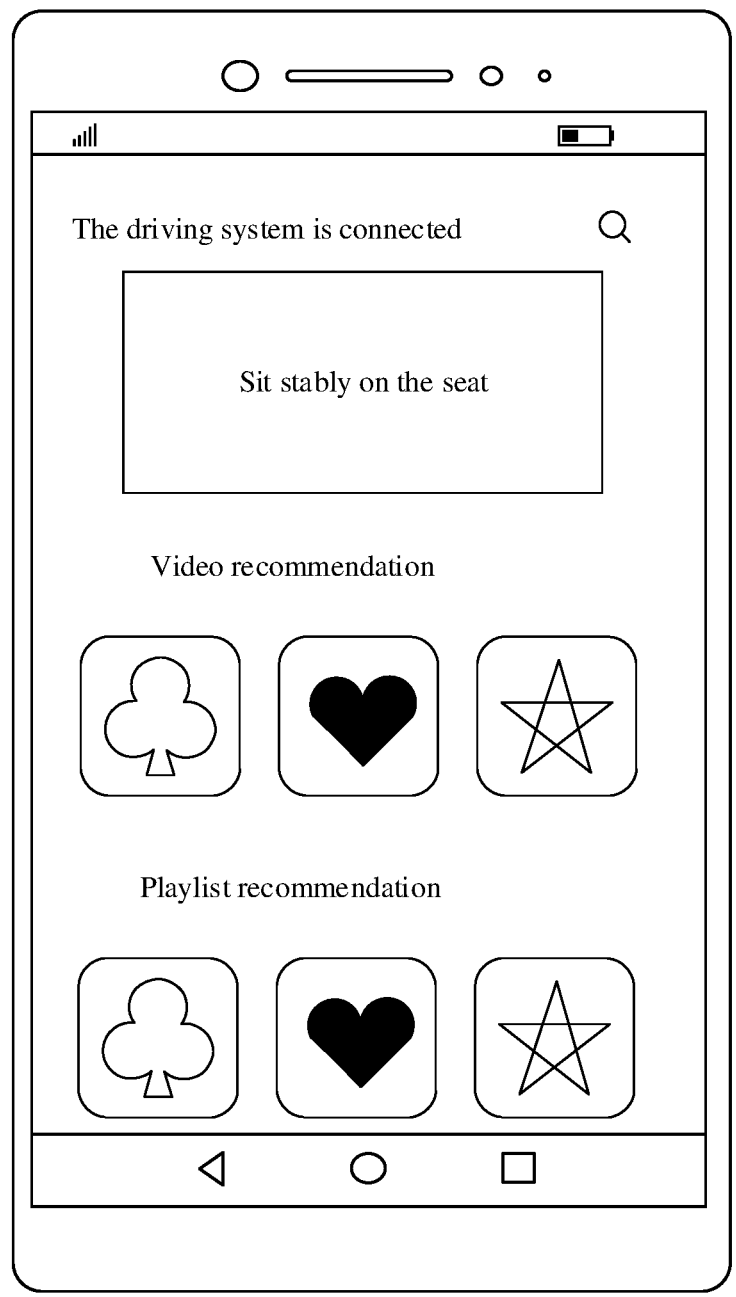
FIG. 18 is a schematic diagram of a user interface in a user identity verification method according to an embodiment.

In an example, the target identity verification manner may be a soft biometric trait recognition manner. The mobile phone 1560 may display words such as "Sit stably on the seat" (as shown in FIG. 18), to prompt a user to sit stably on a seat. The display 1510 may display words such as "sit stably on the seat" (not shown in FIG. 15), and/or the sound box 1530 may play audio (shown in 1524 in FIG. 15) including "seat recognition function can be enabled after you sit stably on the seat", so as to prompt the user to sit stably on the seat. The driving system may obtain a seat adjustment parameter collected by the seat adjustment apparatus 1550 and send the seat adjustment parameter to the mobile phone 1560.

Figure 19:
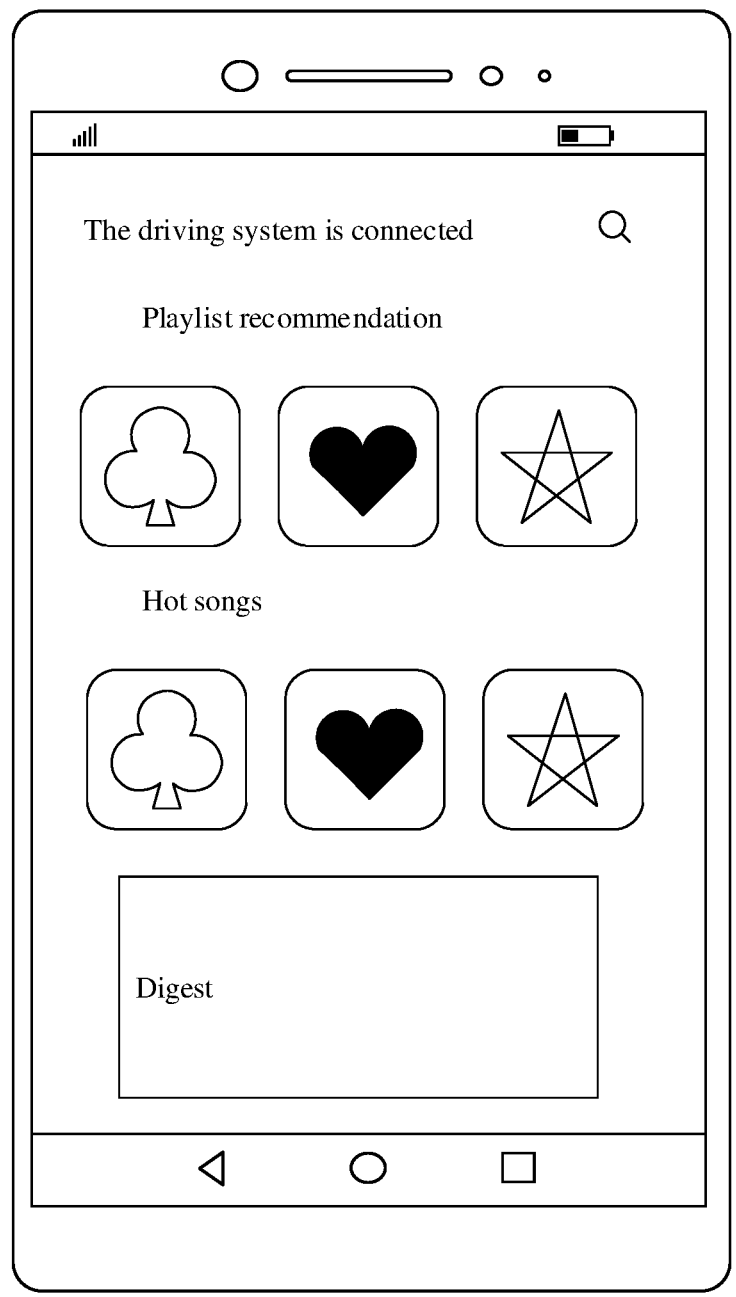
FIG. 19 is a schematic diagram of a user interface in a user identity verification method according to an embodiment.

In a possible case, the mobile phone 1560 recognizes a current user as a target user. The mobile phone 1560 may display a video or audio preferred by the target user for user selection (as shown in FIG. 19), and indicate the driving system to play, on the display 1510, the video selected by the user, or indicate the driving system to play, through the sound box 1530, the audio selected by the user.

Figure 20:
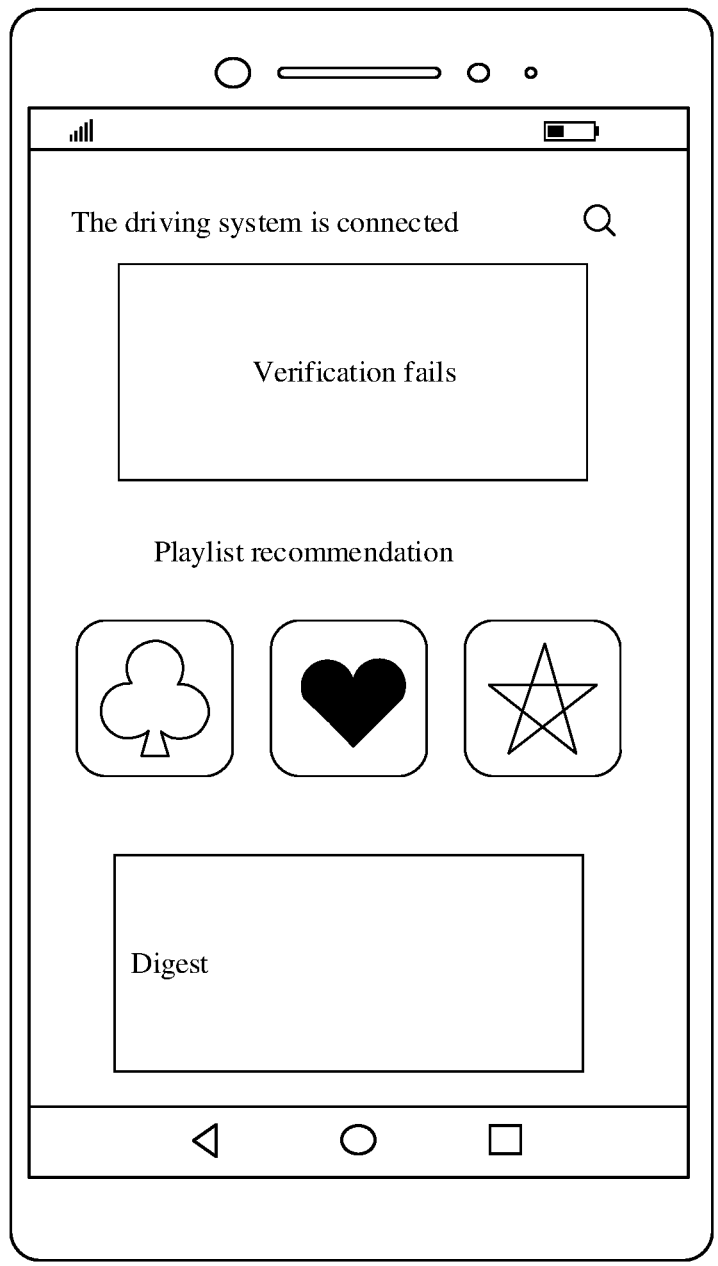
FIG. 20 is a schematic diagram of a user interface in a user identity verification method according to an embodiment.

In a possible case, the mobile phone 1560 cannot recognize an identity of a current user. The mobile phone 1560 may display "Verification failed" (as shown in FIG. 20).

Figure 21:
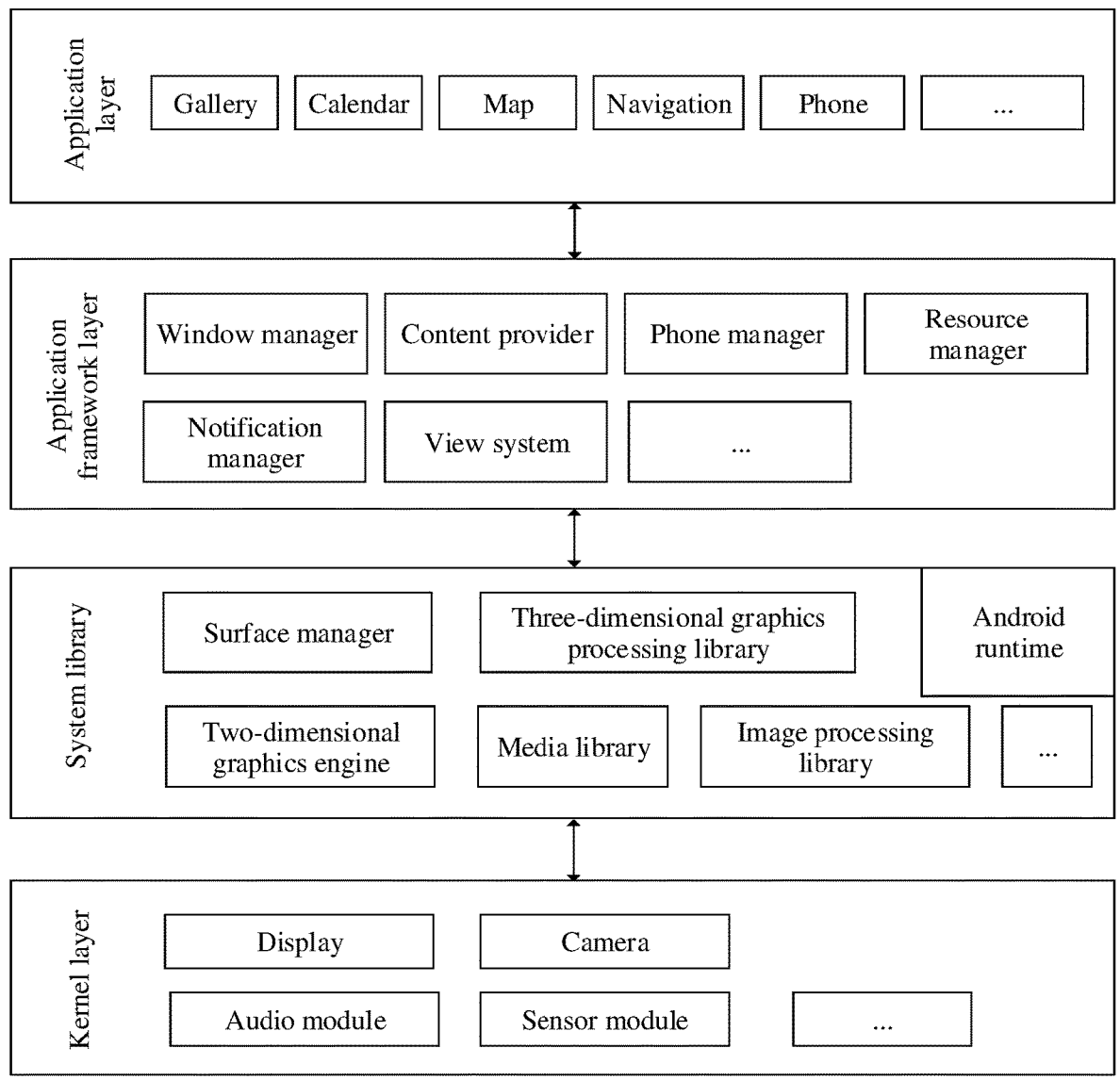
FIG. 21 is a schematic diagram of a software structure of an electronic device according to an embodiment.

FIG. 21 is a block diagram of a software structure of an electronic device 100 according to an embodiment. Software is divided into several layers by using the layered architecture, and each layer has a clear role and task. The layers communicate with each other through a software interface. In some embodiments, an Android system is divided into four layers: an application layer, an application framework layer, an Android runtime and system library from top to bottom. As shown in FIG. 21, each layer in the software architecture may invoke a kernel layer, and the kernel layer may include a plurality of pieces of hardware in FIG. 1.

The application layer may include a series of application packages. As shown in FIG. 21, the application packages may include applications such as Music Playing, Video Playing, Reading, Application Market, Gallery, Calendar, Phone, Map, and Navigation.

The application framework layer provides an application programming interface (API) and a programming framework for an application at the application layer. The application framework layer includes some predefined functions. As shown in FIG. 21, the application framework layer may include a window manager, a content provider, a view system, a phone manager, a resource manager, a notification manager, and the like. The window manager is configured to manage a window program. The window manager may obtain a size of a display, determine whether there is a status bar, perform screen locking, take a screenshot, and the like. The content provider is configured to store and obtain data and enable the data to be accessed by an application. The data may include a video, an image, audio, calls that are made and received, a browsing history and bookmarks, a phone book, and the like. The view system includes visual controls such as a control for displaying a text and a control for displaying an image. The view system may be configured to construct an application. A display interface may include one or more views. For example, a display interface including a message notification icon may include a text display view and an image display view. The phone manager is configured to provide a communications function of the electronic device 100, for example, management of a call status (including answering, declining, or the like). The resource manager provides various resources for an application, such as a localized character string, an icon, an image, a layout file, and a video file. The notification manager enables an application to display notification information in a status bar and may be used to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running in the background, or a notification that appears on the screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system. The kernel library includes two parts: a function that needs to be invoked in Java language and a kernel library of Android. The application layer and the application framework layer are run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL). The surface manager is configured to manage a display subsystem and provide fusion of 2D and 3D layers for a plurality of applications. The media library supports playback and recording in a plurality of frequently used audio and video formats, static image files, and the like. The media library may support a plurality of audio and video encoding formats, such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer may include a plurality of pieces of hardware, for example, the display 194, the camera 193, and the sensor module in FIG. 1. The sensor module may include, for example, the fingerprint sensor 180H and the ambient light sensor 180L in FIG. 1. The application layer, the application framework layer, the Android runtime, and the system library each may invoke hardware at the kernel layer by invoking a hardware interface. For example, the application layer invokes the display 194 by invoking a display interface.

A hardware interface layer may be included between the system layer and the kernel layer, and the hardware interface layer includes a plurality of interfaces used to drive hardware, for example, an interface for driving a display, an interface for driving a camera, an interface for driving an audio module, an interface for driving a gyroscope sensor, and an interface for driving a fingerprint sensor. When reading code of the application at the application layer, a processor or a chip inside the electronic device may invoke a hardware interface to drive hardware at the kernel layer and perform a corresponding operation.

Figure 22:
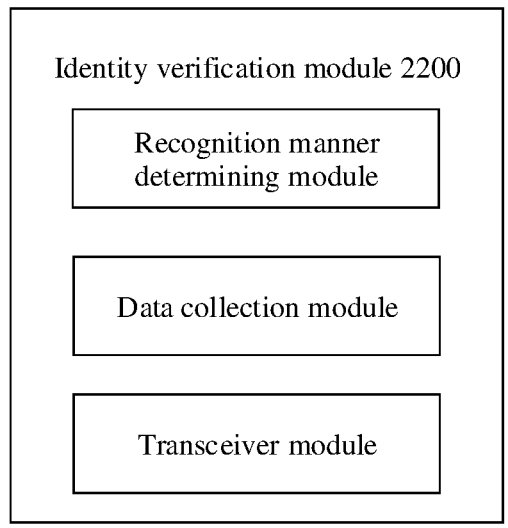
FIG. 22 is a schematic diagram of a software structure of an electronic device according to an embodiment.

The application layer or the system library shown in FIG. 21 may further include an identity verification module. FIG. 22 shows an identity verification module 2200 according to an embodiment. The identity verification module 2200 is configured to perform the steps of the user identity verification method 500 shown in FIG. 5 in embodiments. The identity verification module 2200 may include a recognition manner determining module, a data collection module, and a transceiver module. The recognition manner determining module may be configured to obtain device information of a second device. The recognition manner determining module may be configured to determine a target identity verification manner applicable to the second device from a plurality of identity verification manners based on the device information of the second device. The data collection module may be configured to obtain to-be-verified identity information of a current user based on the target identity verification manner. The transceiver module may be configured to send the to-be-verified identity information to the second device and receive a user verification result that is sent by the second device and that corresponds to the to-be-verified identity information.

Figure 23:
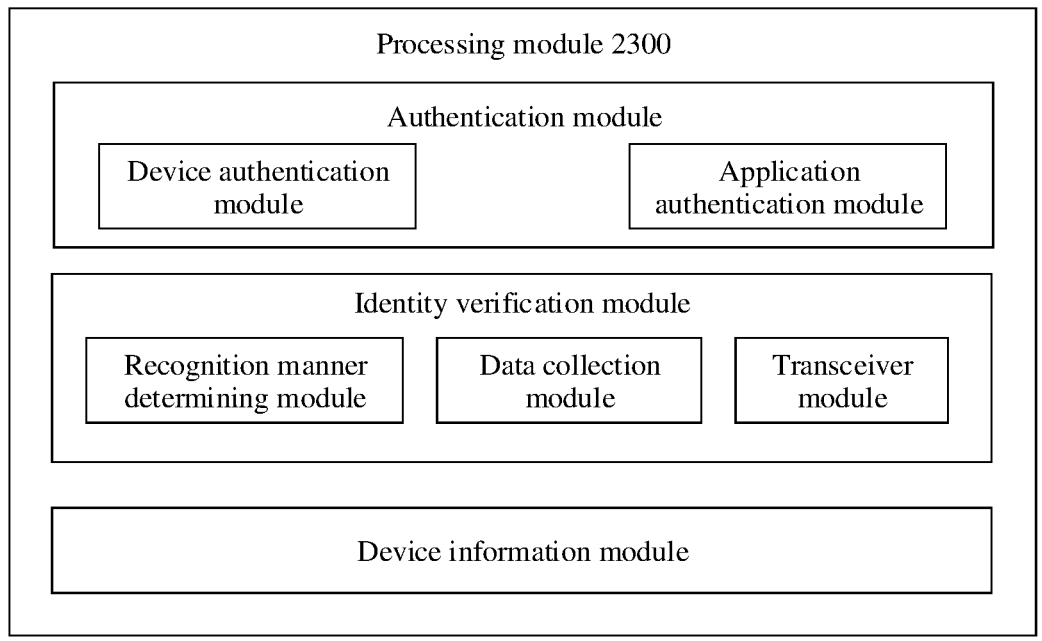
FIG. 23 is a schematic diagram of a software structure of an electronic device according to an embodiment.

The application layer or the system library shown in FIG. 21 may further include a processing module. The block diagram of the software structure shown in FIG. 21 may be applied to the first device in the embodiment shown in FIG. 5. FIG. 23 shows a processing module 2300 according to an embodiment. The processing module 2300 may include an authentication module, an identity verification module, and a device information module.

For descriptions of the identity verification module, refer to the identity verification module 2200 shown in FIG. 22. Details are not described herein again.

The device information module may be configured to update device information of a first device; and the device information module may be configured to obtain device information of a second device.

The authentication module may include a device authentication module and an application authentication module.

The device authentication module is configured to determine whether a second device is a device in a trust circle, so as to determine whether to invoke another module in the processing module. For example, there is a first device, a mobile phone 1, and a mobile phone 2 in a smart household scenario. The mobile phone 1 is a device in a trust circle, and the mobile phone 2 is not a device in the trust circle. Therefore, the first device can determine a target identity verification manner from a plurality of identity verification manners based on device information of the mobile phone 1. However, for the mobile phone 2, the first device does not invoke the identity verification module and the device information module in the processing module.

The application authentication module is configured to determine whether an application that invokes the processing module is a device in a trust circle, so as to determine whether to invoke another module in the processing module. For example, an application 1 and an application 2 run on a first device, the application 1 is an application in a trust circle, and the application 2 is not an application in the trust circle. When the application 1 invokes the processing module to recognize an identity of a current user, because the authentication module determines that the application 1 is the application in the trust circle, the application 1 may successfully invoke the identity verification module and the device information module in the processing module. When the application 2 invokes the processing module to recognize the identity of the current user, because the authentication module determines that the application 2 is not the application in the trust circle, the application 2 cannot invoke the identity verification module and the device information module in the processing module.

Figure 24:
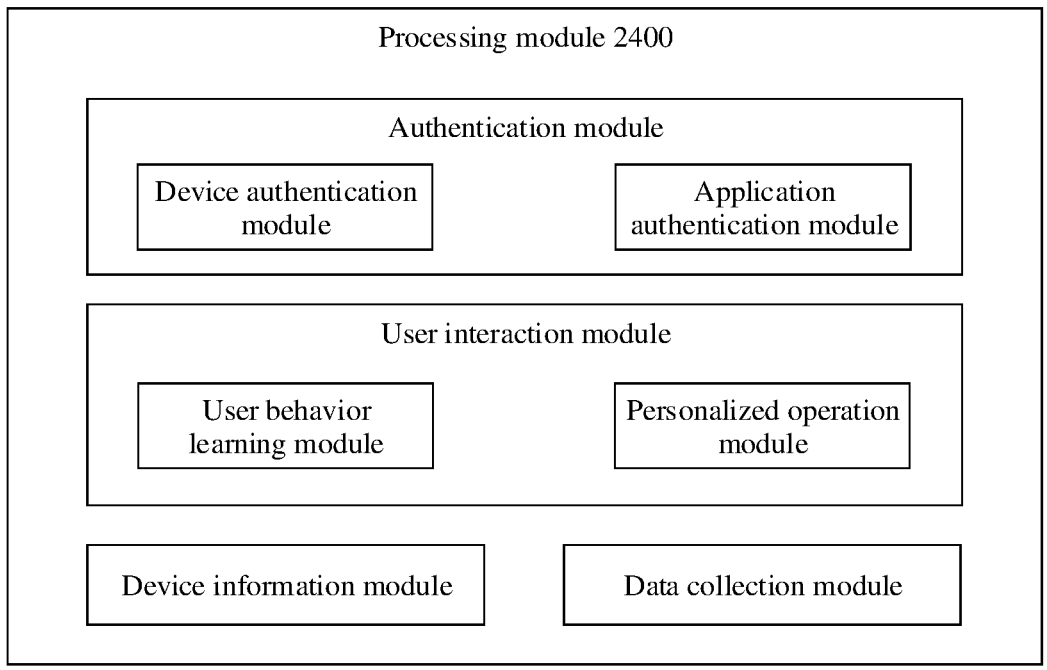
FIG. 24 is a schematic diagram of a software structure of an electronic device according to an embodiment.

The application layer or the system library shown in FIG. 21 may further include a processing module. The block diagram of the software structure shown in FIG. 21 may be applied to the second device in the embodiment shown in FIG. 5. FIG. 24 shows a processing module 2400 according to an embodiment. The processing module 2400 may include an authentication module, a device information module, a user interaction module, and a data collection module.

The device information module may be configured to update device information of a second device.

The data collection module may be configured to obtain behavior information of a user in a process in which the user uses the second device. For example, a video watched by the user, an image photographed by the user, audio listened to by the user, and pulse data of the user are obtained.

A transceiver module may be configured to send the device information of the second device to a first device. The transceiver module may be configured to send the behavior information of the user to the first device.

The authentication module may include a device authentication module and an application authentication module.

The device authentication module is configured to determine whether the first device is a device in a trust circle, so as to determine whether to invoke another module in the processing module. For example, there is a second device, a television, and a sound box in a smart household scenario. The sound box is a device in a trust circle, but the television is not a device in the trust circle. Therefore, the second device can send the behavior information of the user obtained by the second device and the device information of the second device to the sound box. However, for the television, the second device cannot invoke another module in the processing module.

The application authentication module is configured to determine whether an application that invokes the processing module is a device in a trust circle, so as to determine whether to invoke another module in the processing module. For example, an application 1 and an application 2 run on a second device, the application 1 is an application in a trust circle, and the application 2 is not an application in the trust circle. The application 1 invokes the processing module to send the behavior information of the user obtained by the second device and the device information of the second device to the first device. Therefore, the application 1 can successfully invoke another module in the processing module. When the application 2 invokes the processing module to recognize an identity of a current user, because the authentication module determines that the application 2 is not the application in the trust circle, the application 2 cannot invoke another module in the processing module.

Figure 25:
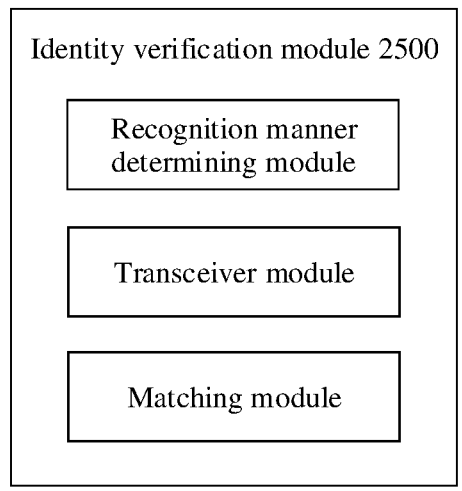
FIG. 25 is a schematic diagram of a software structure of an electronic device according to an embodiment.

The application layer or the system library shown in FIG. 21 may further include an identity verification module. FIG. 25 shows an identity verification module 2500 according to an embodiment. The identity verification module 2500 is configured to perform the steps of the user identity verification method 1000 shown in FIG. 10 in the embodiments. The identity verification module 2500 may include a recognition manner determining module, a transceiver module, and a matching module. The recognition manner determining module may be configured to obtain device information of a fourth device. The recognition manner determining module may be configured to determine a target identity verification manner applicable to the fourth device from a plurality of identity verification manners based on the device information of the fourth device. The transceiver module may be configured to indicate, based on the target identity verification manner, the fourth device to obtain user identity information of a current user. The transceiver module may be configured to receive the user identity information sent by the fourth device. The matching module may be configured to match the user identity information.

Figure 26:
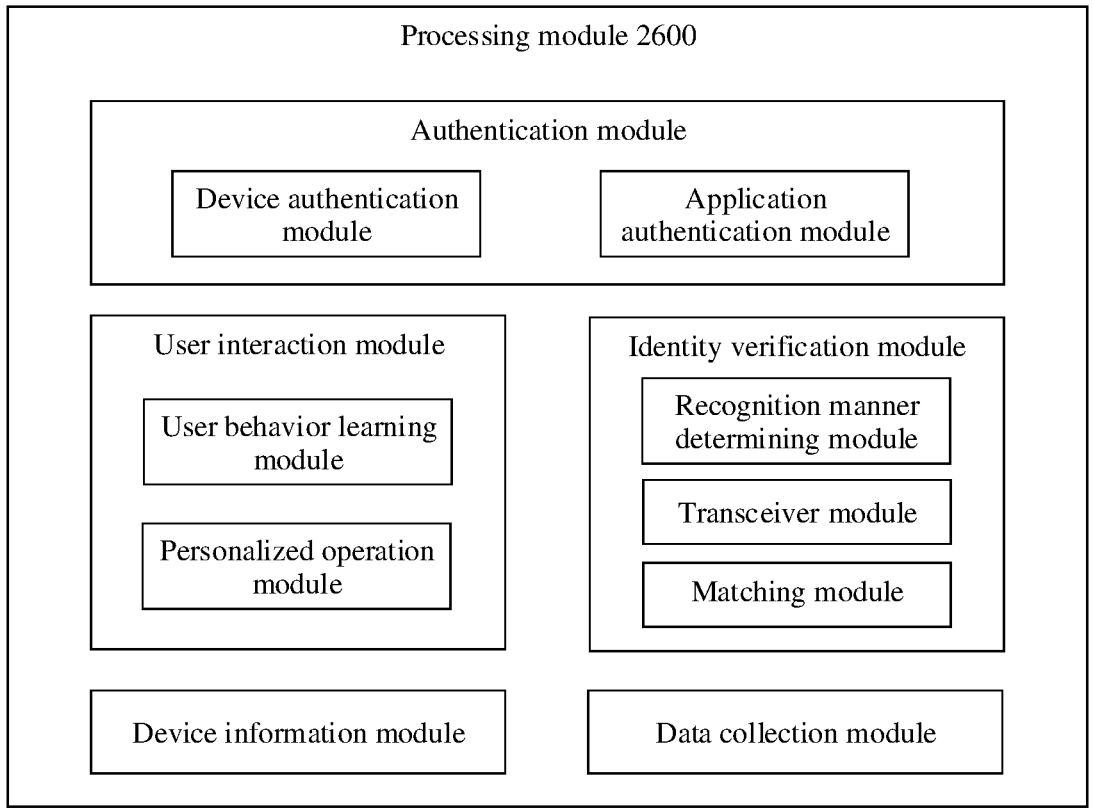
FIG. 26 is a schematic diagram of a software structure of an electronic device according to an embodiment.

The application layer or the system library shown in FIG. 21 may further include a processing module. The block diagram of the software structure shown in FIG. 21 may be applied to the third device in the embodiment shown in FIG. 10. FIG. 26 shows a processing module 2600 according to an embodiment. The processing module 2600 may include an authentication module, an identity verification module, a device information module, a user interaction module, and a data collection module.

For descriptions of the identity verification module, refer to the identity verification module 2500 shown in FIG. 25. Details are not described herein again.

The device information module may be configured to update device information of a third device; and the device information module may be configured to obtain device information of a fourth device.

The data collection module may be configured to obtain a behavior manner of a user in a process in which the user uses the third device. For example, SMS message content of the user, a call record of the user, an image photographed by the user, audio listened to by the user, an exercise record of the user, and pulse data of the user are obtained.

The user interaction module may include a user behavior learning module and a personalized operation module. The user behavior learning module may be configured to learn data obtained by the data collection module, so as to learn habit behavior or preference of the user. For example, the user behavior learning module may learn a music type liked by the user based on audio listened to by the user. The personalized operation module is configured to indicate a fourth device to perform a personalized operation. For example, the identity verification module may be configured to identify a target user. The user behavior learning module may determine, based on behavior information of the target user, target user common information corresponding to the target user. The personalized operation module may determine, based on the target user common information, a target operation corresponding to the target user.

The authentication module may include a device authentication module and an application authentication module.

The device authentication module is configured to determine whether the fourth device is a device in a trust circle, so as to determine whether to invoke another module in the processing module. For example, there is a third device, a sound box, and a television in a smart household scenario. The sound box is a device in a trust circle, but the television is not a device in the trust circle. Therefore, the third device can determine a target identity verification manner from a plurality of identity verification manners based on device information of the sound box. The third device may further indicate, to the sound box, audio preferred by a user. The third device may further receive data (such as user behavior information and device information of the sound box) sent by the sound box. However, for the television, the third device cannot invoke another module in the processing module.

The application authentication module is configured to determine whether an application that invokes the processing module is a device in a trust circle, so as to determine whether to invoke another module in the processing module. For example, an application 1 and an application 2 run on a third device, the application 1 is an application in a trust circle, and the application 2 is not an application in the trust circle. When the application 1 invokes the processing module to recognize an identity of a current user, because the authentication module determines that the application 1 is the application in the trust circle, the application 1 may successfully invoke the identity verification module, the data collection module, the device information module, and the user interaction module in the processing module. When the application 2 invokes the processing module to recognize an identity of a current user, because the authentication module determines that the application 2 is not the application in the trust circle, the application 2 cannot invoke the identity verification module, the data collection module, the device information module, and the user interaction module in the processing module.

Figure 27:
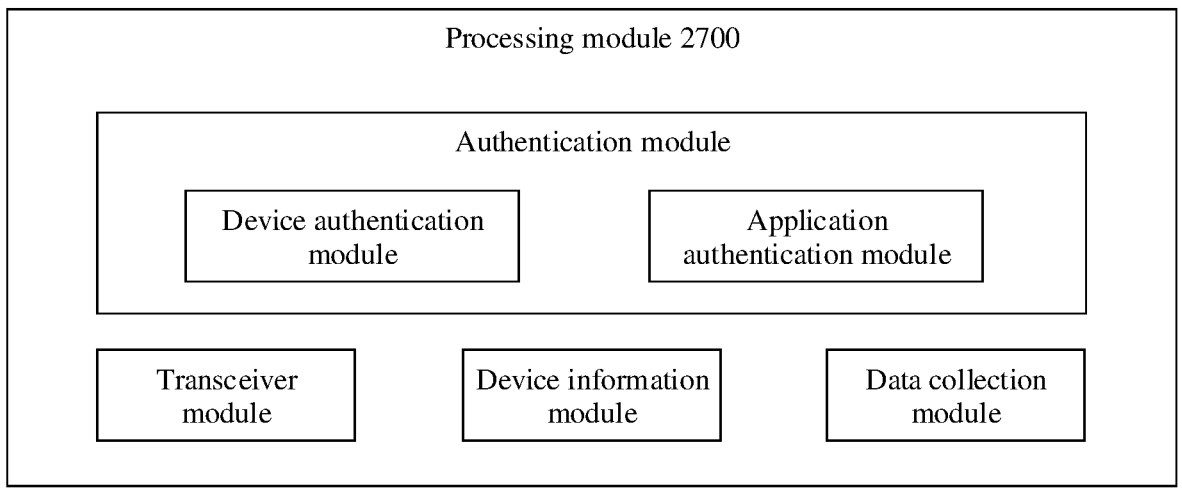
FIG. 27 is a schematic diagram of a software structure of an electronic device according to an embodiment.

The application layer or the system library shown in FIG. 21 may further include a processing module. The block diagram of the software structure shown in FIG. 21 may be applied to the fourth device in the embodiment shown in FIG. 10. FIG. 27 shows a processing module 2700 according to an embodiment. The processing module 2700 may include an authentication module, a transceiver module, a device information module, and a data collection module.

The device information module may be configured to update device information of a fourth device.

The data collection module may be configured to obtain behavior information of a user in a process in which the user uses the fourth device. For example, a video watched by the user, an image photographed by the user, audio listened to by the user, and pulse data of the user are obtained.

The transceiver module may be configured to send the device information of the fourth device to a third device. The transceiver module may be configured to send the behavior information of the user to the third device.

The authentication module may include a device authentication module and an application authentication module.

The device authentication module is configured to determine whether the third device is a device in a trust circle, so as to determine whether to invoke another module in the processing module. For example, there is a fourth device, a mobile phone 1, and a mobile phone 2 in a smart household scenario. The mobile phone 1 is a device in a trust circle, and the mobile phone 2 is not a device in the trust circle. Therefore, the fourth device can send the behavior information of the user obtained by the fourth device and the device information of the fourth device to the mobile phone. However, for the mobile phone 2, the fourth device cannot invoke another module in the processing module.

The application authentication module is configured to determine whether an application that invokes the processing module is a device in a trust circle, so as to determine whether to invoke another module in the processing module. For example, an application 1 and an application 2 run on a fourth device, the application 1 is an application in a trust circle, and the application 2 is not an application in the trust circle. The application 1 invokes the processing module to send the behavior information of the user obtained by the fourth device and the device information of the fourth device to the third device. Therefore, the application 1 can successfully invoke another module in the processing module. When the application 2 invokes the processing module to recognize an identity of a current user, because the authentication module determines that the application 2 is not the application in the trust circle, the application 2 cannot invoke another module in the processing module.

Figure 28:
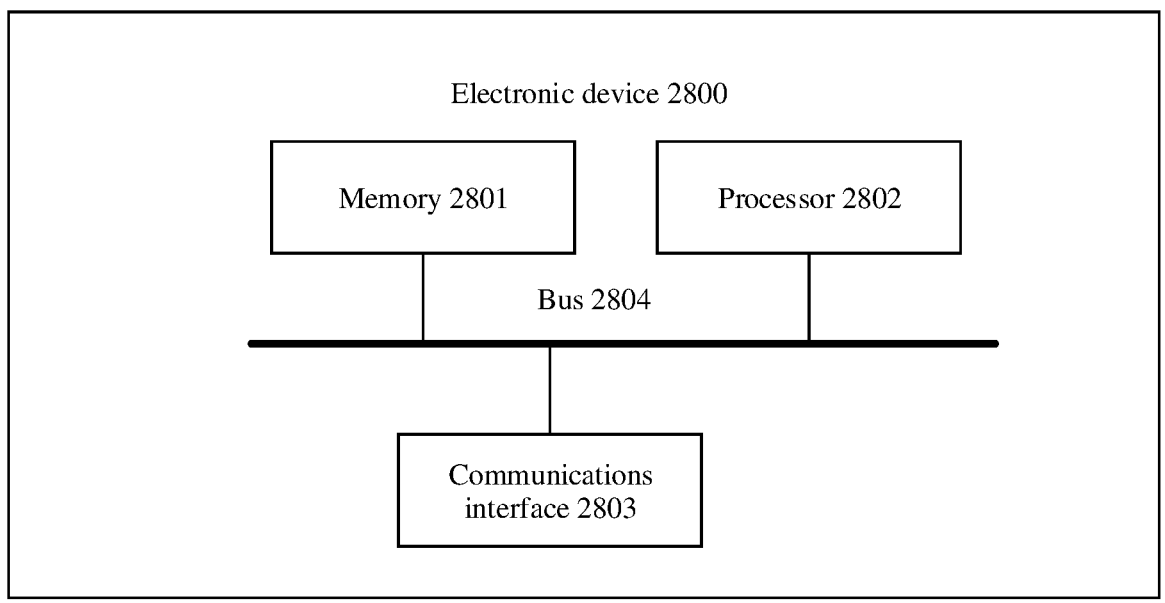
FIG. 28 is a schematic block diagram of an electronic device according to an embodiment.

FIG. 28 is a schematic diagram of a hardware structure of an electronic device according to an embodiment. The electronic device 2800 shown in FIG. 28 (the electronic device 2800 may be a computer device) includes a memory 2801, a processor 2802, a communications interface 2803, and a bus 2804. A communication connection is implemented between the memory 2801, the processor 2802, and the communications interface 2803 through the bus 2804.

The memory 2801 may be a read-only memory (ROM), a static storage device, a dynamic storage device, or a random access memory (RAM). The memory 2801 may store a program. When the program stored in the memory 2801 is executed by the processor 2802, the processor 2802 is configured to perform the steps of the user identity verification method shown in FIG. 5 or FIG. 10 in the embodiments.

The processor 2802 may be a general-purpose central processing unit (CPU), a microprocessor, an application-specific integrated circuit (ASIC), a graphics processing unit (GPU), or one or more integrated circuits, and is configured to execute a related program, to implement the user identity verification method shown in FIG. 5 or FIG. 10 in the embodiments.

Alternatively, the processor 2802 may be an integrated circuit chip and has a signal processing capability. In an implementation process, the steps of the user identity verification method shown in FIG. 5 or FIG. 10 in the embodiments may be completed by using an integrated logic circuit of hardware in the processor 2802, or an instruction in a form of software.

The processor 2802 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams in the embodiments. The general-purpose processor may be a microprocessor, or the processor may be any conventional processor or the like. The steps in the methods with reference to the embodiments may be directly performed and completed by a hardware decoding processor or may be performed and completed by using a combination of hardware in a decoding processor and a software module. A software module may be located in a mature storage medium in the art, such as a random access memory, a flash memory, a read-only memory, a programmable read-only memory, an electrically erasable programmable memory, or a register. The storage medium is located in the memory 2801. The processor 2802 reads information in the memory 2801, and completes, in combination with hardware of the processor, a function that needs to be performed by a unit included in the electronic device in the embodiments or performs the user identity verification method shown in FIG. 5 or FIG. 10 in the embodiments.

The communications interface 2803 uses, by way of example without limitation, a transceiver apparatus such as a transceiver to implement communication between the electronic device 2800 and another device or communications network.

The bus 2804 may include a path for transmitting information between components (for example, the memory 2801, the processor 2802, and the communications interface 2803) of the electronic device 2800.

It should be understood that an obtaining module in the electronic device may be equivalent to the communications interface 2803 in the electronic device 2800. A processing module in the electronic device may be equivalent to the processor 2802.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and design constraints of the solutions. A person skilled in the art may use different methods to implement the described functions of each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in an electronic, a mechanical, or another similar form.

The units described as separate components may or may not be physically separate, and components displayed as units may or may not be physical units. The components may be located at one position or may be distributed on a plurality of network units. Some or all of the units may be selected depending on actual requirements to achieve the objectives of the solutions in embodiments.

In addition, each function unit in the embodiments may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the solutions essentially, or the part contributing to the conventional technology, or some of the solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely implementations of the embodiments, but are not intended as limiting. Any variation or replacement readily figured out by a person skilled in the art shall be subject to the scope of the embodiments.

What is claimed is:

1. A user identity verification method, comprising:
obtaining, by a first device, device information of a second device;
selecting, by the first device, a target identity verification manner applicable to the second device from a plurality of identity verification manners based on the device information of the second device, device information of the first device and at least one piece of verification manner information;
obtaining, by the first device, to-be-verified identity information of a current user based on the target identity verification manner; and
sending, by the first device, the to-be-verified identity information and an indication of the target identity verification manner to the second device;
receiving a user verification result that is sent by the second device and that corresponds to the to-be-verified identity information and the indication of the target identity verification manner; and
performing by the first device, based on the received user verification result a target operation for the current user wherein the target operation is determined by the second device for a target user,
wherein the device information of the first device comprises:
device type information of the first device;
wireless transmission information of the first device;
an identity verification manner enabled by the first device; and
information about at least one module in the first device, wherein the at least one module is configured to perform a first identity verification manner, and the first identity verification manner is any one of the plurality of identity verification manners,
wherein the at least one piece of verification manner information comprises:
a plurality of pieces of accuracy information that are in a one-to-one correspondence with the plurality of identity verification manners;
a plurality of pieces of user experience information that are in a one-to-one correspondence with the plurality of identity verification manners;
a plurality of pieces of technology maturity information that are in a one-to-one correspondence with the plurality of identity verification manners; and
a plurality of pieces of verification environment information that are in a one-to-one correspondence with the plurality of identity verification manners.

2. The user identity verification method according to claim 1, wherein the method further comprises:
wherein the target operation is preformed when the to-be-verified identity information successfully matches the targe user.

3. The user identity verification method according to claim 1, wherein the device information of the second device comprises at least one of the following:
device type information of the second device;
wireless transmission information of the second device; and
an identity verification manner enabled by the second device.

4. The user identity verification method according to claim 1, wherein the method further comprises:
sending, by the first device, behavior information of the current user to the second device.

5. A non-transitory computer-readable storage medium, wherein the computer-readable medium stores program code to be executed by a device, and the program code is used to perform the method according to claim 1.

6. An electronic device, comprising:
an obtaining module, configured to obtain device information of a second device;
a processing module, configured to select a target identity verification manner applicable to the second device from a plurality of identity verification manners based on the device information of the second device, device information of the electronic device and at least one piece of verification manner information, wherein
the processing module is further configured to obtain to-be-verified identity information of a current user based on the target identity verification manner; and
a transceiver module, configured to:
send the to-be-verified identity information and an indication of the target identity verification manner to the second device,
receive a user verification result that is sent by the second device and that corresponds to the to-be-verified identity information and the indication of the target identity verification manner, and,
performing by the first device, based on the received user verification result, a target operation for the current user wherein the target operation is determined by the second device for a target user,
wherein the device information of the electronic device comprises:
device type information of the electronic device;
wireless transmission information of the electronic device;
an identity verification manner enabled by the electronic device; and
information about at least one module in the electronic device, wherein the at least one module is configured to perform a first identity verification manner, and the first identity verification manner is any one of the plurality of identity verification manners,
wherein the device information of the electronic device comprises at least one of:
device type information of the electronic device: wireless transmission information of the electronic device:
an identity verification manner enabled by the electronic device; and information about at least one module in the electronic device, wherein the at least one module is configured to perform a first identity verification manner, and the first identity verification manner is any one of the plurality of identity verification manners.

7. The electronic device according to claim 6, wherein the processing module is further configured to, preform the target operation when the to-be-verified identity information successfully matches the target user.

8. The electronic device according to claim 6, wherein the device information of the second device comprises at least one of the following:
   device type information of the second device;
   wireless transmission information of the second device; and
   an identity verification manner enabled by the second device.

9. The electronic device according to claim 6, wherein the transceiver module is further configured to send behavior information of the current user to the second device.

* * * * *